United States Patent
Prakash et al.

(10) Patent No.: US 11,291,233 B2
(45) Date of Patent: *Apr. 5, 2022

(54) COMPOSITIONS AND METHODS FOR IMPROVING REBAUDIOSIDE M SOLUBILITY

(71) Applicants: The Coca-Cola Company, Atlanta, GA (US); PureCircle Sdn Bhd, Negeri Sembilan (MY)

(72) Inventors: Indra Prakash, Alpharetta, GA (US); Gil Ma, Atlanta, GA (US); Avetik Markosyan, Kuala Lumpur (MY); Youlung Chen, Marietta, GA (US)

(73) Assignees: The Coca-Cola Company, Atlanta, GA (US); PureCircle SDN BHD

( * ) Notice: Subject to any disclaimer, the term of this patent is extended or adjusted under 35 U.S.C. 154(b) by 309 days.

This patent is subject to a terminal disclaimer.

(21) Appl. No.: 16/440,253

(22) Filed: Jun. 13, 2019

(65) Prior Publication Data

US 2020/0015505 A1    Jan. 16, 2020

Related U.S. Application Data

(63) Continuation of application No. 15/395,457, filed on Dec. 30, 2016, now abandoned, which is a continuation of application No. 14/046,514, filed on Oct. 4, 2013, now Pat. No. 10,905,146.

(60) Provisional application No. 61/845,817, filed on Jul. 12, 2013.

(51) Int. Cl.
A23L 27/30 (2016.01)
A23L 2/60 (2006.01)

(52) U.S. Cl.
CPC ............... *A23L 27/36* (2016.08); *A23L 2/60* (2013.01); *A23L 27/30* (2016.08); *A23V 2002/00* (2013.01)

(58) Field of Classification Search
CPC . A23L 27/36; A23L 2/60; A23L 27/20; A23V 2002/00
USPC ........................................ 426/548, 534, 590
See application file for complete search history.

(56) References Cited

U.S. PATENT DOCUMENTS

| | | | |
|---|---|---|---|
| 9,169,285 B2 | 10/2015 | Prakash et al. | |
| 10,905,146 B2 * | 2/2021 | Prakash | A23L 2/60 |
| 2007/0098845 A1 | 5/2007 | Soper et al. | |
| 2007/0116823 A1 | 5/2007 | Prakash et al. | |
| 2008/0292775 A1 | 11/2008 | Prakash et al. | |
| 2010/0255171 A1 | 10/2010 | Purkayastha et al. | |
| 2011/0091634 A1 | 4/2011 | Abelyan et al. | |
| 2011/0091635 A1 | 4/2011 | Abelyan et al. | |
| 2011/0092684 A1 | 4/2011 | Abelyan et al. | |
| 2011/0111115 A1 | 5/2011 | Shi et al. | |
| 2011/0183056 A1 | 7/2011 | Morita et al. | |
| 2012/0058236 A1 | 3/2012 | Fosdick et al. | |
| 2012/0289687 A1 | 11/2012 | Erickson et al. | |
| 2013/0052252 A1 | 2/2013 | Bell et al. | |
| 2014/0171519 A1 | 6/2014 | Prakash et al. | |
| 2014/0342043 A1 | 11/2014 | Bell | |
| 2015/0018432 A1 | 1/2015 | Prakash et al. | |
| 2015/0216218 A1 | 8/2015 | Prakash et al. | |

FOREIGN PATENT DOCUMENTS

| | | |
|---|---|---|
| WO | WO 2010/038911 | 4/2010 |
| WO | WO 2011097359 | 8/2011 |
| WO | WO 2012/006728 | 1/2012 |
| WO | WO 2012/082587 | 6/2012 |
| WO | WO 2012/164383 | 12/2012 |
| WO | WO 2013/096420 | 6/2013 |
| WO | WO 2013/102793 | 7/2013 |
| WO | WO 2014186250 | 11/2014 |

OTHER PUBLICATIONS

International Search Report for PCT/US2014/046501, dated Oct. 10, 2014.
Extended European Search Report for EP 14822960.2, dated Feb. 8, 2017.
Third Party Observations submitted in EP 14822960.2, dated Jan. 1, 2018.
Ohta, et al., "Characterization of Novel Steviol Glycosides from Leaves of Stevia rebaudiana Morita", J. Appl. Glycosci, 57, 199-209 (2010).

* cited by examiner

*Primary Examiner* — Leslie A Wong
(74) *Attorney, Agent, or Firm* — King & Spalding

(57) ABSTRACT

Rebaudioside M compositions with improved aqueous solubility and methods for preparing the same are provided herein. The rebaudioside M compositions include (i) disordered crystalline compositions comprising rebaudioside M and rebaudioside D, (ii) spray-dried compositions comprising rebaudioside M, rebaudioside D and steviol glycoside mixtures and/or rebaudioside B and/or NSF-02, (iii) spray-dried compositions comprising rebaudioside M, rebaudioside D and at least one surfactant, polymer, saponin, carbohydrate, polyol, preservative or a combination thereof. Sweetened compositions, such a beverages, containing the rebaudioside M compositions with improved water solubility are also provided herein.

14 Claims, 7 Drawing Sheets

COMPOSITIONS AND METHODS FOR IMPROVING REBAUDIOSIDE M SOLUBILITY

CROSS-REFERENCE TO RELATED APPLICATIONS

This application is a continuation of U.S. patent application Ser. No. 15/395,457, filed on Dec. 30, 2016, now abandoned, which is a continuation of U.S. patent application Ser. No. 14/046,514, filed on Oct. 4, 2013, now U.S. patent Ser. No. 10/905,146, which claims the benefit of U.S. Provisional Application No. 61/845,817, filed on Jul. 12, 2013. The disclosures of each of the above-referenced applications are incorporated by reference in their entirety.

FIELD OF THE INVENTION

The present invention relates generally to compositions containing rebaudioside M and rebaudioside D with improved aqueous solubility and methods of preparing the same. The compositions provided herein exhibit improved aqueous solubility over known forms and compositions. The present invention also relates to sweetened compositions, e.g. beverages, comprising the compositions with improved water solubility in addition to methods for preparing such sweetened compositions.

BACKGROUND OF THE INVENTION

*Stevia* is the common name for *Stevia rebaudiana* (Bertoni), a perennial shrub of the Asteracae (Compositae) family native to Brazil and Paraguay. *Stevia* leaves, the aqueous extract of the leaves, and purified stevioglycosides isolated from *Stevia* have been developed as sweeteners desirable as both non-caloric and natural in origin. Steviolglycosides isolated from *Stevia rebaudiana* include stevioside, rebaudioside A, rebaudioside C, dulcoside A, rubusoside, steviolbioside, rebaudioside B, rebaudioside D and rebaudioside F.

More recently, rebaudioside M (also called redaudioside X), (13-[(2-O-β-D-glucopyranosyl-3-O-β-D-glucopyranosyl-β-D-glucopyranosyl)oxy] ent kaur-16-en-19-oic acid[(2-O-β-D-glucopyranosyl-3-O-β-D-glucopyranosyl-β-D-glucopyranosyl) ester], was isolated from *Stevia rebaudiana* and characterized:

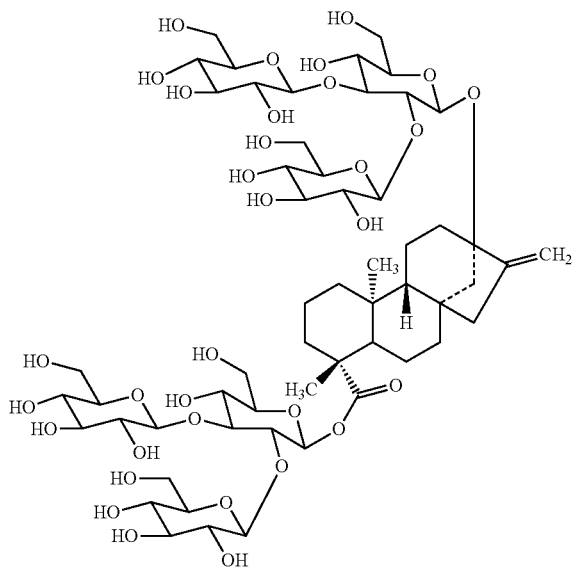

Rebaudioside M is present in minute quantities in *Stevia rebaudiana*, about 0.05%-0.5% by weight.

A concentration of at least 0.3% (% w/w) is useful in syrup and beverage formulations. However, crystalline rebaudioside M has poor aqueous solubility and dissolution qualities in beverage formulations. For example, certain crystalline compositions containing about 75-90% rebaudioside M and about 25-10% rebaudioside D by weight cannot be dissolved above concentrations of 0.1-0.15% (% w/w) at room temperature. The corresponding amorphous composition has higher apparent aqueous solubility. However, there remains a need for additional compositions containing rebaudioside M that have improved aqueous solubility. In particular, there is a need for compositions containing rebaudioside M that have improved aqueous solubility over extended periods of time and methods for preparing such compositions.

SUMMARY OF THE INVENTION

In one embodiment, the present invention provides a disordered crystalline composition comprising rebaudioside M and rebaudioside D. The relative amounts of rebaudioside M and rebaudioside D in the composition can vary from about 50% to about 99% and about 50% to about 1%, respectively. In a particular embodiment, rebaudioside M is present in about 75% to about 90% by weight and rebaudioside D is present in about 5% to about 25% by weight in a steviol glycoside mixture.

The disordered crystalline composition exhibits improved aqueous solubility compared to crystalline forms of the composition. In one embodiment, the disordered crystalline composition has a water solubility of about 0.3% (w/w) or greater. In another embodiment, the disordered crystalline composition remains soluble for greater than about 5 hours when dissolved in water in a concentration of about 0.3%-0.5%. In still another embodiment, the disordered crystalline composition remains dissolved in water in a concentration of about 0.3%-0.4% for 1 day or longer.

The present invention also provides methods for preparing disordered crystalline compositions with improved aqueous solubility by heating a mixture of rebaudioside M, rebaudioside D and solvent, maintaining the mixture at an elevated temperature for a period of time to provide a concentrated solution, and then removing solvent from the concentrated solution. Optionally, the temperature of the concentrated solution can be decreased prior to solvent removal.

In one embodiment, rebaudioside M and rebaudioside D are combined with solvent in a ratio of about 1:1 to about 1:30. The solvent can be removed by methods including, but not limited to, spray-drying, rotary evaporation, lyophilization, tray drying, pervaporation, osmosis, reverse-osmosis, liquid extraction, absorption and adsorption. In a preferred embodiment, the solvent is removed by spray-drying.

The compositions produced by this method are, or contain, disordered crystalline material.

The present invention also provides spray-dried compositions with improved aqueous water solubility comprising rebaudioside M, rebaudioside D and a substance selected from a steviol glycoside mixture, rebaudioside B, NSF-02 (glycosylated steviol glycosides) and a combination thereof. The relative amounts of rebaudioside M and rebaudioside D in the composition can vary from about 50% to about 99% and about 50% to about 1%, respectively. In a particular embodiment, rebaudioside M is present in about 75% to about 90% by weight and rebaudioside D is present in about 5% to about 25% by weight in a steviol glycoside mixture.

In one embodiment, the substance is a steviol glycoside mixture. The weight ratio of rebaudioside M and rebaudioside D to steviol glycoside mixture can be from about 20:1 to about 5:1. In a more particular embodiment, the steviol glycoside mixture is SG95RA50. The weight ratio of rebaudioside M and rebaudioside D to SG95RA50 can be from about 20:1 to about 5:1.

In yet another embodiment, the substance is purified rebaudioside B. The weight ratio of rebaudioside M and rebaudioside D to rebaudioside B can be from about 20:1 to about 5:1.

In another embodiment, the substance is NSF-02. The weight ratio of rebaudioside M and rebaudioside D to NSF-02 ranges from about 20:1 to about 5:1.

The spray-dried compositions exhibit improved aqueous solubility compared to the corresponding composition that is not spray-dried. In one embodiment, the spray-dried composition has a water solubility of about 0.3% (w/w) or greater. In another embodiment, the spray-dried composition remains soluble for about 1 hour or longer when dissolved in water at a concentration of 0.3%. In still another embodiment, the spray-dried composition remains dissolved in water at a concentration of 0.3% for about 1 day or longer.

The present invention also provides methods for preparing spray-dried compositions with improved aqueous solubility comprising heating a mixture comprising a solvent, rebaudioside M, rebaudioside D and a substance selected from a steviol glycoside mixture, rebaudioside B, NSF-02 or a combination thereof; maintaining the mixture at a temperature for a period of time to provide a concentrated solution; and spray-drying the concentrated solution to provide a spray-dried composition with improved aqueous solubility.

In one embodiment, rebaudioside M, rebaudioside D and the steviol glycoside mixture and/or rebaudioside B and/or NSF-02 can be combined with the solvent in a ratio of about 1:1 to about 1:30. In another embodiment, the mixture is heated and to and maintained at a temperature of about 100° C. In still another embodiment, the concentrated solution is spray-dried by a laboratory spray-drier operating at a 120-160° C. inlet temperature and a 40-100° C. outlet temperature.

The present invention also provides compositions with improved aqueous solubility comprising rebaudioside M, rebaudioside D and at least one surfactant, polymer, saponin, carbohydrate, polyol, preservative or a combination thereof, wherein the aqueous solubility of said composition is improved, and/or precipitation is delayed, compared the corresponding composition in the absence of said at least one surfactant, polymer, saponin, carbohydrate, polyol, preservative or a combination thereof. The relative amounts of rebaudioside M and rebaudioside D in the composition can vary from about 50% to about 99% and about 50% to about 1%, respectively. In a particular embodiment, rebaudioside M is present in about 75% to about 90% by weight and rebaudioside D is present in about 5% to about 25% by weight in a steviol glycoside mixture. In a preferred embodiment, said compositions are prepared by spray-drying.

The compositions of the present invention (hereinafter referred to as "rebaudioside M compositions") may further comprise additional sweeteners, functional ingredients and/or additives.

Sweetened compositions are also provided comprising a rebaudioside M composition of the present invention and a sweetenable composition. Suitable sweetenable compositions include pharmaceutical compositions, edible gel mixes and compositions, dental compositions, foodstuffs, confections, condiments, chewing gum, cereal compositions, baked goods, dairy products, tabletop sweetener compositions, beverages and beverage products.

In a particular embodiment, a beverage comprising a rebaudioside M composition of the present invention is provided.

Additionally, methods for improving the aqueous solubility and/or delaying precipitation in a solution containing rebaudioside M is provided. In one embodiment, a supersaturated rebaudioside M composition can be prepared by heating a mixture of a rebaudioside M composition and water and then cooling the mixture.

DETAILED DESCRIPTION OF THE INVENTION

I. Disordered Crystalline Compositions

Figure 1:
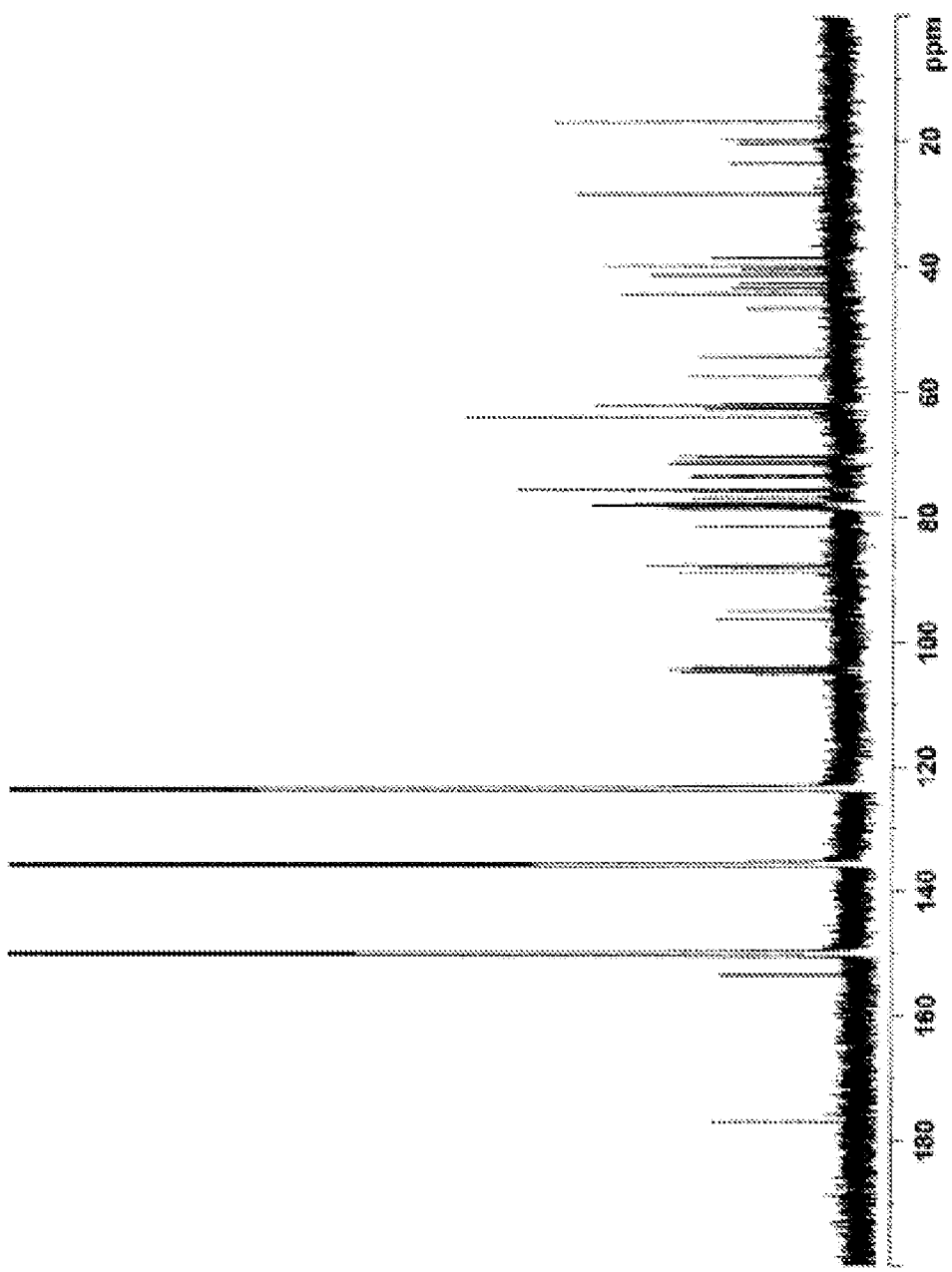
FIG. 1: illustrates the $^{13}$C NMR spectrum of rebaudioside M (150 MHz, $C_5D_5N$).

The present invention relates generally to rebaudioside M compositions with improved aqueous solubility and methods of preparing the same.

In one embodiment, the rebaudioside M composition is, or contains, a disordered crystalline composition comprising rebaudioside M and rebaudioside D.

In the compositions described herein, rebaudioside M and rebaudioside D can be provided independently, i.e. as purified substances, or together, e.g. as part of the same steviol glycoside mixture.

Both rebaudioside M and rebaudioside D can be quantified by their relative weight contribution in a mixture of steviol glycosides. The weight percent of rebaudioside M in the mixture of steviol glycosides can vary from about 50% to about 99%, such as, for example, about 50% to about 99%, about 60% to about 99%, about 70% to about 99%, about 75% to about 99%, about 80% to about 99% or about 85% to about 99%. In a preferred embodiment, the weight percent of rebaudioside M in the mixture of steviol glycosides is about 75% to about 90%. In a more particular embodiment, the weight percent of rebaudioside M in the mixture of steviol glycosides is about 80% to about 85%.

The weight percent of rebaudioside D in the mixture of steviol glycosides can vary from about 50% to about 1%, such as, for example, about 40% to about 1%, about 30% to about 1%, about 20% to about 1% or about 15% to about 1%. In a preferred embodiment, the weight percent of rebaudioside D in the mixture of steviol glycosides is about 25% to about 5%. In a more particular embodiment, the weight percent of rebaudioside D in the mixture of steviol glycosides is about 10% to about 15%.

The remainder of the composition is made of other (i.e., not rebaudioside M and rebaudioside D) steviol glycosides. Accordingly, the percentages of rebaudioside M and rebaudioside D, when added, need not equal 100%.

In one embodiment, the composition of the present invention comprises rebaudioside M and rebaudioside D, wherein rebaudioside M is about 75% to about 90% by weight and rebaudioside D is about 5% to about 25% by weight in a steviol glycoside mixture.

In another embodiment, the composition of the present invention comprises rebaudioside M and rebaudioside D, wherein rebaudioside M is about 80% to about 85% by weight and rebaudioside D is about 10% to about 15% by weight in a steviol glycoside mixture.

In a more particular embodiment, the composition of the present invention comprises rebaudioside M and rebaudioside D, wherein rebaudioside M is about 84% by weight and rebaudioside D is about 12% by weight in a steviol glycoside mixture.

As used herein, "disordered crystalline" refers to material that has long range order and crystalline structure unlike material in a fully amorphous state, but does not possess all of the characteristics typical of material that is in a fully crystalline state. For example, disordered crystalline material may be birefringent (indicating its crystallinity) but lack multiple sharp peaks in its powder X-ray diffraction pattern (as is typical of crystalline materials).

As used herein, "amorphous" refers to a state in which the material lacks long range order at the molecular level. Typically such materials do not give distinctive X-ray diffraction patterns, but rather exhibit halos. In contrast, crystalline material has a regular ordered internal structure at the molecular level and gives a distinctive X-ray diffraction pattern with defined peaks. Among other techniques, the presence of amorphous material may be confirmed by observation of a lack of birefringence when analyzed by polarized light microscopy.

Disordered crystalline material may be, or contain, mesophasic material. Mesophase is a state of matter between the liquid phase and the crystalline phase, characterized by partial or complete loss of positional order in crystalline solids, while retaining the orientational order of the constituent molecules. Mesophases are anisotropic and characterized by birefringence, which is absent in amorphous solids or isotropic liquids, but present in almost all crystalline solids. Exemplary types of mesophases include, but are not limited to, nematic, smectic, and columnar.

It can be difficult for one of skill it the art to ascertain whether a material is fully amorphous by X-ray diffraction pattern. Oftentimes marginal peaks indicating some crystallinity can be present but hidden in noise of the X-ray diffraction pattern. Such X-ray patterns are consistent with a sample that is disordered. For example, a material that is X-ray amorphous to one of skill in the art and shows birefringence can be labeled disordered crystalline material. "X-ray amorphous," as used herein, encompasses both clearly identifiable X-ray amorphous material and material that appears largely X-ray amorphous but has marginal peaks that are neither distinctive nor sharp. X-ray amorphous materials exhibit X-ray diffraction patterns characterized by broad halos and a lack of distinctive, sharp peaks (characteristic of crystallinity).

Accordingly, in one embodiment, a disordered crystalline composition comprising rebaudioside M and rebaudioside D is provided.

In one embodiment, a composition comprising about 75% to about 90% rebaudioside M and about 5% to about 25% rebaudioside D is provided that is X-ray amorphous and exhibits birefringence when analyzed by polarized light microscopy.

In another embodiment, a composition comprising about 80% to about 85% rebaudioside M and about 10% to about 15% rebaudioside D is provided that is X-ray amorphous and exhibits birefringence when analyzed by polarized light microscopy.

In a more particular embodiment, a composition comprising about 84% rebaudioside M and about 12% rebaudioside D is provided that is X-ray amorphous and exhibits birefringence when analyzed by polarized light microscopy.

In one embodiment, a composition comprising about 75% to about 90% rebaudioside M and about 5% to about 25% rebaudioside D is provided that is X-ray amorphous, exhibits birefringence when analyzed by polarized light microscopy and contains approximately 0.5% to about 10% water via Karl Fischer analysis.

In another embodiment, a composition comprising about 80% to about 85% rebaudioside M and about 10% to about 15% rebaudioside D is provided that is X-ray amorphous, exhibits birefringence when analyzed by polarized light microscopy and contains approximately 5% to about 10% water via Karl Fischer analysis.

In a more particular embodiment, a composition comprising about 84% rebaudioside M and about 12% rebaudioside D is provided that is X-ray amorphous, exhibits birefringence when analyzed by polarized light microscopy and contains approximately 7% to about 9% water via Karl Fischer analysis.

In one embodiment, a composition comprising about 75% to about 90% rebaudioside M and about 5% to about 25% rebaudioside D is provided that is X-ray amorphous, exhibits birefringence when analyzed by polarized light microscopy and displays a water weight loss of about 2% to about 8% following equilibration at 5% relative humidity.

In another embodiment, a composition comprising about 80% to about 85% rebaudioside M and about 10% to about 15% rebaudioside D is provided that is X-ray amorphous, exhibits birefringence when analyzed by polarized light microscopy and displays a water weight loss of about 3% to about 6% following equilibration at 5% relative humidity.

In a more particular embodiment, a composition comprising about 84% rebaudioside M and about 12% rebaudioside D is provided that is X-ray amorphous, exhibits birefringence when analyzed by polarized light microscopy and displays a water weight loss of about 5% following equilibration at 5% relative humidity.

In one embodiment, a composition comprising about 75% to about 90% rebaudioside M and about 5% to about 25% rebaudioside D is provided that is X-ray amorphous, exhibits birefringence when analyzed by polarized light microscopy and displays a water weight loss of about 2% to about 8% following equilibration at 5% relative humidity.

In another embodiment, a composition comprising about 80% to about 85% rebaudioside M and about 10% to about 15% rebaudioside D is provided that is X-ray amorphous, exhibits birefringence when analyzed by polarized light microscopy and displays a water weight loss of about 3% to about 6% following equilibration at 5% relative humidity.

In a more particular embodiment, a composition comprising about 84% rebaudioside M and about 12% rebaudioside D is provided that is X-ray amorphous, exhibits birefringence when analyzed by polarized light microscopy and displays a water weight loss of about 5% following equilibration at 5% relative humidity.

In one embodiment, a composition comprising about 75% to about 90% rebaudioside M and about 5% to about 25% rebaudioside D is provided that is X-ray amorphous, exhibits birefringence when analyzed by polarized light microscopy, contains approximately 0.5% to about 10% water via Karl Fischer analysis and displays a water weight loss of about 2% to about 8% following equilibration at 5% relative humidity.

In another embodiment, a composition comprising about 80% to about 85% rebaudioside M and about 10% to about 15% rebaudioside D is provided that is X-ray amorphous, exhibits birefringence when analyzed by polarized light microscopy, contains approximately 5% to about 10% water via Karl Fischer analysis and displays a water weight loss of about 3% to about 6% following equilibration at 5% relative humidity.

In a more particular embodiment, a composition comprising about 84% rebaudioside M and about 12% rebaudioside D is provided that is X-ray amorphous, exhibits birefringence when analyzed by polarized light microscopy, contains approximately 8% water via Karl Fischer analysis and displays a water weight loss of about 5% following equilibration at 5% relative humidity.

In one embodiment, a disordered crystalline composition comprising about 75% to about 90% rebaudioside M and about 5% to about 25% rebaudioside D is provided that is X-ray amorphous and exhibits birefringence when analyzed by polarized light microscopy.

In another embodiment, a disordered crystalline composition comprising about 80% to about 85% rebaudioside M and about 10% to about 15% rebaudioside D is provided that is X-ray amorphous and exhibits birefringence when analyzed by polarized light microscopy.

In a more particular embodiment, a disordered crystalline composition comprising about 84% rebaudioside M and about 12% rebaudioside D is provided that is X-ray amorphous and exhibits birefringence when analyzed by polarized light microscopy.

In one embodiment, a disordered crystalline composition comprising about 75% to about 90% rebaudioside M and about 5% to about 25% rebaudioside D is provided that is X-ray amorphous, exhibits birefringence when analyzed by polarized light microscopy and contains approximately 0.5% to about 10% water via Karl Fischer analysis.

In another embodiment, a disordered crystalline composition comprising about 80% to about 85% rebaudioside M and about 10% to about 15% rebaudioside D is provided that is X-ray amorphous, exhibits birefringence when analyzed by polarized light microscopy and contains approximately 5% to about 10% water via Karl Fischer analysis.

In a more particular embodiment, a disordered crystalline composition comprising about 84% rebaudioside M and about 12% rebaudioside D is provided that is X-ray amorphous, exhibits birefringence when analyzed by polarized light microscopy and contains approximately 8% water via Karl Fischer analysis.

In one embodiment, a disordered crystalline composition comprising about 75% to about 90% rebaudioside M and about 5% to about 25% rebaudioside D is provided that is X-ray amorphous, exhibits birefringence when analyzed by polarized light microscopy and displays a water weight loss of about 2% to about 8% following equilibration at 5% relative humidity. In another embodiment, a disordered crystalline composition comprising about 80% to about 85% rebaudioside M and about 10% to about 15% rebaudioside D is provided that is X-ray amorphous, exhibits birefringence when analyzed by polarized light microscopy and displays a water weight loss of about 3% to about 6% following equilibration at 5% relative humidity.

In a more particular embodiment, a disordered crystalline composition comprising about 84% rebaudioside M and about 12% rebaudioside D is provided that is X-ray amorphous, exhibits birefringence when analyzed by polarized light microscopy and displays a water weight loss of about 5% following equilibration at 5% relative humidity.

In one another embodiment, a disordered crystalline composition comprising about 75% to about 90% rebaudioside M and about 5% to about 25% rebaudioside D is provided that is X-ray amorphous, exhibits birefringence when analyzed by polarized light microscopy, contains approximately 0.5% to about 10% water via Karl Fischer analysis and displays a water weight loss of about 2% to about 8% following equilibration at 5% relative humidity.

In another embodiment, a disordered crystalline composition comprising about 80% to about 85% rebaudioside M and about 10% to about 15% rebaudioside D is provided that is X-ray amorphous, exhibits birefringence when analyzed by polarized light microscopy, contains approximately 5% to about 10% water via Karl Fischer analysis and displays a water weight loss of about 3% to about 6% following equilibration at 5% relative humidity.

In a more particular embodiment, a disordered crystalline composition comprising about 84% rebaudioside M and about 12% rebaudioside D is provided that is X-ray amorphous, exhibits birefringence when analyzed by polarized light microscopy, contains approximately 8% water via Karl Fischer analysis and displays a water weight loss of about 5% following equilibration at 5% relative humidity.

A material that appears X-ray amorphous to one of skill in the art and shows birefringence may contain some disordered crystalline material. For example, a material that is X-ray amorphous and shows birefringence may be a mixture of amorphous material and disordered crystalline material. Accordingly, in one embodiment, a composition comprises a mixture of (i) an amorphous composition comprising rebaudioside M and rebaudioside D and (ii) a disordered crystalline composition comprising rebaudioside M and rebaudioside D. In a particular embodiment, the composition comprises about 75% to about 90% rebaudioside M and about 5% to about 25% rebaudioside D, is X-ray amorphous and exhibits birefringence when analyzed by polarized light microscopy. In a more particular embodiment, the composition comprises about 80% to about 85% rebaudioside M and about 10% to about 15% rebaudioside D, is X-ray amorphous and exhibits birefringence when analyzed by polarized light microscopy.

In a still further particular embodiment, the composition comprises about 84% rebaudioside M and about 12% rebaudioside D, is X-ray amorphous and exhibits birefringence when analyzed by polarized light microscopy.

In one embodiment, a composition comprises about 75% to about 90% rebaudioside M and about 5% to about 25% rebaudioside D, is X-ray amorphous, exhibits birefringence when analyzed by polarized light microscopy and contains approximately 0.5% to about 10% water via Karl Fischer analysis.

In another embodiment, a composition comprises about 80% to about 85% rebaudioside M and about 10% to about 15% rebaudioside D, is X-ray amorphous, exhibits birefringence when analyzed by polarized light microscopy and contains approximately 5% to about 10% water via Karl Fischer analysis.

In a more particular embodiment, a composition comprises about 84% rebaudioside M and about 12% rebaudioside D, is X-ray amorphous, exhibits birefringence when analyzed by polarized light microscopy and contains approximately 8% water via Karl Fischer analysis.

In one embodiment, a composition comprises about 75% to about 90% rebaudioside M and about 5% to about 25% rebaudioside D, is X-ray amorphous, exhibits birefringence when analyzed by polarized light microscopy, contains approximately 0.5% to about 10% water via Karl Fischer analysis and displays a water weight loss of about 2% to about 8% following equilibration at 5% relative humidity.

In another embodiment, a composition comprises about 80% to about 85% rebaudioside M and about 10% to about 15% rebaudioside D, is X-ray amorphous, exhibits birefringence when analyzed by polarized light microscopy, contains approximately 5% to about 10% water via Karl Fischer analysis and displays a water weight loss of about 3% to about 6% following equilibration at 5% relative humidity.

In a more particular embodiment, a composition comprises about 84% rebaudioside M and about 12% rebaudioside D, is X-ray amorphous, exhibits birefringence when analyzed by polarized light microscopy, contains approximately 8% water via Karl Fischer analysis and displays a water weight loss of about 5% following equilibration at 5% relative humidity.

In still another embodiment, an amorphous composition comprising rebaudioside M and rebaudioside D is provided. Amorphous materials can be characterized by a number of methods known by those of skill in the art, as noted above.

The compositions of the present invention exhibit improved aqueous solubility. In certain embodiments, a composition of the present invention has a water solubility of about 0.3% (w/w) or greater, such as, for example, from about 0.3% to about 5%. In a more particular embodiment, a composition of the present invention has a water solubility from about 0.3% to about 4%, from about 0.3% to about 3%, from about 0.3% to about 2% or from about 0.3% to about 1%. The composition of the present invention may have a water solubility of about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9% or about 2.0%.

A number of methods are known in the art for determining aqueous solubility. In one such method, solubility can be determined by a solvent addition method in which a weighed sample is treated with aliquots of aqueous solvent. The mixture is generally vortexed and/or sonicated between additions to facilitate dissolution. Complete dissolution of the test material is determined by visual inspection. Solubility is calculated based on the total solvent used to provide complete dissolution.

Another method for determining solubility is by measuring the turbidity (NTU units) of a composition using a turbidimeter, such as HACH 2100 AN. In a typical experiment, a portion of the composition to be measured is added to a portion of of aqueous solvent (or visa versa) at room temperature. Turbidity is measured after waiting from 2-10 minutes to observe visual dissolution of the portion. Then, another portion of the composition is added, dissolution is observed and turbidity is measured again. This process is repeated until turbidity reaches exceeds beyond acceptable values, typically around 4 NTU-10 NTU. While turbidity measurements can be very useful in determining solubility, it will not detect solids collected on the bottom of a container. Accordingly, it is important to shake the container prior to determining turbidity and confirm a given turbidity measurement with visual inspection of dissolution.

In either method, the amount of composition added divided by the weight of water×100 provides the solubility in (% w/w). For example, if 0.18 g of sample can be dissolved in 30 mL of water, the solubility in water is 0.6%.

Solubility over time for a particular concentration of a composition can be measured using a similar procedure. In a typical experiment at 0.3% (w/w) concentration, 0.09 g of the composition to be measured is added to 30 mL of water at room temperature. The mixture is stirred for 5-45 minutes, at which point all of the sample should be dissolved, and then allowed to stand without disturbing. Turbidity is then measured at the desired time points to determine whether, and when, any material comes out of solution.

In certain embodiments, the compositions of the present invention have aqueous solubility of about 0.3%-0.5% and remain soluble for greater than about 5 hours, such as, for example, greater than about 10 hours, greater than about 15 hours, greater than about 20 hours or greater than about 24 hours. In a particular embodiment, the compositions of the present invention have aqueous solubility of about 0.3%-0.4% for about 1 day or longer.

A method for preparing compositions with improved aqueous solubility, i.e. those described above, comprises:
  (i) heating a mixture comprising solvent and a composition comprising rebaudioside M and rebaudioside D,
  (ii) maintaining the mixture at a temperature for a period of time to provide a concentrated solution,
  (iii) optionally decreasing the temperature, and
  (iv) removing solvent from the concentrated solution.

In one embodiment, the composition comprises about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

The rebaudioside M and rebaudioside D can be combined with the solvent in a ratio of about 1:1 to about 1:30, preferably about 1:9 (w/w).

The solvent can be any suitable aqueous solvent, organic solvent, or a combination of aqueous and organic solvents. In a particular embodiment, the solvent comprises at least one alcohol selected from the group consisting of methanol, ethanol, n-propanol, 1-butanol, 2-butanol or combinations thereof.

In a particular embodiment the solvent comprises water. In a more particular embodiment, the solvent is water.

In one embodiment, the mixture is heated in an airtight pressure vessel.

The mixture can be subject to gradient or step-wise heating to a temperature of between about 100° C. and about 125° C. In a particular embodiment, the mixture is heated to about 100° C. In another particular embodiment, the mixture is heated to about 121° C.

The mixture can be heated to between about 100° C. and about 125° C. over 1-2 hours.

A gradient of 2° C. per minute can be used to heat the mixture to about 121° C.

The mixture is then maintained at the temperature of between about 100° C. to about 125° C. for a period from about 5 minutes to about 1 hour, preferably about 10 minutes. In a particular embodiment, the temperature is maintained at 121° C. for 10 minutes.

Any method for removing solvent from the concentrated solution known to those of skill in the art can be utilized. Suitable methods for removal include, but are not limited to, spray-drying, rotary evaporation, lyophilization, tray drying, pervaporation, osmosis, reverse-osmosis, liquid extraction, absorption and adsorption. In a particular embodiment, solvent is removed from the concentrated solution by spray-drying. Note that, in some embodiments, not all of the solvent will be removed. Some solvent, particularly water, may be maintained in the final product.

In embodiments where the concentrated solution is cooled prior to spray-drying, the temperature can be lowered about 10° C. or more. In a particular embodiment, the concentrated solution is allowed to cool to from 121° C. to about 100° C. In another embodiment, the concentrated solution is allowed to cool to from about 100° C. to about 90° C. The temperature is allowed to decrease in a gradient or step-wise manner. In one embodiment, the temperature is decreased at a rate of about 2° C. per minute.

The heating, maintaining and, optionally, cooling steps provide a concentrated solution. The concentrated solution is then maintained at a temperature of about 100° C. for spray-drying. In an exemplary embodiment, a laboratory spray-drier can be used and operated from about 150° C. to about 200° C. inlet temperature and from about 50° C. to about 150° C. outlet temperature. In a particular embodiment, the laboratory spray-dryer is operated at about 175° C. inlet temperature and about 100° C. outlet temperature. In another embodiment, the laboratory spray-dryer is operated at about 140° C. inlet temperature and about 80° C. outlet temperature. Additional substances may be added during the process (i.e. in any of steps (i), (ii) or (iii), above). For example, a non-glycosidic fraction of *Stevia* can be added. Exemplary methods for spray-drying steviol glycosides and a non-glycosidic fraction of *Stevia* to improve solubility are provided in WO2012/082587 to Pure Circle, the contends of which are hereby incorporated by reference. In another embodiment, molasses can be added. Exemplary methods for spray-drying steviol glycosides and molasses to improve the solubility are provided in WO2012/082587 to Pure Circle. In still another embodiment, caramel can be added. Exemplary methods for spray-drying steviol glycosides and caramel to improved solubility are provided in WO2012/082587 to Pure Circle.

In a particular embodiment, the resulting composition is—or contains—disordered crystalline material, i.e. is X-ray amorphous and exhibits birefringence when analyzed by polarized light microscopy.

In yet another embodiment the resulting composition is—or contains—disordered crystalline material, i.e. is X-ray amorphous and exhibits birefringence when analyzed by polarized light microscopy, and contains approximately 0.5% to about 10% water via Karl Fischer analysis, such as, for example, from about 5% to about 10% or about 8%.

In still another embodiment, the resulting composition is—or contains—disordered crystalline material, i.e. is X-ray amorphous and exhibits birefringence when analyzed by polarized light microscopy, contains approximately 0.5% to about 10% water via Karl Fischer analysis, and displays a water weight loss of about 2% to about 8% following equilibration at 5% relative humidity, such as, for example, from about 3% to about 6% or about 5%.

In a more particular embodiment, a method for preparing a spray-dried composition with improved aqueous solubility comprises:

(i) heating a mixture comprising water and a composition comprising rebaudioside M and rebaudioside D to about 121° C.,
(ii) maintaining the mixture at about 121° C. for about 10 minutes,
(iii) decreasing the temperature to about 100° C. to provide a concentrated solution, and
(iv) spray-drying the concentrated solution with a laboratory spray-drier operating at about a 175° C. inlet temperature and about a 100° C. outlet temperature.

In one embodiment, the composition comprises about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

In a particular embodiment, the resulting composition is—or contains—disordered crystalline material, i.e. is X-ray amorphous and exhibits birefringence when analyzed with polarized light microscopy.

In yet another embodiment the resulting composition is—or contains—disordered crystalline material, i.e. is X-ray amorphous and exhibits birefringence when analyzed by polarized light microscopy, and contains approximately 0.5% to about 10% water via Karl Fischer analysis, such as, for example, from about 5% to about 10% or about 8%.

In still another embodiment, the resulting composition is—or contains—disordered crystalline material, i.e. is X-ray amorphous and exhibits birefringence when analyzed by polarized light microscopy, contains approximately 0.5% to about 10% water via Karl Fischer analysis, and displays a water weight loss of about 2% to about 8% following equilibration at 5% relative humidity, such as, for example, from about 3% to about 6% or about 5%.

In another embodiment, a method for preparing a spray-dried composition with improved aqueous solubility comprises:

(i) heating a mixture comprising water and a composition comprising rebaudioside M and rebaudioside D to about 100° C.,
(ii) maintaining the mixture at about 100° C., and
(iii) spray-drying the concentrated solution with a laboratory spray-drier operating at about a 140° C. inlet temperature and about a 80° C. outlet temperature.

In one embodiment, the composition comprises about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

In a particular embodiment, the resulting composition is—or contains—disordered crystalline material, i.e. is X-ray amorphous and exhibits birefringence when analyzed with polarized light microscopy.

In yet another embodiment the resulting composition is—or contains—disordered crystalline material, i.e. is X-ray amorphous and exhibits birefringence when analyzed by polarized light microscopy, and contains approximately 0.5% to about 10% water via Karl Fischer analysis, such as, for example, from about 5% to about 10% or about 8%.

In still another embodiment, the resulting composition is—or contains—disordered crystalline material, i.e. is X-ray amorphous and exhibits birefringence when analyzed by polarized light microscopy, contains approximately 0.5% to about 10% water via Karl Fischer analysis, and displays a water weight loss of about 2% to about 8% following equilibration at 5% relative humidity, such as, for example, about 3% to about 6% or about 5%.

II. Spray-Dried Compositions Containing Rebaudioside M, Rebaudioside D and Steviol Glycoside Mixtures and/or Rebaudioside B and/or NSF-02

In one embodiment, the present invention provides a method for improving the water solubility of a composition comprising rebaudioside M and rebaudioside D by (i) incorporating additional compound(s) selected from a steviol glycoside mixture and/or rebaudioside B and/or NSF-02 and (ii) spray-drying the mixture. Accordingly, in one embodiment, a rebaudioside M composition is, or contains, a spray-dried composition comprising:
 (i) rebaudioside M,
 (ii) rebaudioside D, and
 (iii) a substance selected from a steviol glycoside mixture, rebaudioside B, NSF-02 and a combination thereof.

The rebaudioside M and rebaudioside D can be anywhere on the continuum from crystalline to crystalline with severe disorder and amorphous. Crystalline forms of rebaudioside M include Form A and Form B, both of which are described in PCT/US2012/070564, the contents of which is incorporated herein by reference in its entirety.

Rebaudioside M and rebaudioside D can be provided independently, i.e. as purified substances, or together, e.g. as part of the same steviol glycoside mixture.

Both rebaudioside M and rebaudioside D can be quantified by their relative weight contribution in a mixture of steviol glycosides. The weight percent of rebaudioside M in the mixture of steviol glycosides can vary from about 50% to about 99%, such as, for example, about 50% to about 99%, about 60% to about 99%, about 70% to about 99%, about 75% to about 99%, about 80% to about 99% or about 85% to about 99%. In a preferred embodiment, the weight percent of rebaudioside M in the mixture of steviol glycosides is about 75% to about 90%. In a more particular embodiment, the weight percent of rebaudioside M in the mixture of steviol glycosides is about 80% to about 85%.

The weight percent of rebaudioside D in the mixture of steviol glycosides can vary from about 50% to about 1%, such as, for example, about 40% to about 1%, about 30% to about 1%, about 20% to about 1% or about 15% to about 1%. In a preferred embodiment, the weight percent of rebaudioside D in the mixture of steviol glycosides is about 25% to about 5%. In a more particular embodiment, the weight percent of rebaudioside D in the mixture of steviol glycosides is about 10% to about 15%.

In one embodiment, a spray-dried composition comprises rebaudioside M and rebaudioside D, wherein rebaudioside M is about 75% to about 90% by weight and rebaudioside D is about 5% to about 25% by weight in a steviol glycoside mixture.

In another embodiment, a spray-dried composition comprises rebaudioside M and rebaudioside D, wherein rebaudioside M is about 80% to about 85% by weight and rebaudioside D is about 10% to about 15% by weight in a steviol glycoside mixture.

In a more particular embodiment, a spray-dried composition comprises rebaudioside M and rebaudioside D, wherein rebaudioside M is about 84% by weight and rebaudioside D is about 12% by weight in a steviol glycoside mixture.

The steviol glycoside mixture generally contains at least one additional steviol glycoside other than rebaudioside D and rebaudioside M. Exemplary additional steviol glycosides include, but are not limited to, rebaudioside A, rebaudioside B, rebaudioside C, rebaudioside E, rebaudioside F, rebaudioside I, rebaudioside H, rebaudioside L, rebaudioside K, rebaudioside J, rebaudioside N, rebaudioside O, stevioside, steviolbioside, dulcoside A, rubusoside and combinations thereof.

In one embodiment, the steviol glycoside mixture contains at least two additional steviol glycosides. In another embodiment, the steviol glycoside mixture contains at least three additional steviol glycosides. In still another embodiment, the steviol glycoside mixture contains at least four additional steviol glycosides. In yet another embodiment, the steviol glycoside mixture contains at least five additional steviol glycosides.

The steviol glycoside mixture is, preferably, enriched in a particular steviol glycoside.

For example, the steviol glycoside mixture may comprise at least 50% rebaudioside A by weight on a dry basis. In another example, the steviol glycoside mixture may comprise at least 50% rebaudioside A, at least 60% rebaudioside A, at least 70% rebaudioside A, at least 80% rebaudioside A or at least 90% rebaudioside A by weight on a dry basis.

In another embodiment, the steviol glycoside mixture is enriched in rebaudioside B. The steviol glycoside mixture may comprise from about 1% to about 30% rebaudioside B by weight on a dry basis, such as, for example, at least 10% rebaudioside B, at least 20% rebaudioside B or at least 30% rebaudioside B by weight on a dry basis.

The steviol glycoside mixture can be obtained from a commercial source or prepared. In one embodiment, the steviol glycoside mixture is SG95RA50, a commercial steviol glycoside mixture that contains 95% total steviol glycoside content, 50% of which is rebaudioside A (available from Cargill). Other commercial steviol glycoside mixtures include SG95RA85, SG95RA60, SG95RA70, SG95RA80, SG95RA90

In certain embodiments, a spray-dried composition comprises:
 (i) rebaudioside M,
 (ii) rebaudioside D, and
 (iii) SG95RA50.

The weight ratio of rebaudioside M and rebaudioside D to steviol glycoside mixture can also vary in the spray-dried compositions. In one embodiment, the weight ratio of rebaudioside M and rebaudioside D to steviol glycoside mixture ranges from about 99:1 to about 1:1. In a more particular embodiment, the weight ratio of rebaudioside M and rebaudioside D to steviol glycoside mixture ranges from 20:1 to about 5:1, such as, for example, about 19:1, about 18:1, about 17:1, about 16;1, about 15:1, about 14:1, about 13:1, about 12:1, about 11:1, about 10:1, about 9:1, about 8:1, about 7:1, about 6:1, about 5:1.

In a particular embodiment, the weight ratio of rebaudioside M and rebaudioside D to steviol glycoside mixture is about 19:1.

In a more particular embodiment, the weight ratio of rebaudioside M and rebaudioside D to SG95RA50 is about 19:1.

In another particular embodiment, the weight ratio of rebaudioside M and rebaudioside D to steviol glycoside mixture is about 9:1.

In a more particular embodiment, the weight ratio of rebaudioside M and rebaudioside D to SG95RA50 is about 9:1.

In still another embodiment, a spray-dried composition comprises:
(i) rebaudioside M,
(ii) rebaudioside D, and
(iii) SG95RA50,
wherein the weight ratio of rebaudioside M and rebaudioside D to SG95RA50 is from about 20:1 to about 5:1.

Rebaudioside B can also be formulated with rebaudioside M and rebaudioside D in the spray-dried compositions to provide improved solubility. Rebaudioside B is provided as a highly purified compound, i.e. rebaudioside B is >97% of a steviol glycoside mixture or *Stevia* extract by weight. Accordingly, compositions where rebaudioside B as the substance in (iii) can be differentiated from compositions containing a steviol glycoside mixture as the substance in (iii), where the steviol glycoside mixture contains some portion of rebaudioside B. The weight ratio of rebaudioside M and rebaudioside D to rebaudioside B can also vary in the spray-dried compositions. In one embodiment, the weight ratio of rebaudioside M and rebaudioside D to rebaudioside B ranges from about 99:1 to about 1:1. In a more particular embodiment, the weight ratio of rebaudioside M and rebaudioside D to rebaudioside B ranges from about 20:1 to about 5:1, such as, for example, about 19:1, about 18:1, about 17:1, about 16;1, about 15:1, about 14:1, about 13:1, about 12:1, about 11:1, about 10:1, about 9:1, about 8:1, about 7:1, about 6:1 or about 5:1.

In one embodiment, a spray-dried composition comprises:
(i) rebaudioside M,
(ii) rebaudioside D, and
(iii) rebaudioside B.

In another embodiment, a spray-dried composition comprises:
(i) rebaudioside M,
(ii) rebaudioside D, and
(iii) rebaudioside B,
wherein the weight ratio of rebaudioside M and rebaudioside D to rebaudioside B is from about 20:1 to about 5:1.

NSF-02 can also be formulated with rebaudioside M and rebaudioside D in the spray-dried compositions to provide improved solubility. NSF-02 is a glycosylated steviol glycoside sweetness enhancer sold by PureCircle. The weight ratio of rebaudioside M and rebaudioside D to NSF-02 can also vary in the spray-dried compositions. In one embodiment, the weight ratio of rebaudioside M and rebaudioside D to NSF-02 ranges from about 99:1 to about 1:1. In a more particular embodiment, the weight ratio of rebaudioside M and rebaudioside D to NSF-02 ranges from about 20:1 to about 5:1, such as, for example, about 19:1, about 18:1, about 17:1, about 16;1, about 15:1, about 14:1, about 13:1, about 12:1, about 11:1, about 10:1, about 9:1, about 8:1, about 7:1, about 6:1 or about 5:1.

In a particular embodiment, the weight ratio of rebaudioside M and rebaudioside D to NSF-02 is about 19:1.

In another particular embodiment, the weight ratio of rebaudioside M and rebaudioside D to NSF-02 mixture is about 9:1.

In one embodiment, a spray-dried composition comprises:
(iv) rebaudioside M,
(v) rebaudioside D, and
(vi) NSF-02.

In another embodiment, a spray-dried composition comprises:
(iv) rebaudioside M,
(v) rebaudioside D, and
(vi) NSF-02,
wherein the weight ratio of rebaudioside M and rebaudioside D to NSF-02 is from about 20:1 to about 5:1.

In preferred embodiments, the spray-dried compositions exhibit improved aqueous solubility compared to the corresponding composition which is not spray-dried, i.e. a physical mixture. The spray-dried compositions have water solubility of about 0.3% (% w/w) or greater, such as, for example, from about 0.3% to about 5%, about 0.3% to about 4%, from about 0.3% to about 3%, from about 0.3% to about 2% or from about 0.3% to about 1%. In a more particular embodiment, the spray-dried compositions have a water solubility of about 0.4%, about 0.5%, about 0.6%, about 0.7%, about 0.8%, about 0.9%, about 1.0%, about 1.1% or about 1.2%.

In one embodiment, a spray-dried composition has a water solubility of 0.3% or greater, such as, for example, from about 0.3% to about 1.2% In another embodiment, a spray-dried composition has a water solubility of about 0.5% or greater, such as, for example, from about 0.5% to about 1.2%.

In another embodiment, a spray-dried composition has a water solubility of about 1.0% or greater, such as, for example, from about 1.0% to about 1.2% In certain embodiments, the spray-dried compositions of the present invention can be dissolved in water a concentration of about 0.3% and remain soluble (i.e. have turbidity measurement less than about 4 NTUs) for about 1 hour or longer, such as, for example, about 5 hours, about 10 hours, about 15 hours, about 20 hours or about 24 hours. In a particular embodiment, the spray-dried compositions remain dissolved at a concentration of 0.3% for about 1 day or longer.

In one embodiment, a spray-dried composition comprises:
(i) rebaudioside M,
(ii) rebaudioside D, and
(iii) a substance selected from a steviol glycoside mixture, rebaudioside B, NSF-02 and a combination thereof,
wherein the spray-dried composition remains soluble for one day or longer when dissolved in water at a concentration of about 0.3%.

The spray-dried compositions with improved water solubility described above can be prepared by the following method:
(i) heating a mixture comprising solvent and rebaudioside M, rebaudioside D and a substance selected from a steviol glycoside mixture, rebaudioside B, NSF-02 or a combination thereof,
(ii) maintaining the mixture at a temperature for a period of time to provide a concentrated solution, and
(iii) spray-drying the concentrated solution to provide a spray-dried composition with improved water solubility.

The rebaudioside M, rebaudioside D and steviol glycoside mixture and/or rebaudioside B and/or NSF-02 can be combined with the solvent in a ratio of about 1:1 to about 1:30, preferably from about 1:20 to about 1:25 (w/w).

The solvent can be any suitable aqueous solvent, organic solvent, or a combination of aqueous and organic solvents. In a particular embodiment, the solvent comprises at least one alcohol selected from the group consisting of methanol, ethanol, n-propanol, 1-butanol, 2-butanol or combinations thereof.

In a particular embodiment the solvent comprises water. In a more particular embodiment, the solvent is water.

The mixture can be subjected to gradient or step-wise heating to a temperature of about 100° C. over 1-2 hours. A gradient of about 1-2° C. per minute can be used to heat the mixture. The mixture is then maintained at about 100° C. for a period of time ranging from 0-120 minutes, such as, for example, 20-30 minutes, to remove solvent and provide a concentrated solution.

The concentrated solution can then be spray-dried by a laboratory spray-drier operating at about a 120-160° C. inlet temperature and about a 40-100° C. outlet temperature. In a more particular embodiment, the laboratory spray-drier is operated at about a 140° C. inlet temperature and a 80° C. outlet temperature.

In a more particular embodiment, a method for preparing spray-dried compositions with improved water solubility comprises:
(i) heating a mixture comprising rebaudioside M, rebaudioside D and a substance selected from a steviol glycoside mixture, rebaudioside B, NSF-02 or a combination thereof in water to about 100° C.,
(ii) maintaining the mixture at about 100° C. for 1-2 hours to provide a concentrated solution, and
(iii) spray-drying the concentrated solution with a laboratory spray-drier operating at a 140° C. inlet temperature and a 80° C. outlet temperature to provide a spray-dried composition with improved water solubility.

III. Compositions Comprising Rebaudioside M, Rebaudioside D and Surfactants, Polymers and/or Saponins Compositions containing rebaudioside M and rebaudioside D can be formulated with at least one additive selected from surfactants, polymers, saponins, carbohydrates, polyols, preservatives or a combination thereof. Spray-drying rebaudioside M and rebaudioside D-containing compositions with these additives provides improved water solubility and/or delays precipitation in a solution compared to the composition in the absence of the at least one additive. Any combination of surfactants, polymers, saponins, carbohydrates, polyols, preservatives are contemplated herein. Furthermore, more than one surfactant, polymer, saponin, carbohydrate, polyol or preservative can be used in the formulations disclosed herein.

Accordingly, in one embodiment a rebaudioside M composition is, or contains, rebaudioside M, rebaudioside D and at least one surfactant, polymer, saponin, carbohydrate, polyol, preservative or a combination thereof.

In one embodiment, the composition of the present invention comprises rebaudioside M, rebaudioside D and at least one surfactant. In another embodiment, the composition of the present invention comprises (i) a composition comprising rebaudioside M and rebaudioside D and (ii) at least one surfactant. The composition comprising rebaudioside M and rebaudioside D may contain about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

Including the at least one surfactant increases water solubility. The surfactant can be anionic, cationic, zwitterionic or non-ionic.

Anionic surfactants include, but are not limited to, sulfates, sulfonates, phosphate esters and carboxylates. Exemplary sulfates include ammonium laurel sulfate, sodium dodecylbenzenesulfonate, sodium dodecyl sulfate, sodium laureth sulfate (SLS), sodium myreth sulfate, dioctyl sodium sulfosuccinate (DOSS), perfluorooctanesulfonate (PFOS), perfluorobutanesulfonate, linear alkyl benzene sulfonates and sodium dodecyl sulfacte (SDS).

Exemplary carboxylates include alkyl carboxylates (soaps), such as sodium stearate. Other anionic surfactants include sodium cholate, sodium glycocholate, sodium taurodeoxycholate and sodium stearoyl lactylate.

Exemplary cationic surfactants include octenidine dihydrochloride, cetyl trimethylammonium bromide, cetylpyridinium chloride, benzalkonium chloride, benzethonium chloride, 5-bromo-5-nitro-1,3-dioxane, dimethyldioctadecylammonium chloride, choline chloride, cetrimonium bromide, hexadecyltrimethylammonium bromide and dioctdecyldimethylammonium bromide.

Exemplary non-ionic surfactants include, but are not limited to, polyoxyethylene glycol alkyl ethers, e.g. octaethylene glycol monododecyl ether and pentaethylene glycol monododecyl ether; polyoxypropylene glycol alkyl ethers; glucoside alkyl ethers, e.g. decyl glucoside, lauryl glucoside and octyl glucoside; polyoxyethylene glycol octylphenol ethers, e.g. Triton X-100; polyoxyethylene glycol alkylphenol ethers, e.g. nonoxynol-9; glycerol alkyl esters, e.g. glyceryl laurate; polysorbates. e.g., polyoxyethylene sorbitan monooleate (polysorbate 80), polysorbate 20, polysorbate 60; sorbitan alkyl esters; cocamide MEA; dodecyldimethyl amine oxide, poloxamer; polyethoxylated tallow amine; sucrose fatty acid esters, e.g. sucrose oleate esters, sucrose stearate esters, sucrose palmitate esters and sucrose laurate esters.

In one embodiment, a composition comprises rebaudioside M, rebaudioside D and at least one polymer. In a more particular embodiment, a composition of the present invention comprises (i) a composition comprising rebaudioside M and rebaudioside D and (ii) at least one polymer. The addition of the at least one polymer increases aqueous solubility. The polymer can be a synthetic polymer or a biopolymer. The composition comprising rebaudioside M and rebaudioside D may contain about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

Exemplary polymers include, but are not limited to, polyethylene glycol, e.g. PEG 200, PEG 300, PEG 400, PEG 600, PEG 1000, PEG 1500, PEG 2000, PEG 3000 PEG 4000, PEG 6000, PEG 8000, PEG 10000, PEG 20000; polyvinylpyrrolidone/vinyl acetate copolymer (PVPVA); povidone, e.g. PVPK29/32; sodium carboxymethyl cellulose (SCMC) and hydroxypropyl methylcellulose (HPMC).

Exemplary biopolymers include maltodextrin (DE between 3 and 20); carrageenan (kappa, iota and lambda), pectin, e.g. Beta Pectin; modified food starch, xanthan gum, acacia gum, guar gum, locust bean gum, tara gum, carob bean gum, gum karaya, gum tragacanth, polydextrose and cyclodextrin (α-, β- and γ-).

In one embodiment, a composition comprises rebaudioside M, rebaudioside D and at least one saponin. In a more particular embodiment, a composition of the present invention comprises (i) a composition comprising rebaudioside M and rebaudioside D and (ii) at least on saponin. The composition comprising rebaudioside M and rebaudioside D may contain about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

Formulation with the at least one saponin increases aqueous solubility.

Saponins are glycosidic natural plant products comprising an aglycone ring structure and one or more sugar moieties. The combination of the nonpolar aglycone and the water soluble sugar moiety gives saponins surfactant properties, which allow them to form a foam when shaken in an aqueous solution.

The saponins are grouped together based on several common properties. In particular, saponins are surfactants which display hemolytic activity and form complexes with cholesterol. Although saponins share these properties, they are structurally diverse. The types of aglycone ring structures forming the ring structure in saponins can vary greatly. Non-limiting examples of the types of aglycone ring structures in saponin for use in particular embodiments of the invention include steroids, triterpenoids, and steroidal alkaloids. Non-limiting examples of specific aglycone ring structures for use in particular embodiments of the invention include soyasapogenol A, soyasapogenol B and soyasopogenol E. The number and type of sugar moieties attached to the aglycone ring structure can also vary greatly. Non-limiting examples of sugar moieties for use in particular embodiments of the invention include glucose, galactose, glucuronic acid, xylose, rhamnose, and methylpentose moieties. Non-limiting examples of specific saponins for use in particular embodiments of the invention include group A acetyl saponin, group B acetyl saponin, and group E acetyl saponin. Other saponins include quillaja extract, such as Q-Natural-200.

Saponins can be found in a large variety of plants and plant products, and are especially prevalent in plant skins and barks where they form a waxy protective coating. Several common sources of saponins include soybeans, which have approximately 5% saponin content by dry weight, soapwort plants (*Saponaria*), the root of which was used historically as soap, as well as alfalfa, aloe, asparagus, grapes, chickpeas, yucca, and various other beans and weeds. Saponins may be obtained from these sources by using extraction techniques well known to those of ordinary skill in the art. A description of conventional extraction techniques can be found in U.S. Pat. Appl. No. 2005/0123662, the disclosure of which is expressly incorporated by reference.

In one embodiment, the composition of the present invention comprises rebaudioside M, rebaudioside D and at least one carbohydrate. In another embodiment, the composition of the present invention comprises (i) a composition comprising rebaudioside M and rebaudioside D and (ii) at least one carbohydrate. The composition comprising rebaudioside M and rebaudioside D may contain about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

Formulation with the at least one carbohydrate increases water solubility.

Exemplary carbohydrates include, but are not limited to, sucrose, fructose, glucose, erythritol, maltitol, lactitol, sorbitol, mannitol, xylitol, D-psicose, D-tagatose, leucrose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, allose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof.

In one embodiment, the composition of the present invention comprises rebaudioside M, rebaudioside D and at least one polyol. In another embodiment, the composition of the present invention comprises (i) a composition comprising rebaudioside M and rebaudioside D and (ii) at least one polyol. The composition comprising rebaudioside M and rebaudioside D may contain about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

Formulation with the at least one polyol increases water solubility.

The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Exemplary polyols include erythritol, maltitol, mannitol, sorbitol, lactitol, xylitol, isomalt, propylene glycol, glycerol (glycerin), threitol, galactitol, palatinose, reduced isomaltooligosaccharides, reduced xylo-oligosaccharides, reduced gentio-oligosaccharides, reduced maltose syrup, reduced glucose syrup, and sugar alcohols or any other carbohydrates capable of being reduced.

In one embodiment, the composition of the present invention comprises rebaudioside M, rebaudioside D and at least one preservative. In another embodiment, the composition of the present invention comprises (i) a composition comprising rebaudioside M and rebaudioside D and (ii) at least one preservative. The composition comprising rebaudioside M and rebaudioside D may contain about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

Formulation with the at least one preservative increases water solubility.

Exemplary preservatives include sulfites; e.g. sulfur dioxide, sodium bisulfite and potassium hydrogen sulfite; propionates, e.g., propionic acid, calcium propionate and sodium propionate; benzoates, e.g., sodium benzoate and benzoic acid; sorbates, e.g., potassium sorbate, sodium sorbate, calcium sorbate and sorbic acid; nitrites, e.g. sodium nitrite; nitrates, e.g., sodium nitrate; bacteriocins, e.g., nisin; ethanol; ozone; antienzymatics, e.g., ascorbic acid, citric acid, and metal chelating agents, e.g., ethylenediaminetetraacetic acid (EDTA). It is also contemplated that more that the compositions described herein can contain more than one surfactant, polymer, saponin, carbohydrate, polyol, preservative or a combination thereof.

In one embodiment, the composition of the present invention comprises (i) a composition comprising rebaudioside M and rebaudioside D and (ii) DL-α-Tocopherol methoxypolyethylene glycol succinate (TPGS). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D may comprise about 80% to about 85% rebaudioside M by weight and about 10% to about 15% rebaudioside D by weight in a steviol glycoside mixture. The weight ratio of the composition comprising rebaudioside M and rebaudioside D to TPGS can from about 10:1 to about 1:10, preferably from about 5:1 to about 1:1 (w/w).

In another embodiment, the composition of the present invention comprises (i) a composition comprising rebaudioside M and rebaudioside D, (ii) TPGS and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D may comprise about 80% to about 85% rebaudioside M by weight and about 10% to about 15% rebaudioside D by weight in a steviol glycoside mixture. The weight ratio of the composition comprising rebaudioside M and rebaudioside D to TPGS and SDS can be from about 1:2 to about 10:1.

In another embodiment, the composition of the present invention comprises (i) composition comprising rebaudioside M and rebaudioside D and (ii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to DOSS can be from about 1:1 to about 20:1.

In another embodiment, the composition of the present invention comprises (i) a composition comprising rebaudioside M and rebaudioside D, (ii) TPGS and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to TPGS and DOSS can be from about 10:1 to about 1:10, preferably from about 5:1 to about 1:1 (w/w).

In another embodiment, the composition of the present invention comprises (i) a composition comprising rebaudioside M and rebaudioside D, (ii) TPGS, (iii) DOSS and (iv) PVPA. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to TPGS, DOSS and PVPA can be from about 10:1 to about 1:10, preferably from about 5:1 to about 1:1 (w/w).

In another embodiment, the composition of the present invention comprises (i) a composition comprising rebaudioside M and rebaudioside D, (ii) TPGS, (iii) DOSS and PVPK29/32. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to TPGS, DOSS and PVPK29/32 can be from about 10:1 to about 1:10, preferably from about 5:1 to about 1:1 (w/w).

In another embodiment, the composition of the present invention comprises (i) a composition comprising rebaudioside M and rebaudioside D, (ii) TPGS, (iii) DOSS and HPMC. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to TPGS, DOSS and HPMC can be from about 10:1 to about 1:10, preferably from about 5:1 to about 1:1 (w/w).

In another embodiment, the composition of the present invention comprises (i) a composition comprising rebaudioside M and rebaudioside D, (ii) Tween 20 and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to Tween 20 and DOSS can be from can be from about 10:1 to about 1:10, preferably from about 5:1 to about 1:1 (w/w).

In another embodiment, the composition of the present invention comprises (i) a composition comprising rebaudioside M and rebaudioside D, (ii) Tween 80 and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to Tween 80 and DOSS can be from about 10:1 to about 1:10, preferably from about 5:1 to about 1:1 (w/w).

In still another embodiment, the composition of the present invention comprises (i) a composition comprising rebaudioside M and rebaudioside D and (ii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to SDS can be from about 10:1 to about 1:10, preferably from about 5:1 to about 1:1 (w/w).

In another embodiment, the composition of the present invention comprises (i) a composition comprising rebaudioside M and rebaudioside D, (ii) Tween 20 and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In another embodiment, the composition of the present invention comprises (i) a composition comprising rebaudioside M and rebaudioside D, (ii) Tween 80 and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In yet another embodiment, the composition of the present invention comprises (i) a composition comprising rebaudioside M and rebaudioside D and (ii) polysorbate 20 (Tween 20). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to polysorbate 20 can be from about 10:1 to about 1:10, preferably from about 5:1 to about 1:1 (w/w).

In one embodiment, the composition of the present invention comprises (i) a composition comprising rebaudioside M and rebaudioside D and (ii) polysorbate 80. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to polysorbate 80 can be from about 10:1 to about 1:10, preferably from about 5:1 to about 1:1 (w/w).

It is also contemplated that the compositions described herein can contain more than one surfactant. In one embodiment, the composition contains two surfactants. In another embodiment, the composition contains three or more surfactants.

In one embodiment, the composition of the present invention comprises (i) a composition comprising rebaudioside M and rebaudioside D and (ii) maltodextrin. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to maltodextrin can be from about 10:1 to about 1:10, preferably from about 5:1 to about 1:1 (w/w).

In another embodiment, the composition of the present invention comprises (i) a composition comprising rebaudioside M and rebaudioside D, (ii) maltodextrin and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to SDS can be from about 10:1 to about 1:10, preferably from about 5:1 to about 1:1 (w/w).

In another embodiment, the composition of the present invention comprises (i) a composition comprising rebaudioside M an rebaudioside D, (ii) maltodextrin and (iii) polysorbate 20 (Tween 20). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to maltodextrin and polysorbate 20 can be from about 10:1 to about 1:10, preferably from about 5:1 to about 1:1 (w/w).

In another embodiment, the composition of the present invention comprises (i) a composition comprising rebaudioside M and rebaudioside D, (ii) maltodextrin and (iii) DOSS.

In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to maltodextrin and DOSS can be from about 10:1 to about 1:10, preferably from about 5:1 to about 1:1 (w/w).

In another embodiment, the composition of the present invention comprises (i) a composition comprising rebaudioside M and rebaudioside D and (ii) xanthan gum. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to xanthan gum can be from about 10:1 to about 1:10, preferably from about 5:1 to about 1:1 (w/w).

In another embodiment, the composition of the present invention comprises (i) a composition comprising rebaudioside M and rebaudioside D, (ii) xanthan gum and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to xanthan gum and SDS can be from about 10:1 to about 1:10, preferably from about 5:1 to about 1:1 (w/w).

In another embodiment, the composition of the present invention comprises (i) a composition comprising rebaudioside M and rebaudioside D, (ii) xanthan gum, (iii) SDS and (iv) PVPK29/32. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In still another embodiment, the composition of the present invention comprises (i) a composition comprising rebaudioside M and rebaudioside D, (ii) xanthan gum and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to xanthan gum and DOSS can be from about 10:1 to about 1:10, preferably from about 5:1 to about 1:1 (w/w).

In yet another embodiment, the composition of the present invention comprises (i) a composition comprising rebaudioside M and rebaudioside D and (ii) carrageenan. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to carrageenan can be from about 10:1 to about 1:10, preferably from about 5:1 to about 1:1 (w/w). In yet another embodiment, the composition of the present invention comprises (i) a composition comprising rebaudioside M and rebaudioside D, (ii) carrageenan and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to carrageenan and SDS can be from about 10:1 to about 1:10, preferably from about 5:1 to about 1:1 (w/w).

In yet another embodiment, the composition of the present invention comprises (i) a composition comprising rebaudioside M and rebaudioside D (ii) carrageenan and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to carrageenan and DOSS can be from about 10:1 to about 1:10, preferably from about 5:1 to about 1:1 (w/w).

In yet another embodiment, the composition of the present invention comprises (i) a composition comprising rebaudioside M and rebaudioside D and (ii) beta pectin. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to beta pectin can be from about 10:1 to about 1:10, preferably from about 5:1 to about 1:1 (w/w).

In yet another embodiment, the composition of the present invention comprises (i) a composition comprising rebaudioside M and rebaudioside D, (ii) beta pectin and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to beta pectin and SDS can be from about 10:1 to about 1:10, preferably from about 5:1 to about 1:1 (w/w).

In yet another embodiment, the composition of the present invention comprises (i) a composition comprising rebaudioside M and rebaudioside D and (ii) modified food starch. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to modified food starch can be from about 10:1 to about 1:10, preferably from about 5:1 to about 1:1 (w/w).

In yet another embodiment, the composition of the present invention comprises (i) a composition comprising rebaudioside M and rebaudioside D, (ii) modified food starch and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to modified food starch and SDS can be from about 10:1 to about 1:10, preferably from about 5:1 to about 1:1 (w/w).

In yet another embodiment, the composition of the present invention comprises (i) a composition comprising rebaudioside M and rebaudioside D, (ii) modified food starch and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to modified food starch and DOSS can be from about 10:1 to about 1:10, preferably from about 5:1 to about 1:1 (w/w).

In yet another embodiment, the composition of the present invention comprises (i) a composition comprising rebaudioside M and rebaudioside D and (ii) acacia gum. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to acacia gum can be from about 10:1 to about 1:10, preferably from about 5:1 to about 1:1 (w/w).

In yet another embodiment, the composition of the present invention comprises (i) a composition comprising rebaudioside M and rebaudioside D, (ii) acacia gum and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to acacia gum and DOSS can be from about 10:1 to about 1:10, preferably from about 5:1 to about 1:1 (w/w).

In yet another embodiment, the composition of the present invention comprises (i) a composition comprising rebaudioside M and rebaudioside D and (ii) povidone. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to povidone can be from about 10:1 to about 1:10, preferably from about 5:1 to about 1:1 (w/w).

In yet another embodiment, the composition of the present invention comprises (i) a composition comprising rebaudioside M and rebaudioside D, (ii) povidone and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to povidone and DOSS can be from about 10:1 to about 1:10, preferably from about 5:1 to about 1:1 (w/w).

In yet another embodiment, the composition of the present invention comprises (i) a composition comprising rebaudioside M and rebaudioside D and (ii) polyethylene glycol (PEG). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to PEG can be from about 10:1 to about 1:10, preferably from about 5:1 to about 1:1 (w/w).

In yet another embodiment, the composition of the present invention comprises (i) a composition comprising rebaudioside M and rebaudioside D, (ii) polyethylene glycol (PEG) and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to polyethylene glycol and SDS can be from about 10:1 to about 1:10, preferably from about 5:1 to about 1:1 (w/w).

In yet another embodiment, the composition of the present invention comprises (i) a composition comprising rebaudioside M and rebaudioside D, (ii) polyethylene glycol (PEG) and (iii) polyvinylpyrrolidone/vinyl acetate copolymer (PVPVA). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the rebaudioside M composition comprises about 80% to about 85% rebaudioside M by weight and about 10% to about 15% rebaudioside D by weight in a steviol glycoside mixture. The weight ratio of the composition comprising rebaudioside M and rebaudioside D to polyethylene glycol (PEG) and polyvinylpyrrolidone/vinyl acetate copolymer (PVPVA) can be from about 10:1 to about 1:10, preferably from about 5:1 to about 1:1 (w/w).

In yet another embodiment, the composition of the present invention comprises (i) a composition comprising rebaudioside M and rebaudioside D and (ii) γ-cyclodextrin. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to γ-cyclodextrin can be from about 10:1 to about 1:10, preferably from about 5:1 to about 1:1 (w/w).

In yet another embodiment, the composition of the present invention comprises (i) a composition comprising rebaudioside M and rebaudioside D, (ii) γ-cyclodextrin and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to γ-cyclodextrin and SDS can be from about 10:1 to about 1:10, preferably from about 5:1 to about 1:1 (w/w).

In yet another embodiment, the composition of the present invention comprises (i) a composition comprising rebaudioside M and rebaudioside D, (ii) γ-cyclodextrin and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to γ-cyclodextrin and DOSS can be from about 10:1 to about 1:10, preferably from about 5:1 to about 1:1 (w/w).

In yet another embodiment, the composition of the present invention comprises (i) a composition comprising rebaudioside M and rebaudioside D, (ii) γ-cyclodextrin and (iii) polysorbate 20 (Tween 20). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to γ-cyclodextrin and polysorbate 20 can be from about 10:1 to about 1:10, preferably from about 5:1 to about 1:1 (w/w).

In yet another embodiment, the composition of the present invention comprises (i) a composition comprising rebaudioside M and rebaudioside D and (ii) sodium carboxymethyl cellulose (SCMC). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to SCMC can be from about 10:1 to about 1:10, preferably from about 5:1 to about 1:1 (w/w).

In yet another embodiment, the composition of the present invention comprises (i) a composition comprising rebaudioside M and rebaudioside D, (ii) SCMC and (iii) TPGS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to SCMC and TPGS can be from about 10:1 to about 1:10, preferably from about 5:1 to about 1:1 (w/w).

In yet another embodiment, the composition of the present invention comprises (i) a composition comprising rebaudioside M and rebaudioside D, (ii) TPGS, (iii) SCMC and (iv) acacia gum. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In yet another embodiment, the composition of the present invention comprises (i) a composition comprising rebaudioside M and rebaudioside D, (ii) TPGS, (iii) Acacia gum and (iv) Tween80. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In yet another embodiment, the composition of the present invention comprises (i) a composition comprising rebaudioside M and rebaudioside D, (ii) SCMC and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to SCMC and SDS can be from about 10:1 to about 1:10, preferably from about 5:1 to about 1:1 (w/w).

In yet another embodiment, the composition of the present invention comprises (i) a composition comprising rebaudioside M and rebaudioside D and (ii) polyvinylpyrrolidone/vinyl acetate (PVPVA). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to PVPVA can be from about 10:1 to about 1:10, preferably from about 5:1 to about 1:1 (w/w).

In yet another embodiment, the composition of the present invention comprises (i) a composition comprising rebaudioside M and rebaudioside D, (ii) PVPVA and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10 to about 15% rebaudioside D by weight in a steviol glycoside mixture. The weight ratio of the composition comprising rebaudioside M and rebaudioside D to PVPVA and SDS can be from about 10:1 to about 1:10, preferably from about 5:1 to about 1:1 (w/w).

In yet another embodiment, the composition of the present invention comprises (i) a composition comprising rebaudioside M and rebaudioside D, (ii) PVPVA and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to PVPVA and DOSS can be from about 10:1 to about 1:10, preferably from about 5:1 to about 1:1 (w/w).

In yet another embodiment, the composition of the present invention comprises (i) a composition comprising rebaudioside M and rebaudioside D and (ii) hydroxypropyl methylcellulose (HPMC). In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to HPMC can be from about 10:1 to about 1:10, preferably from about 5:1 to about 1:1 (w/w).

In yet another embodiment, the composition of the present invention comprises (i) a composition comprising rebaudioside M and rebaudioside D, (ii) HPMC and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to HPMC and SDS can be from about 10:1 to about 1:10, preferably from about 5:1 to about 1:1 (w/w).

In yet another embodiment, the composition of the present invention comprises (i) a composition comprising rebaudioside M and rebaudioside D, (ii) HPMC and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to HPMC and DOSS can be from about 10:1 to about 1:10, preferably from about 5:1 to about 1:1 (w/w).

In one embodiment, a composition of the present invention comprises (i) a composition comprising rebaudioside M and rebaudioside D and (ii) a saponin. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

The composition comprising rebaudioside M and rebaudioside D to saponin can be present in the composition in an weight ratio from can be from about 10:1 to about 1:10, preferably from about 5:1 to about 1:1 (w/w).

In another embodiment, a composition of the present invention comprises (i) a composition comprising rebaudioside M and rebaudioside D, (ii) a saponin and (iii) SDS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the rebaudioside M composition comprises about 80% to about 85% rebaudioside M by weight and about 10% to about 15% rebaudioside D by weight in a steviol glycoside mixture. The weight ratio of the composition comprising rebaudioside M and rebaudioside D to saponin and SDS can be from about 10:1 to about 1:10, preferably from about 5:1 to about 1:1 (w/w).

In another embodiment, a composition of the present invention comprises (i) a composition comprising rebaudioside M and rebaudioside D, (ii) a saponin and (iii) DOSS. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to saponin and DOSS can be from about 10:1 to about 1:10, preferably from about 5:1 to about 1:1 (w/w).

In another embodiment, a composition of the present invention comprises (i) a composition comprising rebaudioside M and rebaudioside D, (ii) a saponin and (iii) maltodextrin. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture. The weight ratio of the composition comprising rebaudioside M and rebaudioside D to saponin and maltodextrin can be from about 10:1 to about 1:10, preferably from about 5:1 to about 1:1 (w/w).

In another embodiment, a composition of the present invention comprises (i) a composition comprising rebaudioside M and rebaudioside D and (ii) potassium sorbate. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In another embodiment, a composition of the present invention comprises (i) a composition comprising rebaudioside M and rebaudioside D and (ii) sucrose. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

In another embodiment, a composition of the present invention comprises (i) a composition comprising rebaudioside M and rebaudioside D and (ii) glucose. In a particular embodiment, the composition comprising rebaudioside M and rebaudioside D may comprise about 75% to about 90% rebaudioside M by weight and about 5% to about 25% rebaudioside D by weight in a steviol glycoside mixture. In a more particular embodiment, the composition comprising rebaudioside M and rebaudioside D comprises about 80% to about 85% rebaudioside M by weight and about 10% to about 15% rebaudioside D by weight in a steviol glycoside mixture.

The compositions, described above, exhibit increased water solubility when they are prepared via spray-drying. The compositions can be prepared by:
(i) heating a mixture comprising (a) water, (b) a composition comprising rebaudioside M and rebaudioside D and (c) at least one additive selected from a surfactant, polymer, saponin, carbohydrate, polyol, preservative or a combination thereof;
(ii) maintaining the mixture at a temperature for a period of time to provide a concentrated solution, and
(iii) spray-drying the concentrated solution to provide a spray-dried composition with improved water solubility.

In one embodiment, the composition comprises about 75% to about 90% rebaudioside M and about 5% to about 25% rebaudioside D. In a more particular embodiment, the composition comprises about 80% to about 85% rebaudioside M and about 10% to about 15% rebaudioside D. In an even more particular embodiment, the composition comprises about 84% rebaudioside M and about 12% rebaudioside D.

The mixture can be subject to gradient or step-wise heating to a temperature between about 70° C. to about 100° C., such as, for example, from about 80° C. to about 90° C.

The duration and maintenance of heating can vary from about 10 minutes to 2 days, so long as the heating provides a concentrated solution suitable for spray-drying. Suitable durations of heating include, for example, from about 30 minutes to about 1 day, from about 1 hour to about 12 hours, from about 1 hour to about 6 hours, from about 1 hour to about 3 hours and from about 1 hour to about 2 hours. In a particular embodiment, the mixture is heated for about 1 hour.

Optionally, the temperature of the concentrated solution can be cooled prior to spray-drying. In such embodiments, the temperature can be lowered about 10° C. or more.

The heating, maintaining and, optionally, cooling steps provide a concentrated solution. The concentrated solution is then maintained at a temperature from about 80° C. to about 90° C. for spray-drying. In an exemplary embodiment, a laboratory spray-drier can be used and operated from about 120° C. to about 150° C. inlet temperature and from about 75° C. to about 120° C. outlet temperature.

The at least one additive selected from surfactant, polymer, saponin, carbohydrate, polyol or preservative can be any of those listed above. Particularly desirable additives that provide superior water solubility include a mixture of xanthan gum, SDS, PVPK29/39; maltodextrin; potassium sorbate; sucrose and glucose.

In a more particular embodiment, a method for preparing the spray-dried compositions with improved aqueous solubility comprises:
(i) heating a mixture comprising (a) water, (b) a composition comprising rebaudioside M and rebaudioside D and (c) at least one additive selected from a surfactant, polymer, saponin, carbohydrate, polyol or preservative or a combination thereof to about 80° C. to 90° C.;

(ii) maintaining the mixture at a temperature of about 80° C. to about 90° C. for a period of time to provide a concentrated solution, and (iii) spray-drying the concentrated solution to provide a spray-dried composition with improved water solubility.

The compositions described above exhibit improved aqueous solubility compared to the corresponding composition that does not contain the at least one surfactant, polymer, saponin or combination thereof. In preferred embodiments, the compositions have a water solubility of about 0.3% (w/w) or greater, such as, for example, from about 0.3% to about 5%. In a more particular embodiment, the composition has a water solubility from about 0.3% to about 4%, from about 0.3% to about 3%, from about 0.3% to about 2% or from about 0.3% to about 1%.

The composition may have a water solubility of about 0.3%, about 0.4%, about 0.5%, about 0.6%, about 0.7%, about 0.8%, about 0.9% or about 1.0%, about 1.1%, about 1.2%, about 1.3%, about 1.4%, about 1.5%, about 1.6%, about 1.7%, about 1.8%, about 1.9% or about 2.0%.

In certain embodiments, the compositions of the present invention can be dissolved in a concentration from about 0.3%-0.6% and remain soluble (i.e. have turbidity measurement about 4 NTUs) for greater than about 1 hour, such as, for example, greater than about 2 hours, greater than about 3 hours, greater than about 4 hours, greater than about 5 hours, greater than about 6 hours, greater than about 7 hours, greater than about 8 hours, greater than about 9 hours, greater than about 10 hours, greater than about 15 hours, greater than about 20 hours or greater than about 24 hours. In a particular embodiment, the compositions remain dissolved at a concentration of 0.3%-0.4% for about 1 day or longer, about 1 week or longer or about 2 weeks or longer.

IV. Rebaudioside M Compositions and Methods of Making the Same

"Rebaudioside M composition," as used herein, refers to a composition described in sections I-III, above. More particularly, rebaudioside M compositions include (i) disordered crystalline compositions comprising rebaudioside M and rebaudioside D, (ii) spray-dried compositions comprising rebaudioside M, rebaudioside D and steviol glycoside mixtures and/or rebaudioside B and/or NSF-02 and (iii) compositions comprising rebaudioside M, rebaudioside D and at least one surfactant, polymer, saponin, carbohydrate, polyol, preservative or a combination thereof. Each of these categories of rebaudioside M compositions can further include additional substances, for example, functional ingredients and/or additives.

"Sweetenable composition," as used herein, means a substance that is desirable to sweeten, including ingested substances and substances that are contacted with the mouth but not eaten or swallowed. Sweetenable compositions may be unsweetened, i.e. lack any sweetener component, or sweetened, i.e. already contain a sweetener component.

"Sweetened composition," as used herein, means substances that contain both a sweetenable composition and a sweetener or rebaudioside M composition.

For example, a beverage with no sweetener component is a type of sweetenable composition. A rebaudioside M composition can be added to the unsweetened beverage, thereby providing a sweetened beverage. The sweetened beverage is a type of sweetened composition.

In another example, a beverage that contains a non-rebaudioside M sweetener is a type of sweetenable composition. A rebaudioside M composition of the present invention can be added to a beverage that contains a non-rebaudioside M sweetener, thereby providing a sweetened beverage. The sweetened beverage is a type of sweetened composition.

A. Sweeteners

In some embodiments, rebaudioside M compositions may further contain one or more additional sweeteners. The additional sweetener can be any type of sweetener, for example, a natural, non-natural, or synthetic sweetener. In at least one embodiment, the at least one additional sweetener is chosen from natural sweeteners other than *Stevia* sweeteners. In another embodiment, the at least one additional sweetener is chosen from synthetic high potency sweeteners.

For example, the at least one additional sweetener may be a carbohydrate sweetener. Non-limiting examples of suitable carbohydrate sweeteners include sucrose, fructose, glucose, erythritol, maltitol, lactitol, sorbitol, mannitol, xylitol, D-psicose, D-tagatose, leucrose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, allose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof.

In other embodiments, the additional sweetener is a carbohydrate sweetener selected from the group consisting of glucose, fructose, sucrose, D-psicose and combinations thereof.

In yet other embodiments, the at least one additional sweetener is a synthetic sweetener. As used herein, the phrase "synthetic sweetener" refers to any composition which is not found naturally in nature and characteristically has a sweetness potency greater than sucrose, fructose, or glucose, yet has less calories. Non-limiting examples of synthetic high-potency sweeteners suitable for embodiments of this disclosure include sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof. The synthetic sweetener is present in the rebaudioside M composition in an amount effective to provide a concentration from about 0.3 ppm to about 3,500 ppm when present in a sweetened composition, such as, for example, a beverage.

In still other embodiments, the additional sweetener can be a natural high potency sweetener. Suitable natural high potency sweeteners include mogroside IV, mogroside V, mogroside VI, iso-mogroside V, grosmomoside, neomogroside, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I.

The natural high potency sweetener can be provided as a pure compound or, alternatively, as part of an extract. For example, rebaudioside A can be provided as a sole compound or as part of a *Stevia* extract. The natural high potency sweetener is present in the rebaudioside M composition in an amount effective to provide a concentration from about 0.1 ppm to about 3,000 ppm when present in a sweetened composition, such as, for example, a beverage.

The rebaudioside M compositions can be customized to obtain a desired calorie content. In one embodiment, the rebaudioside M composition is "full-calorie", such that the composition imparts the desired sweetness when added to a sweetenable composition (such as, for example, a beverage) and the sweetened composition has about 120 calories per 8 oz serving.

In another embodiment, the rebaudioside M composition is "mid-calorie", such that the composition imparts the desired sweetness when added to a sweetenable composition (such as, for example, as beverage) and less than about 60 calories per 8 oz serving.

In another embodiment, the rebaudioside M composition is "low-calorie", such that the composition imparts the desired sweetness when added to a sweetenable composition (such as, for example, as beverage) and the sweetened composition has less than about 40 calories per 8 oz serving.

In yet other embodiments, the rebaudioside M composition can be "zero-calorie", such that the composition imparts the desired sweetness when added to a sweetenable composition (such as, for example, a beverage) and the sweetened composition has less than about 5 calories per 8 oz. serving.

B. Additives

The rebaudioside M compositions of the present invention exhibit can optionally include additional additives, detailed herein below. In some embodiments, the rebaudioside M composition contains additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, emulsifiers, weighing agents, gums, colorants, flavonoids, alcohols, polymers, essential oils, anti-fungal agents and combinations thereof. In some embodiments, the additives act to improve the temporal and flavor profile of the sweetener(s) to provide a taste similar to sucrose.

Suitable carbohydrates include, but are not limited to, sucrose, fructose, glucose, erythritol, maltitol, lactitol, sorbitol, mannitol, xylitol, D-psicose, D-tagatose, leucrose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, allose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof.

Suitable polyols include erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced.

Suitable amino acids include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, omithine, methionine, carnitine, aminobutyric acid (α-, β-, and/or δ-isomers), glutamine, glutamic acid, hydroxyproline, taurine, norvaline, sarcosine, and their salt forms such as sodium or potassium salts or acid salts. The amino acid also may be in the D- or L-configuration and in the mono-, di-, or tri-form of the same or different amino acids. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid).

Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acids include poly-L-aspartic acid, poly-L-lysine (e.g., poly-L-α-lysine or poly-L-ε-lysine), poly-L-omithine (e.g., poly-L-α-omithine or poly-L-ε-omithine), poly-L-arginine, other polymeric forms of amino acids, and salt forms thereof (e.g., calcium, potassium, sodium, or magnesium salts such as L-glutamic acid mono sodium salt). The poly-amino acid also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-α-lysine with a MW of 1,500, MW of 6,000, MW of 25,200, MW of 63,000, MW of 83,000, or MW of 300,000.

In particular embodiments, the amino acid is present in the rebaudioside M composition in an amount effective to provide a concentration from about 10 ppm to about 50,000 ppm when present in a sweetened composition, such as, for example, a beverage. In another embodiment, the amino acid is present in the rebaudioside M composition in an amount effective to provide a concentration from about 1,000 ppm to about 10,000 ppm when present in a sweetened composition, such as, for example, from about 2,500 ppm to about 5,000 ppm or from about 250 ppm to about 7,500 ppm.

Suitable sugar acids include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotides include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

The nucleotide is present in the rebaudioside M composition in an amount effective to provide a concentration from about 5 ppm to about 1,000 ppm when present in sweetened composition, such as, for example, a beverage.

Suitable organic acids include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid, 3-hydroxybenzoic acid, 3,4,5-trihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid may be in either the D- or L-configuration.

Suitable organic acid salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acids described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In particular embodiments, the organic acid additive is present in the rebaudioside M composition in an amount from about 10 ppm to about 5,000 ppm.

Suitable inorganic acids include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

The inorganic acid is present in the rebaudioside M composition in an amount effective to provide a concentration from about 25 ppm to about 25,000 ppm when present in a sweetened composition, such as, for example, a beverage.

Suitable bitter compounds include, but are not limited to, caffeine, quinine, urea, bitter orange oil, naringin, quassia, and salts thereof.

The bitter compound is present in the rebaudioside M composition in an amount effective to provide a concentration from about 25 ppm to about 25,000 ppm when present in a sweetened composition, such as, for example, a beverage.

Suitable flavorants and flavoring ingredients include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Dohler™ Natural Flavoring Sweetness Enhancer K14323 (Dohler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, Calif., U.S.A.).

The flavorant is present in the rebaudioside M composition in an amount effective to provide a concentration from about 0.1 ppm to about 3,000 ppm when present in a sweetened composition, such as, for example, a beverage.

Suitable polymers include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

The polymer is present in the rebaudioside M composition in an amount effective to provide a concentration from about 30 ppm to about 2,000 ppm when present in a sweetened composition, such as, for example, a beverage.

Suitable protein or protein hydrolysates include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

The protein hydrosylate is present in the rebaudioside M composition in an amount effective to provide a concentration from about 200 ppm to about 50,000 ppm when present in a sweetened composition, such as, for example, a beverage.

Flavonoids are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

The flavonoid is present in the rebaudioside M composition in an amount effective to provide a concentration from about 0.1 ppm to about 1,000 ppm when present in sweetened composition, such as, for example, a beverage.

Suitable colorants include, but are not limited to, caramel color, natural colors such as Annatto, cochineal, betanin, turmeric, paprika, saffron, lycopene, elderberry juice, pandan, yellow No. 6, red No. 40, Green No. 3 and blue No. 1.

Suitable alcohols include, but are not limited to, ethanol. In particular embodiments, the alcohol is present in the rebaudioside M composition in an amount effective to provide a concentration from about 625 ppm to about 10,000 ppm when present in a sweetened composition, such as, for example, a beverage.

Suitable astringent compounds include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols). The astringent compound is present in the rebaudioside M composition in an amount effective to provide a concentration from about 10 ppm to about 5,000 ppm when present in a sweetened composition, such as, for example, a beverage.

Suitable essential oils include, but are not limited to, mustard oil, bitter orange and sweet orange, menthe arvensis, peppermint, cedarwood, lemon, *Eucalyptus globulus*, *Litsea cubeba*, clove and spearmint.

Suitable anti-fungal agents include, but are not limited to, natamycin, amphotericin, anidulafungin, caspofungin, fluconazole, itraconazole, micafungin, posaconazole, voriconazole, flucytosine.

Gymnemic acid may be present in said composition as an extract of the *Gymnema Sylvestre* plant. The gymnemic acid may be present in the rebaudioside M composition in an amount effective to provide a concentration from about 0.5 to about 500 ppm when present in a sweetened composition, such as, for example, a beverage.

Hydrocolloid can also present in a composition. In a particular embodiment, the composition contains hydrocolloid and erythritol.

Other additives include typical beverages additives, i.e. glycerol ester of wood rosin, coconut oil, brominated vegetable oil, carob bean gum, sucrose acetate isobutyrate, modified food starch, zinc gluconate and vitamin A palmitate.

C. Functional Ingredients

The rebaudioside M compositions or sweetened composition of the present invention can also contain one or more functional ingredients, which provide a real or perceived heath benefit to the composition. Functional ingredients include, but are not limited to, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

Antioxidant

In certain embodiments, the functional ingredient is at least one antioxidant. As used herein, the at least one antioxidant may comprise a single antioxidant or a plurality of antioxidants as a functional ingredient for the rebaudioside M composition or sweetened compositions provided herein. Generally, according to particular embodiments of this invention, the at least one antioxidant is present in the rebaudioside M composition or sweetened composition in an amount sufficient to promote health and wellness.

As used herein "antioxidant" refers to any substance which inhibits, suppresses, or reduces oxidative damage to cells and biomolecules. Without being bound by theory, it is believed that antioxidants inhibit, suppress, or reduce oxidative damage to cells or biomolecules by stabilizing free radicals before they can cause harmful reactions. As such, antioxidants may prevent or postpone the onset of some degenerative diseases.

Examples of suitable antioxidants for embodiments of this invention include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-α-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this invention include, but are not limited to, fruits, vegetables, tea, cocoa, chocolate, spices, herbs, rice, organ meats from livestock, yeast, whole grains, or cereal grains.

Particular antioxidants belong to the class of phytonutrients called polyphenols (also known as "polyphenolics"), which are a group of chemical substances found in plants, characterized by the presence of more than one phenol group per molecule. A variety of health benefits may derived from polyphenols, including prevention of cancer, heart disease, and chronic inflammatory disease and improved mental strength and physical strength, for example. Suitable polyphenols for embodiments of this invention, include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, and combinations thereof.

In particular embodiments, the antioxidant is a catechin such as, for example, epigallocatechin gallate (EGCG). Suitable sources of catechins for embodiments of this invention include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this invention include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is a anthocyanin. Suitable sources of anthocyanins for embodiments of this invention include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this invention include, but are not limited to, red apples, onions, kale, bog whortleberry, lingonberrys, chokeberry, cranberry, blackberry, blueberry, strawberry, raspberry, black currant, green tea, black tea, plum, apricot, parsley, leek, broccoli, chili pepper, berry wine, and ginkgo.

In some embodiments, the antioxidant is resveratrol. Suitable sources of resveratrol for embodiments of this invention include, but are not limited to, red grapes, peanuts, cranberry, blueberry, bilberry, mulberry, Japanese Itadori tea, and red wine.

In particular embodiments, the antioxidant is an isoflavone. Suitable sources of isoflavones for embodiments of this invention include, but are not limited to, soy beans, soy products, legumes, alfalfa spouts, chickpeas, peanuts, and red clover.

In some embodiments, the antioxidant is curcumin. Suitable sources of curcumin for embodiments of this invention include, but are not limited to, turmeric and mustard.

In particular embodiments, the antioxidant is chosen from punicalagin, ellagitannin or combinations thereof. Suitable sources of punicalagin and ellagitannin for embodiments of this invention include, but are not limited to, pomegranate, raspberry, strawberry, walnut, and oak-aged red wine.

In some embodiments, the antioxidant is a citrus flavonoid, such as hesperidin or naringin. Suitable sources of citrus flavonids, such as hesperidin or naringin, for embodiments of this invention include, but are not limited to, oranges, grapefruits, and citrus juices.

In particular embodiments, the antioxidant is chlorogenic acid. Suitable sources of chlorogenic acid for embodiments of this invention include, but are not limited to, green coffee, yerba mate, red wine, grape seed, red grape skin, purple grape skin, red grape juice, purple grape juice, apple juice, cranberry, pomegranate, blueberry, strawberry, sunflower, *Echinacea*, pycnogenol, and apple peel.

Dietary Fiber

In certain embodiments, the functional ingredient is at least one dietary fiber source. As used herein, the at least one dietary fiber source may comprise a single dietary fiber source or a plurality of dietary fiber sources as a functional ingredient for the rebaudioside M compositions or sweetened compositions provided herein. Generally, according to particular embodiments of this invention, the at least one dietary fiber source is present in the rebaudioside M composition or sweetened composition in an amount sufficient to promote health and wellness.

Numerous polymeric carbohydrates having significantly different structures in both composition and linkages fall within the definition of dietary fiber. Such compounds are well known to those skilled in the art, non-limiting examples of which include non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof.

Polysaccharides are complex carbohydrates composed of monosaccharides joined by glycosidic linkages. Non-starch polysaccharides are bonded with β-linkages, which humans are unable to digest due to a lack of an enzyme to break the β-linkages. Conversely, digestable starch polysaccharides generally comprise α(1-4) linkages.

Lignin is a large, highly branched and cross-linked polymer based on oxygenated phenylpropane units. Cellulose is a linear polymer of glucose molecules joined by a β(1-4) linkage, which mammalian amylases are unable to hydrolyze. Methylcellulose is a methyl ester of cellulose that is often used in foodstuffs as a thickener, and emulsifier. It is commercially available (e.g., Citrucel by GlaxoSmithKline, Celevac by Shire Pharmaceuticals).

Hemicelluloses are highly branched polymers consisting mainly of glucurono- and 4-O-methylglucuroxylans. β-Glucans are mixed-linkage (1-3), (1-4) β-D-glucose polymers found primarily in cereals, such as oats and barley. Pectins, such as beta pectin, are a group of polysaccharides composed primarily of D-galacturonic acid, which is methoxylated to variable degrees.

Gums and mucilages represent a broad array of different branched structures. Guar gum, derived from the ground endosperm of the guar seed, is a galactomannan. Guar gum is commercially available (e.g., Benefiber by Novartis AG). Other gums, such as gum arabic and pectins, have still different structures. Still other gums include xanthan gum, gellan gum, tara gum, psyllium seed husk gum, and locust been gum.

Waxes are esters of ethylene glycol and two fatty acids, generally occurring as a hydrophobic liquid that is insoluble in water.

Inulins comprise naturally occurring oligosaccharides belonging to a class of carbohydrates known as fructans. They generally are comprised of fructose units joined by β(2-1) glycosidic linkages with a terminal glucose unit. Oligosaccharides are saccharide polymers containing typically three to six component sugars. They are generally found either O- or N-linked to compatible amino acid side chains in proteins or to lipid molecules. Fructooligosaccharides are oligosaccharides consisting of short chains of fructose molecules.

Cyclodextrins are a family of cyclic oligosaccharides composed of α-D-glucopyranoside units. They can be produced from starch by means of enzymatic conversion. α-Cyclodextrin is a six sugar ring molecule, whereas β- and γ-cyclodextrins have seven and eight sugar ring molecules, respectively. Non-cyclic dextrins are known as maltodextrins and are generally easily digested by humans. Digestion resistant maltodextrin is commercially available (e.g., Fibersol-2 by ADM).

Food sources of dietary fiber include, but are not limited to, grains, legumes, fruits, and vegetables. Grains providing dietary fiber include, but are not limited to, oats, rye, barley, wheat. Legumes providing fiber include, but are not limited to, peas and beans such as soybeans. Fruits and vegetables providing a source of fiber include, but are not limited to, apples, oranges, pears, bananas, berries, tomatoes, green beans, broccoli, cauliflower, carrots, potatoes, celery. Plant foods such as bran, nuts, and seeds (such as flax seeds) are also sources of dietary fiber. Parts of plants providing dietary fiber include, but are not limited to, the stems, roots, leaves, seeds, pulp, and skin.

Although dietary fiber generally is derived from plant sources, indigestible animal products such as chitins are also classified as dietary fiber. Chitin is a polysaccharide composed of units of acetylglucosamine joined by β(1-4) linkages, similar to the linkages of cellulose.

Sources of dietary fiber often are divided into categories of soluble and insoluble fiber based on their solubility in water. Both soluble and insoluble fibers are found in plant foods to varying degrees depending upon the characteristics of the plant. Although insoluble in water, insoluble fiber has passive hydrophilic properties that help increase bulk, soften stools, and shorten transit time of fecal solids through the intestinal tract.

Unlike insoluble fiber, soluble fiber readily dissolves in water. Soluble fiber undergoes active metabolic processing via fermentation in the colon, increasing the colonic microflora and thereby increasing the mass of fecal solids. Fermentation of fibers by colonic bacteria also yields end-products with significant health benefits. For example, fermentation of the food masses produces gases and short-chain fatty acids. Acids produced during fermentation include butyric, acetic, propionic, and valeric acids that have various beneficial properties such as stabilizing blood glucose levels by acting on pancreatic insulin release and providing liver control by glycogen breakdown. In addition, fiber fermentation may reduce atherosclerosis by lowering cholesterol synthesis by the liver and reducing blood levels of LDL and triglycerides. The acids produced during fermentation lower colonic pH, thereby protecting the colon lining from cancer polyp formation. The lower colonic pH also increases mineral absorption, improves the barrier properties of the colonic mucosal layer, and inhibits inflammatory and adhesion irritants. Fermentation of fibers also may benefit the immune system by stimulating production of T-helper cells, antibodies, leukocytes, splenocytes, cytokinins and lymphocytes.

Fatty Acid

In certain embodiments, the functional ingredient is at least one fatty acid. As used herein, the at least one fatty acid may be single fatty acid or a plurality of fatty acids as a functional ingredient for the rebaudioside M composition or sweetened compositions provided herein. Generally, according to particular embodiments of this invention, the at least one fatty acid is present in the rebaudioside M composition or sweetened composition in an amount sufficient to promote health and wellness.

As used herein, "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, "long chain polyunsaturated fatty acid" refers to any polyunsaturated carboxylic acid or organic acid with a long aliphatic tail. As used herein, "omega-3 fatty acid" refers to any polyunsaturated fatty acid having a first double bond as the third carbon-carbon bond from the terminal methyl end of its carbon chain. In particular embodiments, the omega-3 fatty acid may comprise a long chain omega-3 fatty acid. As used herein, "omega-6 fatty acid" any polyunsaturated fatty acid having a first double bond as the sixth carbon-carbon bond from the terminal methyl end of its carbon chain.

Suitable omega-3 fatty acids for use in embodiments of the present invention can be derived from algae, fish, animals, plants, or combinations thereof, for example. Examples of suitable omega-3 fatty acids include, but are not limited to, linolenic acid, alpha-linolenic acid, eicosapentaenoic acid, docosahexaenoic acid, stearidonic acid, eicosatetraenoic acid and combinations thereof. In some embodiments, suitable omega-3 fatty acids can be provided in fish oils, (e.g., menhaden oil, tuna oil, salmon oil, bonito oil, and cod oil), microalgae omega-3 oils or combinations thereof. In particular embodiments, suitable omega-3 fatty acids may be derived from commercially available omega-3 fatty acid oils such as Microalgae DHA oil (from Martek, Columbia, Md.), OmegaPure (from Omega Protein, Houston, Tex.), Marinol C-38 (from Lipid Nutrition, Channahon, Ill.), Bonito oil and MEG-3 (from Ocean Nutrition, Dartmouth, NS), Evogel (from Symrise, Holzminden, Germany), Marine Oil, from tuna or salmon (from Arista Wilton, Conn.), OmegaSource 2000, Marine Oil, from menhaden and Marine Oil, from cod (from OmegaSource, RTP, NC).

Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid and combinations thereof.

Suitable esterified fatty acids for embodiments of the present invention may include, but are not limited to, monoacylglycerols containing omega-3 and/or omega-6 fatty acids, diacylglycerols containing omega-3 and/or omega-6 fatty acids, or triacylgycerols containing omega-3 and/or omega-6 fatty acids and combinations thereof.

Vitamin

In certain embodiments, the functional ingredient is at least one vitamin. As used herein, the at least one vitamin may be single vitamin or a plurality of vitamins as a functional ingredient for the rebaudioside M and sweetened compositions provided herein. Generally, according to particular embodiments of this invention, the at least one vitamin is present in the rebaudioside M composition or sweetened composition in an amount sufficient to promote health and wellness.

Vitamins are organic compounds that the human body needs in small quantities for normal functioning. The body uses vitamins without breaking them down, unlike other nutrients such as carbohydrates and proteins. To date, thirteen vitamins have been recognized, and one or more can be used in the rebaudioside M compositions and sweetened compositions herein. Suitable vitamins include, vitamin A, vitamin D, vitamin E, vitamin K, vitamin B1, vitamin B2, vitamin B3, vitamin B5, vitamin B6, vitamin B7, vitamin B9, vitamin B12, and vitamin C. Many of vitamins also have alternative chemical names, non-limiting examples of which are provided below.

| Vitamin | Alternative names |
|---|---|
| Vitamin A | Retinol |
| | Retinaldehyde |
| | Retinoic acid |
| | Retinoids |
| | Retinal |
| | Retinoic ester |
| Vitamin D | Calciferol |
| (vitamins | Cholecalciferol |
| D1-D5) | Lumisterol |
| | Ergocalciferol |
| | Dihydrotachysterol |
| | 7-dehydrocholesterol |
| Vitamin E | Tocopherol |
| | Tocotrienol |
| Vitamin K | Phylloquinone |
| | Naphthoquinone |
| Vitamin B1 | Thiamin |
| Vitamin B2 | Riboflavin |
| | Vitamin G |
| Vitamin B3 | Niacin |
| | Nicotinic acid |
| | Vitamin PP |
| Vitamin B5 | Pantothenic acid |
| Vitamin B6 | Pyridoxine |
| | Pyridoxal |
| | Pyridoxamine |
| Vitamin B7 | Biotin |
| | Vitamin H |
| Vitamin B9 | Folic acid |
| | Folate |
| | Folacin |
| | Vitamin M |
| | Pteroyl-L-glutamic acid |
| Vitamin B12 | Cobalamin |
| | Cyanocobalamin |
| Vitamin C | Ascorbic Acid |

Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methyl-methionine. As used herein, the term vitamin includes pseudo-vitamins.

In some embodiments, the vitamin is a fat-soluble vitamin chosen from vitamin A, D, E, K and combinations thereof.

In other embodiments, the vitamin is a water-soluble vitamin chosen from vitamin B1, vitamin B2, vitamin B3, vitamin B6, vitamin B12, folic acid, biotin, pantothenic acid, vitamin C and combinations thereof.

Glucosamine

In certain embodiments, the functional ingredient is glucosamine. Generally, according to particular embodiments of this invention, glucosamine is present in the rebaudioside M composition or sweetened composition in an amount sufficient to promote health and wellness.

Glucosamine, also called chitosamine, is an amino sugar that is believed to be an important precursor in the biochemical synthesis of glycosylated proteins and lipids. D-glucosamine occurs naturally in the cartilage in the form of glucosamine-6-phosphate, which is synthesized from fructose-6-phosphate and glutamine. However, glucosamine also is available in other forms, non-limiting examples of which include glucosamine hydrochloride, glucosamine sulfate, N-acetyl-glucosamine, or any other salt forms or combinations thereof. Glucosamine may be obtained by acid hydrolysis of the shells of lobsters, crabs, shrimps, or prawns using methods well known to those of ordinary skill in the art. In a particular embodiment, glucosamine may be derived from fungal biomass containing chitin, as described in U.S. Patent Publication No. 2006/0172392.

The rebaudioside M compositions or sweetened composition can further comprise chondroitin sulfate.

Mineral

In certain embodiments, the functional ingredient is at least one mineral. As used herein, the at least one mineral may be single mineral or a plurality of minerals as a functional ingredient for the rebaudioside M compositions or sweetened compositions provided herein. Generally, according to particular embodiments of this invention, the at least one mineral is present in the rebaudioside M composition or sweetened composition in an amount sufficient to promote health and wellness.

Minerals, in accordance with the teachings of this invention, comprise inorganic chemical elements required by living organisms. Minerals are comprised of a broad range of compositions (e.g., elements, simple salts, and complex silicates) and also vary broadly in crystalline structure. They may naturally occur in foods and beverages, may be added as a supplement, or may be consumed or administered separately from foods or beverages.

Minerals may be categorized as either bulk minerals, which are required in relatively large amounts, or trace minerals, which are required in relatively small amounts. Bulk minerals generally are required in amounts greater than or equal to about 100 mg per day and trace minerals are those that are required in amounts less than about 100 mg per day.

In particular embodiments of this invention, the mineral is chosen from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In other particular embodiments of this invention, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

The minerals embodied herein may be in any form known to those of ordinary skill in the art. For example, in a particular embodiment the minerals may be in their ionic form, having either a positive or negative charge. In another particular embodiment the minerals may be in their molecular form. For example, sulfur and phosphorous often are found naturally as sulfates, sulfides, and phosphates.

Preservative

In certain embodiments, the functional ingredient is at least one preservative. As used herein, the at least one preservative may be single preservative or a plurality of preservatives as a functional ingredient for the rebaudioside M compositions or sweetened composition provided herein. Generally, according to particular embodiments of this invention, the at least one preservative is present in the rebaudioside M composition or sweetened composition in an amount sufficient to promote health and wellness.

In particular embodiments of this invention, the preservative is chosen from antimicrobials, antioxidants, antienzymatics or combinations thereof. Non-limiting examples of antimicrobials include sulfites, propionates, benzoates, sorbates, nitrates, nitrites, bacteriocins, salts, sugars, acetic acid, dimethyl dicarbonate (DMDC), ethanol, and ozone.

According to a particular embodiment, the preservative is a sulfite. Sulfites include, but are not limited to, sulfur dioxide, sodium bisulfite, and potassium hydrogen sulfite.

According to another particular embodiment, the preservative is a propionate. Propionates include, but are not limited to, propionic acid, calcium propionate, and sodium propionate.

According to yet another particular embodiment, the preservative is a benzoate. Benzoates include, but are not limited to, sodium benzoate and benzoic acid.

In another particular embodiment, the preservative is a sorbate. Sorbates include, but are not limited to, potassium sorbate, sodium sorbate, calcium sorbate, and sorbic acid.

In still another particular embodiment, the preservative is a nitrate and/or a nitrite. Nitrates and nitrites include, but are not limited to, sodium nitrate and sodium nitrite.

In yet another particular embodiment, the at least one preservative is a bacteriocin, such as, for example, nisin.

In another particular embodiment, the preservative is ethanol.

In still another particular embodiment, the preservative is ozone.

Non-limiting examples of antienzymatics suitable for use as preservatives in particular embodiments of the invention include ascorbic acid, citric acid, and metal chelating agents such as ethylenediaminetetraacetic acid (EDTA).

Hydration Agent

In certain embodiments, the functional ingredient is at least one hydration agent. As used herein, the at least one hydration agent may be single hydration agent or a plurality of hydration agents as a functional ingredient for the rebaudioside M compositions or sweetened composition provided herein. Generally, according to particular embodiments of this invention, the at least one hydration agent is present in the rebaudioside M composition or sweetened composition in an amount sufficient to promote health and wellness.

Hydration products help the body to replace fluids that are lost through excretion. For example, fluid is lost as sweat in order to regulate body temperature, as urine in order to excrete waste substances, and as water vapor in order to exchange gases in the lungs. Fluid loss can also occur due to a wide range of external causes, non-limiting examples of which include physical activity, exposure to dry air, diarrhea, vomiting, hyperthermia, shock, blood loss, and hypotension. Diseases causing fluid loss include diabetes, cholera, gastroenteritis, shigellosis, and yellow fever. Forms of malnutrition that cause fluid loss include the excessive consumption of alcohol, electrolyte imbalance, fasting, and rapid weight loss.

In a particular embodiment, the hydration product is a composition that helps the body replace fluids that are lost during exercise. Accordingly, in a particular embodiment, the hydration product is an electrolyte, non-limiting examples of which include sodium, potassium, calcium, magnesium, chloride, phosphate, bicarbonate, and combinations thereof. Suitable electrolytes for use in particular embodiments of this invention are also described in U.S. Pat. No. 5,681,569, the disclosure of which is expressly incorporated herein by reference. In particular embodiments, the electrolytes are obtained from their corresponding water-soluble salts. Non-limiting examples of salts for use in particular embodiments include chlorides, carbonates, sulfates, acetates, bicarbonates, citrates, phosphates, hydrogen phosphates, tartates, sorbates, citrates, benzoates, or combinations thereof. In other embodiments, the electrolytes are provided by juice, fruit extracts, vegetable extracts, tea, or teas extracts.

In particular embodiments of this invention, the hydration product is a carbohydrate to supplement energy stores burned by muscles. Suitable carbohydrates for use in particular embodiments of this invention are described in U.S. Pat. Nos. 4,312,856, 4,853,237, 5,681,569, and 6,989,171, the disclosures of which are expressly incorporated herein by reference. Non-limiting examples of suitable carbohydrates include monosaccharides, disaccharides, oligosaccharides, complex polysaccharides or combinations thereof. Non-limiting examples of suitable types of monosaccharides for use in particular embodiments include trioses, tetroses, pentoses, hexoses, heptoses, octoses, and nonoses. Non-limiting examples of specific types of suitable monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, and sialose. Non-limiting examples of suitable disaccharides include sucrose, lactose, and maltose. Non-limiting examples of suitable oligosaccharides include saccharose, maltotriose, and maltodextrin. In other particular embodiments, the carbohydrates are provided by a corn syrup, a beet sugar, a cane sugar, a juice, or a tea.

In another particular embodiment, the hydration is a flavanol that provides cellular rehydration. Flavanols are a class of natural substances present in plants, and generally comprise a 2-phenylbenzopyrone molecular skeleton attached to one or more chemical moieties. Non-limiting examples of suitable flavanols for use in particular embodiments of this invention include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. Several common sources of flavanols include tea plants, fruits, vegetables, and flowers. In preferred embodiments, the flavanol is extracted from green tea.

In a particular embodiment, the hydration product is a glycerol solution to enhance exercise endurance. The ingestion of a glycerol containing solution has been shown to provide beneficial physiological effects, such as expanded blood volume, lower heart rate, and lower rectal temperature.

Probiotics/Prebiotics

In certain embodiments, the functional ingredient is chosen from at least one probiotic, prebiotic and combination thereof. As used herein, the at least one probiotic or prebiotic may be single probiotic or prebiotic or a plurality of probiotics or prebiotics as a functional ingredient for the rebaudioside M compositions or sweetened composition provided herein. Generally, according to particular embodiments of this invention, the at least one probiotic, prebiotic or combination thereof is present in the rebaudioside M composition or sweetened composition in an amount sufficient to promote health and wellness.

Probiotics, in accordance with the teachings of this invention, comprise microorganisms that benefit health when consumed in an effective amount. Desirably, probiotics beneficially affect the human body's naturally-occurring gastrointestinal microflora and impart health benefits apart from nutrition. Probiotics may include, without limitation, bacteria, yeasts, and fungi.

According to particular embodiments, the probiotic is a beneficial microorganisms that beneficially affects the human body's naturally-occurring gastrointestinal microflora and imparts health benefits apart from nutrition. Examples of probiotics include, but are not limited to, bacteria of the genus Lactobacilli, Bifidobacteria, Streptococci, or combinations thereof, that confer beneficial effects to humans.

In particular embodiments of the invention, the at least one probiotic is chosen from the genus Lactobacilli. Lactobacilli (i.e., bacteria of the genus *Lactobacillus*, hereinafter "L.") have been used for several hundred years as a food preservative and for promoting human health. Non-limiting examples of species of Lactobacilli found in the human intestinal tract include *L. acidophilus, L. casei, L. fermentum, L. saliva roes, L. brevis, L. leichmannii, L. plantarum, L. cellobiosus, L. reuteri, L. rhamnosus, L. GG, L. bulgaricus,* and *L. thermophilus*.

According to other particular embodiments of this invention, the probiotic is chosen from the genus Bifidobacteria. Bifidobacteria also are known to exert a beneficial influence on human health by producing short chain fatty acids (e.g., acetic, propionic, and butyric acids), lactic, and formic acids as a result of carbohydrate metabolism. Non-limiting species of Bifidobacteria found in the human gastrointestinal tract include *B. angulatum, B. animalis, B. asteroides, B. bifidum, B. boum, B. breve, B. catenulatum, B. choerinum, B. coryneforme, B. cuniculi, B. dentium, B. gallicum, B. gallinarum, B indicum, B. longum, B. magnum, B. merycicum, B. minimum, B. pseudocatenulatum, B. pseudolongum, B. psychraerophilum, B. pullorum, B. ruminantium, B. saeculare, B. scardovii, B. simiae, B. subtile, B. thermacidophilum, B. thermophilum, B. urinalis,* and *B.* sp.

According to other particular embodiments of this invention, the probiotic is chosen from the genus Streptococcus. *Streptococcus thermophilus* is a gram-positive facultative anaerobe. It is classified as lactic acid bacteria and commonly is found in milk and milk products, and is used in the production of yogurt. Other non-limiting probiotic species of this bacteria include *Streptococcus salivarus* and *Streptococcus cremoris*.

Probiotics that may be used in accordance with this invention are well-known to those of skill in the art. Non-limiting examples of foodstuffs comprising probiotics include yogurt, sauerkraut, kefir, kimchi, fermented vegetables, and other foodstuffs containing a microbial element that beneficially affects the host animal by improving the intestinal microbalance.

Prebiotics, in accordance with the teachings of this invention, are compositions that promote the growth of beneficial bacteria in the intestines. Prebiotic substances can be consumed by a relevant probiotic, or otherwise assist in keeping the relevant probiotic alive or stimulate its growth. When consumed in an effective amount, prebiotics also beneficially affect the human body's naturally-occurring gastrointestinal microflora and thereby impart health benefits apart from just nutrition. Prebiotic foods enter the colon and serve as substrate for the endogenous bacteria, thereby indirectly providing the host with energy, metabolic substrates, and essential micronutrients. The body's digestion and absorption of prebiotic foods is dependent upon bacterial metabolic activity, which salvages energy for the host from nutrients that escaped digestion and absorption in the small intestine.

Prebiotics, in accordance with the embodiments of this invention, include, without limitation, mucopolysaccharides, oligosaccharides, polysaccharides, amino acids, vitamins, nutrient precursors, proteins and combinations thereof.

According to a particular embodiment of this invention, the prebiotic is chosen from dietary fibers, including, without limitation, polysaccharides and oligosaccharides. These compounds have the ability to increase the number of probiotics, which leads to the benefits conferred by the probiotics. Non-limiting examples of oligosaccharides that are categorized as prebiotics in accordance with particular embodiments of this invention include fructooligosaccharides, inulins, isomalto-oligosaccharides, lactitol, lactosucrose, lactulose, pyrodextrins, soy oligosaccharides, transgalacto-oligosaccharides, and xylo-oligosaccharides.

According to other particular embodiments of the invention, the prebiotic is an amino acid. Although a number of known prebiotics break down to provide carbohydrates for probiotics, some probiotics also require amino acids for nourishment.

Prebiotics are found naturally in a variety of foods including, without limitation, bananas, berries, asparagus, garlic, wheat, oats, barley (and other whole grains), flaxseed, tomatoes, Jerusalem artichoke, onions and chicory, greens (e.g., dandelion greens, spinach, collard greens, chard, kale, mustard greens, turnip greens), and legumes (e.g., lentils, kidney beans, chickpeas, navy beans, white beans, black beans).

Weight Management Agent

In certain embodiments, the functional ingredient is at least one weight management agent. As used herein, the at least one weight management agent may be single weight management agent or a plurality of weight management agents as a functional ingredient for the rebaudioside M compositions or sweetened composition provided herein. Generally, according to particular embodiments of this invention, the at least one weight management agent is present in the rebaudioside M composition or sweetened composition in an amount sufficient to promote health and wellness.

As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" describes macronutrients, herbal extracts, exogenous hormones, anorectics, anorexigenics, pharmaceutical drugs, and combinations thereof, that when delivered in an effective amount, suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in an effective amount, activate or otherwise enhance a person's thermogenesis or metabolism.

Suitable weight management agents include macronutrient selected from the group consisting of proteins, carbohydrates, dietary fats, and combinations thereof. Consumption of proteins, carbohydrates, and dietary fats stimulates the release of peptides with appetite-suppressing effects. For example, consumption of proteins and dietary fats stimulates the release of the gut hormone cholecytokinin (CCK), while consumption of carbohydrates and dietary fats stimulates release of Glucagon-like peptide 1 (GLP-1).

Suitable macronutrient weight management agents also include carbohydrates. Carbohydrates generally comprise sugars, starches, cellulose and gums that the body converts into glucose for energy. Carbohydrates often are classified into two categories, digestible carbohydrates (e.g., monosaccharides, disaccharides, and starch) and non-digestible carbohydrates (e.g., dietary fiber). Studies have shown that non-digestible carbohydrates and complex polymeric carbohydrates having reduced absorption and digestibility in the small intestine stimulate physiologic responses that inhibit food intake. Accordingly, the carbohydrates embodied herein desirably comprise non-digestible carbohydrates or carbohydrates with reduced digestibility. Non-limiting examples of such carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein below.

In another particular embodiment weight management agent dietary fat. Dietary fats are lipids comprising combinations of saturated and unsaturated fatty acids. Polyunsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In a particular embodiment, the weight management agents is an herbal extract. Extracts from numerous types of plants have been identified as possessing appetite suppressant properties. Non-limiting examples of plants whose extracts have appetite suppressant properties include plants of the genus *Hoodia, Trichocaulon, Caralluma, Stapelia, Orbea, Asclepias*, and *Camelia*. Other embodiments include extracts derived from *Gymnema Sylvestre*, Kola Nut, Citrus Auran tium, Yerba Mate, *Griffonia Simplicifolia*, Guarana, myrrh, guggul Lipid, and black current seed oil.

The herbal extracts may be prepared from any type of plant material or plant biomass. Non-limiting examples of plant material and biomass include the stems, roots, leaves, dried powder obtained from the plant material, and sap or dried sap. The herbal extracts generally are prepared by extracting sap from the plant and then spray-drying the sap. Alternatively, solvent extraction procedures may be employed. Following the initial extraction, it may be desirable to further fractionate the initial extract (e.g., by column chromatography) in order to obtain an herbal extract with enhanced activity. Such techniques are well known to those of ordinary skill in the art.

In a particular embodiment, the herbal extract is derived from a plant of the genus *Hoodia*, species of which include *H. alstonii, H. currorii, H. dregei, H. flava, H. gordonii, H. jutatae, H. mossamedensis, H. officinalis, H. parviflorai, H. pedicellata, H. pilifera, H. ruschii*, and *H. triebneri*. *Hoodia* plants are stem succulents native to southern Africa. A sterol glycoside of *Hoodia*, known as P57, is believed to be responsible for the appetite-suppressant effect of the *Hoodia* species.

In another particular embodiment, the herbal extract is derived from a plant of the genus *Caralluma*, species of which include *C. indica, C. fimbriata, C. attenuate, C. tuberculata, C. edulis, C. adscendens, C. stalagmifera, C. umbellate, C. penicillata, C. russeliana, C. retrospicens, C. Arabica*, and *C. lasiantha*. *Carralluma* plants belong to the same Subfamily as *Hoodia*, Asclepiadaceae. *Caralluma* are small, erect and fleshy plants native to India having medicinal properties, such as appetite suppression, that generally are attributed to glycosides belonging to the pregnane group of glycosides, non-limiting examples of which include caratuberside A, caratuberside B, bouceroside I, bouceroside II, bouceroside III, bouceroside IV, bouceroside V, bouceroside VI, bouceroside VII, bouceroside VIII, bouceroside IX, and bouceroside X.

In another particular embodiment, the at least one herbal extract is derived from a plant of the genus *Trichocaulon*. *Trichocaulon* plants are succulents that generally are native to southern Africa, similar to *Hoodia*, and include the species *T. piliferum* and *T. officinale*.

In another particular embodiment, the herbal extract is derived from a plant of the genus *Stapelia* or *Orbea*, species of which include *S. gigantean* and *O. variegate*, respectively. Both *Stapelia* and *Orbea* plants belong to the same Subfamily as *Hoodia*, Asclepiadaceae. Not wishing to be bound by any theory, it is believed that they compounds exhibiting appetite suppressant activity are saponins, such as pregnane glycosides, which include stavarosides A, B, C, D, E, F, G, H, I, J, and K.

In another particular embodiment, the herbal extract is derived from a plant of the genus *Asclepias*. *Asclepias* plants also belong to the Asclepiadaceae family of plants. Non-limiting examples of *Asclepias* plants include *A. incarnate, A. curassayica, A. syriaca*, and *A. tuberose*.

Not wishing to be bound by any theory, it is believed that the extracts comprise steroidal compounds, such as pregnane glycosides and pregnane aglycones, having appetite suppressant effects.

In a particular embodiment, the weight management agent is an exogenous hormone having a weight management effect. Non-limiting examples of such hormones include CCK, peptide YY, ghrelin, bombesin and gastrin-releasing peptide (GRP), enterostatin, apolipoprotein A-IV, GLP-1, amylin, somastatin, and leptin.

In another embodiment, the weight management agent is a pharmaceutical drug. Non-limiting examples include phentenime, diethylpropion, phendimetrazine, sibutramine, rimonabant, oxyntomodulin, floxetine hydrochloride, ephedrine, phenethylamine, or other stimulants.

The at least one weight management agent may be utilized individually or in combination as a functional ingredient for the rebaudioside M compositions provided in this invention.

Osteoporosis Management Agent

In certain embodiments, the functional ingredient is at least one osteoporosis management agent. As used herein, the at least one osteoporosis management agent may be single osteoporosis management agent or a plurality of osteoporosis management agent as a functional ingredient for the rebaudioside M compositions or sweetened composition provided herein. Generally, according to particular embodiments of this invention, the at least one osteoporosis management agent is present in the rebaudioside M composition or sweetened composition in an amount sufficient to promote health and wellness.

Osteoporosis is a skeletal disorder of compromised bone strength, resulting in an increased risk of bone fracture. Generally, osteoporosis is characterized by reduction of the bone mineral density (BMD), disruption of bone microarchitecture, and changes to the amount and variety of non-collagenous proteins in the bone.

In certain embodiments, the osteoporosis management agent is at least one calcium source. According to a particular embodiment, the calcium source is any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof.

According to a particular embodiment, the osteoporosis management agent is a magnesium source. The magnesium source is any compound containing magnesium, including salt complexes, solubilized species, and other forms of magnesium. Non-limiting examples of magnesium sources include magnesium chloride, magnesium citrate, magnesium gluceptate, magnesium gluconate, magnesium hydroxide, magnesium picolate, magnesium sulfate, solubilized species thereof, and mixtures thereof. In another particular embodiment, the magnesium source comprises an amino acid chelated or creatine chelated magnesium.

In other embodiments, the osteoporosis agent is chosen from vitamins D, C, K, their precursors and/or beta-carotene and combinations thereof.

Numerous plants and plant extracts also have been identified as being effective in the prevention and treatment of osteoporosis. Not wishing to be bound by any theory, it is believed that the plants and plant extracts stimulates bone morphogenic proteins and/or inhibits bone resorption, thereby stimulating bone regeneration and strength. Non-limiting examples of suitable plants and plant extracts as osteoporosis management agents include species of the genus *Taraxacum* and *Amelanchier*, as disclosed in U.S. Patent Publication No. 2005/0106215, and species of the genus *Lindera, Artemisia, Acorus, Carthamus, Carum, Cnidium, Curcuma, Cyperus, Juniperus, Prunus, Iris, Cichorium, Dodonaea, Epimedium, Erigonoum, Soya, Mentha, Ocimum, Thymus, Tanacetum, Plantago, Spearmint, Bixa, Vitis, Rosemarinus, Rhus,* and *Anethum,* as disclosed in U.S. Patent Publication No. 2005/0079232.

Phytoestrogen

In certain embodiments, the functional ingredient is at least one phytoestrogen. As used herein, the at least one phytoestrogen may be single phytoestrogen or a plurality of phytoestrogens as a functional ingredient for the rebaudioside M compositions or sweetened composition provided herein. Generally, according to particular embodiments of this invention, the at least one phytoestrogen is present in the rebaudioside M composition or sweetened composition in an amount sufficient to promote health and wellness.

Phytoestrogens are compounds found in plants which can typically be delivered into human bodies by ingestion of the plants or the plant parts having the phytoestrogens. As used herein, "phytoestrogen" refers to any substance which, when introduced into a body causes an estrogen-like effect of any degree. For example, a phytoestrogen may bind to estrogen receptors within the body and have a small estrogen-like effect.

Examples of suitable phytoestrogens for embodiments of this invention include, but are not limited to, isoflavones, stilbenes, lignans, resorcyclic acid lactones, coumestans, coumestrol, equol, and combinations thereof. Sources of suitable phytoestrogens include, but are not limited to, whole grains, cereals, fibers, fruits, vegetables, black cohosh, agave root, black currant, black haw, chasteberries, cramp bark, dong quai root, devil's club root, false unicorn root, *Ginseng* root, groundsel herb, licorice, liferoot herb, motherwort herb, peony root, raspberry leaves, rose family plants, sage leaves, sarsaparilla root, saw palmetto berried, wild yam root, yarrow blossoms, legumes, soybeans, soy products (e.g., miso, soy flour, soymilk, soy nuts, soy protein isolate, tempen, or tofu) chick peas, nuts, lentils, seeds, clover, red clover, dandelion leaves, dandelion roots, fenugreek seeds, green tea, hops, red wine, flaxseed, garlic, onions, linseed, borage, butterfly weed, caraway, chaste tree, vitex, dates, dill, fennel seed, gotu kola, milk thistle, pennyroyal, pomegranates, southernwood, soya flour, tansy, and root of the kudzu vine (*Pueraria* root) and the like, and combinations thereof.

Isoflavones belong to the group of phytonutrients called polyphenols. In general, polyphenols (also known as "polyphenolics"), are a group of chemical substances found in plants, characterized by the presence of more than one phenol group per molecule.

Suitable phytoestrogen isoflavones in accordance with embodiments of this invention include genistein, daidzein, glycitein, biochanin A, formononetin, their respective naturally occurring glycosides and glycoside conjugates, mataresinol, secoisolariciresinol, enterolactone, enterodiol, textured vegetable protein, and combinations thereof.

Suitable sources of isoflavones for embodiments of this invention include, but are not limited to, soy beans, soy products, legumes, alfalfa spouts, chickpeas, peanuts, and red clover.

Long-Chain Primary Aliphatic Saturated Alcohol

In certain embodiments, the functional ingredient is at least one long chain primary aliphatic saturated alcohol. As used herein, the at least one long chain primary aliphatic saturated alcohol may be single long chain primary aliphatic saturated alcohol or a plurality of long chain primary aliphatic saturated alcohols as a functional ingredient for the rebaudioside M compositions or sweetened composition provided herein. Generally, according to particular embodiments of this invention, the at least one long chain primary aliphatic saturated alcohol is present in the rebaudioside M composition or sweetened composition in an amount sufficient to promote health and wellness.

Long-chain primary aliphatic saturated alcohols are a diverse group of organic compounds. The term alcohol refers to the fact these compounds feature a hydroxyl group (—OH) bound to a carbon atom. The term primary refers to the fact that in these compounds the carbon atom which is bound to the hydroxyl group is bound to only one other carbon atom. The term saturated refers to the fact that these compounds feature no carbon to carbon pi bonds. The term aliphatic refers to the fact that the carbon atoms in these compounds are joined together in straight or branched chains rather than in rings. The term long-chain refers to the fact that the number of carbon atoms in these compounds is at least 8 carbons).

Non-limiting examples of particular long-chain primary aliphatic saturated alcohols for use in particular embodiments of the invention include the 8 carbon atom 1-octanol, the 9 carbon 1-nonanol, the 10 carbon atom 1-decanol, the 12 carbon atom 1-dodecanol, the 14 carbon atom 1-tetradecanol, the 16 carbon atom 1-hexadecanol, the 18 carbon atom 1-octadecanol, the 20 carbon atom 1-eicosanol, the 22 carbon 1-docosanol, the 24 carbon 1-tetracosanol, the 26 carbon 1-hexacosanol, the 27 carbon 1-heptacosanol, the 28 carbon 1-octanosol, the 29 carbon 1-nonacosanol, the 30 carbon 1-triacontanol, the 32 carbon 1-dotriacontanol, and the 34 carbon 1-tetracontanol.

In a particularly desirable embodiment of the invention, the long-chain primary aliphatic saturated alcohols is policosanol. Policosanol is the term for a mixture of long-chain primary aliphatic saturated alcohols composed primarily of 28 carbon 1-octanosol and 30 carbon 1-triacontanol, as well as other alcohols in lower concentrations such as 22 carbon 1-docosanol, 24 carbon 1-tetracosanol, 26 carbon 1-hexacosanol, 27 carbon 1-heptacosanol, 29 carbon 1-nonacosanol, 32 carbon 1-dotriacontanol, and 34 carbon 1-tetracontanol.

Long-chain primary aliphatic saturated alcohols are derived from natural fats and oils. They may be obtained from these sources by using extraction techniques well known to those of ordinary skill in the art. Policosanols can be isolated from a variety of plants and materials including sugar cane (*Saccharum* officinarum), yams (e.g. *Dioscorea opposite*), bran from rice (e.g. *Oryza sativa*), and beeswax. Policosanols may be obtained from these sources by using extraction techniques well known to those of ordinary skill in the art. A description of such extraction techniques can be found in U.S. Pat. Appl. No. 2005/0220868, the disclosure of which is expressly incorporated by reference.

Phytosterols

In certain embodiments, the functional ingredient is at least one phytosterol, phytostanol or combination thereof. Generally, according to particular embodiments of this invention, the at least one phytosterol, phytostanol or combination thereof is present in the rebaudioside M composition or sweetened composition in an amount sufficient to promote health and wellness.

As used herein, the phrases "stanol", "plant stanol" and "phytostanol" are synonymous.

Plant sterols and stanols are present naturally in small quantities in many fruits, vegetables, nuts, seeds, cereals, legumes, vegetable oils, bark of the trees and other plant sources. Although people normally consume plant sterols and stanols every day, the amounts consumed are insufficient to have significant cholesterol-lowering effects or other health benefits. Accordingly, it would be desirable to supplement food and beverages with plant sterols and stanols.

Sterols are a subgroup of steroids with a hydroxyl group at C-3. Generally, phytosterols have a double bond within the steroid nucleus, like cholesterol; however, phytosterols also may comprise a substituted sidechain (R) at C-24, such as an ethyl or methyl group, or an additional double bond. The structures of phytosterols are well known to those of skill in the art.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. According to particular embodiments of this invention, non-limiting examples of phytosterols well known to those or ordinary skill in the art include 4-desmethylsterols (e.g., β-sitosterol, campesterol, stigmasterol, brassicasterol, 22-dehydrobrassicasterol, and A5-avenasterol), 4-monomethyl sterols, and 4,4-dimethyl sterols (triterpene alcohols) (e.g., cycloartenol, 24-methylenecycloartanol, and cyclobranol).

As used herein, the phrases "stanol", "plant stanol" and "phytostanol" are synonymous. Phytostanols are saturated sterol alcohols present in only trace amounts in nature and also may be synthetically produced, such as by hydrogenation of phytosterols. According to particular embodiments of this invention, non-limiting examples of phytostanols include β-sitostanol, campestanol, cycloartanol, and saturated forms of other triterpene alcohols.

Both phytosterols and phytostanols, as used herein, include the various isomers such as the α and β isomers (e.g., α-sitosterol and β-sitostanol, which comprise one of the most effective phytosterols and phytostanols, respectively, for lowering serum cholesterol in mammals).

The phytosterols and phytostanols of the present invention also may be in their ester form. Suitable methods for deriving the esters of phytosterols and phytostanols are well known to those of ordinary skill in the art, and are disclosed in U.S. Pat. Nos. 6,589,588, 6,635,774, 6,800,317, and U.S. Patent Publication Number 2003/0045473, the disclosures of which are incorporated herein by reference in their entirety. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

D. Tabletop Sweetener Compositions

The present invention also extends to tabletop sweetener compositions comprising the rebaudioside M compositions disclosed herein. The tabletop composition can further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, and mixtures thereof. Additionally, in accordance with still other embodiments of the invention, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refer to any composition which assists in content uniformity and uniform dissolution. In accordance with particular embodiments, non-limiting examples of anti-caking agents include cream of tartar, calcium silicate, silicon dioxide, microcrystalline cellulose (Avicel, FMC BioPolymer, Philadelphia, Pa.), and tricalcium phosphate. In one embodiment, the anti-caking agents are present in the tabletop functional sweetener composition in an amount from about 0.001 to about 3% by weight of the tabletop functional sweetener composition.

The tabletop sweetener compositions can be packaged in any form known in the art. Non-limiting forms include, but are not limited to, powder form, granular form, packets, tablets, sachets, pellets, cubes and solids.

In one embodiment, the tabletop sweetener composition is a single-serving (portion control) packet comprising a dry-blend. Dry-blend formulations generally may comprise powder or granules. Although the tabletop sweetener composition may be in a packet of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar (~8 g). The amount of Rebaudioside M in a dry-blend tabletop sweetener formulation can vary. In a particular embodiment, a dry-blend tabletop sweetener formulation may contain Rebaudioside M in an amount from about 1% (w/w) to about 10% (w/w) of the tabletop sweetener composition.

Solid tabletop sweetener embodiments include cubes and tablets. A non-limiting example of conventional cubes is equivalent in size to a standard cube of granulated sugar, which is approximately $2.2 \times 2.2 \times 2.2$ cm$^3$ and weigh approximately 8 g. In one embodiment, a solid tabletop sweetener is in the form of a tablet or any other form known to those skilled in the art.

E. Sweetened Compositions

The rebaudioside M compositions can be incorporated in any known sweetenable composition, such as, for example, pharmaceutical compositions, edible gel mixes and compositions, dental compositions, foodstuffs (confections, condiments, chewing gum, cereal compositions, baked goods, dairy products, and tabletop sweetener compositions), beverages and beverage products to provide a sweetened composition.

In one embodiment, a sweetened composition comprises a sweetenable composition and a rebaudioside M composition. The sweetened compositions can optionally include additives, sweeteners, functional ingredients and combinations thereof.

Pharmaceutical Compositions

In one embodiment, a pharmaceutical composition contains a pharmaceutically active substance and a rebaudioside M composition. The rebaudioside M composition can be present as an excipient material in the pharmaceutical composition, which can mask a bitter or otherwise undesirable taste of a pharmaceutically active substance or another excipient material.

The pharmaceutical composition may be in the form of a tablet, a capsule, an aerosol, a powder, an effervescent tablet or powder, a syrup, an emulsion, a suspension, a solution, or any other form for providing the pharmaceutical composition to a patient. In particular embodiments, the pharmaceutical composition may be in a form for oral administration, buccal administration, sublingual administration, or any other route of administration as known in the art.

As referred to herein, "pharmaceutically active substance" means any drug, drug formulation, medication, prophylactic agent, therapeutic agent, or other substance having biological activity. As referred to herein, "excipient material" refers to any inactive substance used as a vehicle for an active ingredient, such as any material to facilitate handling, stability, dispersibility, wettability, and/or release kinetics of a pharmaceutically active substance.

Suitable pharmaceutically active substances include, but are not limited to, medications for the gastrointestinal tract or digestive system, for the cardiovascular system, for the central nervous system, for pain or consciousness, for musculo-skeletal disorders, for the eye, for the ear, nose and oropharynx, for the respiratory system, for endocrine problems, for the reproductive system or urinary system, for contraception, for obstetrics and gynecology, for the skin, for infections and infestations, for immunology, for allergic disorders, for nutrition, for neoplastic disorders, for diagnostics, for euthanasia, or other biological functions or disorders. Examples of suitable pharmaceutically active substances for embodiments of the present invention include, but are not limited to, antacids, reflux suppressants, antiflatulents, antidopaminergics, proton pump inhibitors, cytoprotectants, prostaglandin analogues, laxatives, antispasmodics, antidiarrhoeals, bile acid sequestrants, opioids, beta-receptor blockers, calcium channel blockers, diuretics, cardiac glycosides, antiarrhythmics, nitrates, antianginals, vasoconstrictors, vasodilators, peripheral activators, ACE inhibitors, angiotensin receptor blockers, alpha blockers, anticoagulants, heparin, antiplatelet drugs, fibrinolytics, anti-hemophilic factors, haemostatic drugs, hypolipidaemic agents, statins, hynoptics, anaesthetics, antipsychotics, antidepressants, anti-emetics, anticonvulsants, antiepileptics, anxiolytics, barbiturates, movement disorder drugs, stimulants, benzodiazepines, cyclopyrrolones, dopamine antagonists, antihistamines, cholinergics, anticholinergics, emetics, cannabinoids, analgesics, muscle relaxants, antibiotics, aminoglycosides, anti-virals, anti-fungals, anti-inflammatories, anti-gluacoma drugs, sympathomimetics, steroids, ceruminolytics, bronchodilators, NSAIDS, antitussive, mucolytics, decongestants, corticosteroids, androgens, antiandrogens, gonadotropins, growth hormones, insulin, antidiabetics, thyroid hormones, calcitonin, diphosponates, vasopressin analogues, alkalizing agents, quinolones, anticholinesterase, sildenafil, oral contraceptives, Hormone Replacement Therapies, bone regulators, follicle stimulating hormones, luteinizings hormones, gamolenic acid, progestogen, dopamine agonist, oestrogen, prostaglandin, gonadorelin, clomiphene, tamoxifen, diethylstilbestrol, antileprotics, antituberculous drugs, antimalarials, anthelmintics, antiprotozoal, antiserums, vaccines, interferons, tonics, vitamins, cytotoxic drugs, sex hormones, aromatase inhibitors, somatostatin inhibitors, or similar type substances, or combinations thereof. Such components generally are recognized as safe (GRAS) and/or are U.S. Food and Drug Administration (FDA)-approved.

The pharmaceutically active substance is present in the pharmaceutical composition in widely ranging amounts depending on the particular pharmaceutically active agent being used and its intended applications. An effective dose of any of the herein described pharmaceutically active substances can be readily determined by the use of conventional techniques and by observing results obtained under analogous circumstances. In determining the effective dose, a number of factors are considered including, but not limited to: the species of the patient; its size, age, and general health; the specific disease involved; the degree of involvement or the severity of the disease; the response of the individual patient; the particular pharmaceutically active agent administered; the mode of administration; the bioavailability characteristic of the preparation administered; the dose regimen selected; and the use of concomitant medication. The pharmaceutically active substance is included in the pharmaceutically acceptable carrier, diluent, or excipient in an amount sufficient to deliver to a patient a therapeutic amount of the pharmaceutically active substance in vivo in the absence of serious toxic effects when used in generally acceptable amounts. Thus, suitable amounts can be readily discerned by those skilled in the art.

According to particular embodiments of the present invention, the concentration of pharmaceutically active substance in the pharmaceutical composition will depend on absorption, inactivation, and excretion rates of the drug as well as other factors known to those of skill in the art. It is to be noted that dosage values will also vary with the severity of the condition to be alleviated. It is to be further understood that for any particular subject, specific dosage regimes should be adjusted over time according to the individual need and the professional judgment of the person administering or supervising the administration of the pharmaceutical compositions, and that the dosage ranges set forth herein are exemplary only and are not intended to limit the scope or practice of the claimed composition. The pharmaceutically active substance may be administered at once, or may be divided into a number of smaller doses to be administered at varying intervals of time.

The pharmaceutical composition also may comprise other pharmaceutically acceptable excipient materials. Examples of suitable excipient materials for embodiments of this invention include, but are not limited to, antiadherents, binders (e.g., microcrystalline cellulose, gum tragacanth, or gelatin), coatings, disintegrants, fillers, diluents, softeners, emulsifiers, flavoring agents, coloring agents, adjuvants, lubricants, functional agents (e.g., nutrients), viscosity modifiers, bulking agents, glidiants (e.g., colloidal silicon dioxide) surface active agents, osmotic agents, diluents, or any other non-active ingredient, or combinations thereof. For example, the pharmaceutical compositions of the present invention may include excipient materials selected from the group consisting of calcium carbonate, coloring agents, whiteners, preservatives, and flavors, triacetin, magnesium stearate, sterotes, natural or artificial flavors, essential oils, plant extracts, fruit essences, gelatins, or combinations thereof.

The excipient material of the pharmaceutical composition may optionally include other artificial or natural sweeteners, bulk sweeteners, or combinations thereof. Bulk sweeteners include both caloric and non-caloric compounds. In a particular embodiment, the additive functions as the bulk sweetener. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, and mixtures thereof. In particular embodiments, the bulk sweetener is present in the pharmaceutical composition in widely ranging amounts depending on the degree of sweetness desired. Suitable amounts of both sweeteners would be readily discernable to those skilled in the art.

Edible Gel Mixes and Edible Gel Compositions

In one embodiment, an edible gel or edible gel mix comprises a rebaudioside M composition. The edible gel or edible gel mixes can optionally include additives, functional ingredients or combinations thereof.

Edible gels are gels that can be eaten. A gel is a colloidal system in which a network of particles spans the volume of a liquid medium. Although gels mainly are composed of liquids, and thus exhibit densities similar to liquids, gels have the structural coherence of solids due to the network of particles that spans the liquid medium. For this reason, gels generally appear to be solid, jelly-like materials. Gels can be used in a number of applications. For example, gels can be used in foods, paints, and adhesives.

Non-limiting examples of edible gel compositions for use in particular embodiments include gel desserts, puddings, jellies, pastes, trifles, aspics, marshmallows, gummy candies, or the like. Edible gel mixes generally are powdered or granular solids to which a fluid may be added to form an edible gel composition. Non-limiting examples of fluids for use in particular embodiments include water, dairy fluids, dairy analogue fluids, juices, alcohol, alcoholic beverages, and combinations thereof. Non-limiting examples of dairy fluids which may be used in particular embodiments include milk, cultured milk, cream, fluid whey, and mixtures thereof. Non-limiting examples of dairy analogue fluids which may be used in particular embodiments include, for example, soy milk and non-dairy coffee whitener. Because edible gel products found in the marketplace typically are sweetened with sucrose, it is desirable to sweeten edible gels with an alternative sweetener in order provide a low-calorie or non-calorie alternative.

As used herein, the term "gelling ingredient" denotes any material that can form a colloidal system within a liquid medium. Non-limiting examples of gelling ingredients for use in particular embodiments include gelatin, alginate, carageenan, gum, pectin, konjac, agar, food acid, rennet, starch, starch derivatives, and combinations thereof. It is well known to those having ordinary skill in the art that the amount of gelling ingredient used in an edible gel mix or an edible gel composition varies considerably depending on a number of factors, such as the particular gelling ingredient used, the particular fluid base used, and the desired properties of the gel.

Non-limiting examples of other ingredients for use in particular embodiments include a food acid, a salt of a food acid, a buffering system, a bulking agent, a sequestrant, a cross-linking agent, one or more flavors, one or more colors, and combinations thereof. Non-limiting examples of food acids for use in particular embodiments include citric acid, adipic acid, fumaric acid, lactic acid, malic acid, and combinations thereof. Non-limiting examples of salts of food acids for use in particular embodiments include sodium salts of food acids, potassium salts of food acids, and combinations thereof. Non-limiting examples of bulking agents for use in particular embodiments include raftilose, isomalt, sorbitol, polydextrose, maltodextrin, and combinations thereof. Non-limiting examples of sequestrants for use in particular embodiments include calcium disodium ethylene tetra-acetate, glucono delta-lactone, sodium gluconate, potassium gluconate, ethylenediaminetetraacetic acid (EDTA), and combinations thereof. Non-limiting examples of cross-linking agents for use in particular embodiments include calcium ions, magnesium ions, sodium ions, and combinations thereof.

Dental Compositions

In one embodiment, a dental composition comprises a rebaudioside M composition.

The dental composition may be in the form of any oral composition used in the oral cavity such as mouth freshening agents, gargling agents, mouth rinsing agents, toothpaste, tooth polish, dentifrices, mouth sprays, teeth-whitening agent, dental floss, and the like, for example.

As referred to herein, "active dental substance" means any composition which can be used to improve the aesthetic appearance and/or health of teeth or gums or prevent dental caries. As referred to herein, "base material" refers to any inactive substance used as a vehicle for an active dental substance, such as any material to facilitate handling, stability, dispersibility, wettability, foaming, and/or release kinetics of an active dental substance.

Suitable active dental substances for embodiments of this invention include, but are not limited to, substances which remove dental plaque, remove food from teeth, aid in the elimination and/or masking of halitosis, prevent tooth decay, and prevent gum disease (i.e., Gingiva). Examples of suitable active dental substances for embodiments of the present invention include, but are not limited to, anticaries drugs, fluoride, sodium fluoride, sodium monofluorophosphate, stannos fluoride, hydrogen peroxide, carbamide peroxide (i.e., urea peroxide), antibacterial agents, plaque removing agents, stain removers, anticalculus agents, abrasives, baking soda, percarbonates, perborates of alkali and alkaline earth metals, or similar type substances, or combinations thereof. Such components generally are recognized as safe (GRAS) and/or are U.S. Food and Drug Administration (FDA)-approved.

According to particular embodiments of the invention, the active dental substance is present in the dental composition in an amount ranging from about 50 ppm to about 3000 ppm of the dental composition. Generally, the active dental substance is present in the dental composition in an amount effective to at least improve the aesthetic appearance and/or health of teeth or gums marginally or prevent dental caries. For example, a dental composition comprising a toothpaste may include an active dental substance comprising fluoride in an amount of about 850 to 1,150 ppm.

The dental composition also may comprise other base materials. Examples of suitable base materials for embodiments of this invention include, but are not limited to, water, sodium lauryl sulfate or other sulfates, humectants, enzymes, vitamins, herbs, calcium, flavorings (e.g., mint, bubblegum, cinnamon, lemon, or orange), surface-active agents, binders, preservatives, gelling agents, pH modifiers, peroxide activators, stabilizers, coloring agents, or similar type materials, and combinations thereof.

The base material of the dental composition may optionally include other artificial or natural sweeteners, bulk sweeteners, or combinations thereof. Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, and mixtures thereof.

Generally, the amount of bulk sweetener present in the dental composition ranges widely depending on the particular embodiment of the dental composition and the desired degree of sweetness. Those of ordinary skill in the art will readily ascertain the appropriate amount of bulk sweetener. In particular embodiments, the bulk sweetener is present in the dental composition in an amount in the range of about 0.1 to about 5 weight percent of the dental composition.

According to particular embodiments of the invention, the base material is present in the dental composition in an amount ranging from about 20 to about 99 percent by weight of the dental composition. Generally, the base material is present in an amount effective to provide a vehicle for an active dental substance.

Generally, the amount of the sweetener varies widely depending on the nature of the particular dental composition and the desired degree of sweetness. Those skilled in the art will be able to discern a suitable amount of sweetener for such dental composition. In a particular embodiment, rebaudioside M is present in the dental composition in an amount in the range of about 1 to about 5,000 ppm of the dental composition and the at least one additive is present in the dental composition in an amount in the range of about 0.1 to about 100,000 ppm of the dental composition.

Foodstuffs include, but are not limited to, confections, condiments, chewing gum, cereal, baked goods, and dairy products.

Confections

In one embodiment, the present invention is a confection comprising a rebaudioside M composition.

As referred to herein, "confection" can mean a sweet, a lollie, a confectionery, or similar term. The confection generally contains a base composition component and a sweetener component. The confection may be in the form of any food that is typically perceived to be rich in sugar or is typically sweet. According to particular embodiments of the present invention, the confections may be bakery products such as pastries; desserts such as yogurt, jellies, drinkable jellies, puddings, Bavarian cream, blancmange, cakes, brownies, mousse and the like, sweetened food products eaten at tea time or following meals; frozen foods; cold confections, e. g. types of ice cream such as ice cream, ice milk, lacto-ice and the like (food products in which sweeteners and various other types of raw materials are added to milk products, and the resulting mixture is agitated and frozen), and ice confections such as sherbets, dessert ices and the like (food products in which various other types of raw materials are added to a sugary liquid, and the resulting mixture is agitated and frozen); general confections, e. g., baked confections or steamed confections such as crackers, biscuits, buns with bean-jam filling, halvah, alfajor, and the like; rice cakes and snacks; table top products; general sugar confections such as chewing gum (e.g. including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans, fudge, toffee, taffy, Swiss milk tablet, licorice candy, chocolates, gelatin candies, marshmallow, marzipan, divinity, cotton candy, and the like; sauces including fruit flavored sauces, chocolate sauces and the like; edible gels; cremes including butter cremes, flour pastes, whipped cream and the like; jams including strawberry jam, marmalade and the like; and breads including sweet breads and the like or other starch products, and combinations thereof.

As referred to herein, "base composition" means any composition which can be a food item and provides a matrix for carrying the sweetener component.

Suitable base compositions for embodiments of this invention may include flour, yeast, water, salt, butter, eggs, milk, milk powder, liquor, gelatin, nuts, chocolate, citric acid, tartaric acid, fumaric acid, natural flavors, artificial flavors, colorings, polyols, sorbitol, isomalt, maltitol, lactitol, malic acid, magnesium stearate, lecithin, hydrogenated glucose syrup, glycerine, natural or synthetic gum, starch, and the like, and combinations thereof. Such components generally are recognized as safe (GRAS) and/or are U.S. Food and Drug Administration (FDA)-approved. According to particular embodiments of the invention, the base composition is present in the confection in an amount ranging from about 0.1 to about 99 weight percent of the confection.

The base composition of the confection may optionally include other artificial or natural sweeteners, bulk sweeteners, or combinations thereof. Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, and mixtures thereof. Generally, the amount of bulk sweetener present in the confection ranges widely depending on the particular embodiment of the confection and the desired degree of sweetness. Those of ordinary skill in the art will readily ascertain the appropriate amount of bulk sweetener.

In a particular embodiment, a confection comprises a rebaudioside M composition and a base composition. Generally, the amount of rebaudioside M in the confection ranges widely depending on the particular embodiment of the confection and the desired degree of sweetness. Those of ordinary skill in the art will readily ascertain the appropriate amount of sweetener. In a particular embodiment, rebaudioside M is present in the confection in an amount in the range of about 30 ppm to about 6000 ppm of the confection. In another embodiment, rebaudioside M is present in the confection in an amount in the range of about 1 ppm to about 10,000 ppm of the confection. In embodiments where the confection comprises hard candy, rebaudioside M is present in an amount in the range of about 150 ppm to about 2250 ppm of the hard candy.

Condiment Compositions

In one embodiment, the present invention is a condiment comprising a rebaudioside M composition.

Condiments, as used herein, are compositions used to enhance or improve the flavor of a food or beverage. Non-limiting examples of condiments include ketchup (catsup); mustard; barbecue sauce; butter; chili sauce; chutney; cocktail sauce; curry; dips; fish sauce; horseradish; hot sauce; jellies, jams, marmalades, or preserves; mayonnaise; peanut butter; relish; remoulade; salad dressings (e.g., oil and vinegar, Caesar, French, ranch, bleu cheese, Russian, Thousand Island, Italian, and balsamic vinaigrette), salsa; sauerkraut; soy sauce; steak sauce; syrups; tartar sauce; and Worcestershire sauce.

Condiment bases generally comprise a mixture of different ingredients, non-limiting examples of which include vehicles (e.g., water and vinegar); spices or seasonings (e.g., salt, pepper, garlic, mustard seed, onion, paprika, turmeric, and combinations thereof); fruits, vegetables, or their products (e.g., tomatoes or tomato-based products (paste, puree), fruit juices, fruit juice peels, and combinations thereof); oils or oil emulsions, particularly vegetable oils; thickeners (e.g., xanthan gum, food starch, other hydrocolloids, and combinations thereof); and emulsifying agents (e.g., egg yolk solids, protein, gum arabic, carob bean gum, guar gum, gum karaya, gum tragacanth, carageenan, pectin, propylene glycol esters of alginic acid, sodium carboxymethyl-cellulose, polysorbates, and combinations thereof). Recipes for condiment bases and methods of making condiment bases are well known to those of ordinary skill in the art.

Generally, condiments also comprise caloric sweeteners, such as sucrose, high fructose corn syrup, molasses, honey, or brown sugar. In exemplary embodiments of the condiments provided herein, rebaudioside M or rebaudioside M compositions are used instead of traditional caloric sweeteners. Accordingly, a condiment composition desirably comprises rebaudioside M or a rebaudioside M composition and a condiment base.

The condiment composition optionally may include other natural and/or synthetic high-potency sweeteners, bulk sweeteners, pH modifying agents (e.g., lactic acid, citric acid, phosphoric acid, hydrochloric acid, acetic acid, and combinations thereof), fillers, functional agents (e.g., pharmaceutical agents, nutrients, or components of a food or plant), flavorings, colorings, or combinations thereof.

Chewing Gum Compositions

In one embodiment, the present invention is a chewing gum composition comprising a rebaudioside M composition. Chewing gum compositions generally comprise a water-soluble portion and a water-insoluble chewable gum base portion. The water soluble portion, which typically includes the rebaudioside M composition, dissipates with a portion of the flavoring agent over a period of time during chewing while the insoluble gum base portion is retained in the mouth. The insoluble gum base generally determines whether a gum is considered chewing gum, bubble gum, or a functional gum.

The insoluble gum base, which is generally present in the chewing gum composition in an amount in the range of about 15 to about 35 weight percent of the chewing gum composition, generally comprises combinations of elastomers, softeners (plasticizers), emulsifiers, resins, and fillers. Such components generally are considered food grade, recognized as safe (GRA), and/or are U.S. Food and Drug Administration (FDA)-approved.

Elastomers, the primary component of the gum base, provide the rubbery, cohesive nature to gums and can include one or more natural rubbers (e.g., smoked latex, liquid latex, or guayule); natural gums (e.g., jelutong, perillo, sorva, massaranduba balata, massaranduba chocolate, nispero, rosindinha, chicle, and gutta hang kang); or synthetic elastomers (e.g., butadiene-styrene copolymers, isobutylene-isoprene copolymers, polybutadiene, polyisobutylene, and vinyl polymeric elastomers). In a particular embodiment, the elastomer is present in the gum base in an amount in the range of about 3 to about 50 weight percent of the gum base.

Resins are used to vary the firmness of the gum base and aid in softening the elastomer component of the gum base. Non-limiting examples of suitable resins include a rosin ester, a terpene resin (e.g., a terpene resin from α-pinene, β-pinene and/or d-limonene), polyvinyl acetate, polyvinyl alcohol, ethylene vinyl acetate, and vinyl acetate-vinyl laurate copolymers. Non-limiting examples of rosin esters include a glycerol ester of a partially hydrogenated rosin, a glycerol ester of a polymerized rosin, a glycerol ester of a partially dimerized rosin, a glycerol ester of rosin, a pentaerythritol ester of a partially hydrogenated rosin, a methyl ester of rosin, or a methyl ester of a partially hydrogenated rosin. In a particular embodiment, the resin is present in the gum base in an amount in the range of about 5 to about 75 weight percent of the gum base.

Softeners, which also are known as plasticizers, are used to modify the ease of chewing and/or mouthfeel of the chewing gum composition. Generally, softeners comprise oils, fats, waxes, and emulsifiers. Non-limiting examples of oils and fats include tallow, hydrogenated tallow, large, hydrogenated or partially hydrogenated vegetable oils (e.g., soybean, canola, cottonseed, sunflower, palm, coconut, corn, safflower, or palm kernel oils), cocoa butter, glycerol monostearate, glycerol triacetate, glycerol abietate, leithin, monoglycerides, diglycerides, triglycerides acetylated monoglycerides, and free fatty acids. Non-limiting examples of waxes include polypropylene/polyethylene/Fisher-Tropsch waxes, paraffin, and microcrystalline and natural waxes (e.g., candelilla, beeswax and carnauba). Microcrystalline waxes, especially those with a high degree of crystallinity and a high melting point, also may be considered as bodying agents or textural modifiers. In a particular embodiment, the softeners are present in the gum base in an amount in the range of about 0.5 to about 25 weight percent of the gum base.

Emulsifiers are used to form a uniform dispersion of the insoluble and soluble phases of the chewing gum composition and also have plasticizing properties. Suitable emulsifiers include glycerol monostearate (GMS), lecithin (Phosphatidyl choline), polyglycerol polyricinoleic acid (PPGR), mono and diglycerides of fatty acids, glycerol distearate, tracetin, acetylated monoglyceride, glycerol triactetate, and magnesium stearate. In a particular embodiment, the emulsifiers are present in the gum base in an amount in the range of about 2 to about 30 weight percent of the gum base.

The chewing gum composition also may comprise adjuvants or fillers in either the gum base and/or the soluble portion of the chewing gum composition. Suitable adjuvants and fillers include lecithin, inulin, polydextrin, calcium carbonate, magnesium carbonate, magnesium silicate, ground limestone, aluminum hydroxide, aluminum silicate, talc, clay, alumina, titanium dioxide, and calcium phosphate. In particular embodiments, lecithin can be used as an inert filler to decrease the stickiness of the chewing gum composition. In other particular embodiments, lactic acid copolymers, proteins (e.g., gluten and/or zein) and/or guar can be used to create a gum that is more readily biodegradable. The adjuvants or fillers are generally present in the gum base in an amount up to about 20 weight percent of the gum base. Other optional ingredients include coloring agents, whiteners, preservatives, and flavors.

In particular embodiments of the chewing gum composition, the gum base comprises about 5 to about 95 weight percent of the chewing gum composition, more desirably about 15 to about 50 weight percent of the chewing gum composition, and even more desirably from about 20 to about 30 weight percent of the chewing gum composition.

The soluble portion of the chewing gum composition may optionally include other artificial or natural sweeteners, bulk sweeteners, softeners, emulsifiers, flavoring agents, coloring agents, adjuvants, fillers, functional agents (e.g., pharmaceutical agents or nutrients), or combinations thereof. Suitable examples of softeners and emulsifiers are described above.

Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, and mixtures thereof. In particular embodiments, the bulk sweetener is present in the chewing gum composition in an amount in the range of about 1 to about 75 weight percent of the chewing gum composition.

Flavoring agents may be used in either the insoluble gum base or soluble portion of the chewing gum composition. Such flavoring agents may be natural or artificial flavors. In a particular embodiment, the flavoring agent comprises an essential oil, such as an oil derived from a plant or a fruit, peppermint oil, spearmint oil, other mint oils, clove oil, cinnamon oil, oil of wintergreen, bay, thyme, cedar leaf, nutmeg, allspice, sage, mace, and almonds. In another particular embodiment, the flavoring agent comprises a plant extract or a fruit essence such as apple, banana, watermelon, pear, peach, grape, strawberry, raspberry, cherry, plum, pineapple, apricot, and mixtures thereof. In still another particular embodiment, the flavoring agent comprises a citrus flavor, such as an extract, essence, or oil of lemon, lime, orange, tangerine, grapefruit, citron, or kumquat.

In a particular embodiment, a chewing gum composition comprises rebaudioside M or a rebaudioside M composition and a gum base. In a particular embodiment, rebaudioside M is present in the chewing gum composition in an amount in the range of about 1 ppm to about 10,000 ppm of the chewing gum composition.

Cereal Compositions

In one embodiment, the present invention is a cereal composition comprising a rebaudioside M composition. Cereal compositions typically are eaten either as staple foods or as snacks. Non-limiting examples of cereal compositions for use in particular embodiments include ready-to-eat cereals as well as hot cereals. Ready-to-eat cereals are cereals which may be eaten without further processing (i.e. cooking) by the consumer. Examples of ready-to-eat cereals include breakfast cereals and snack bars. Breakfast cereals typically are processed to produce a shredded, flaky, puffy, or extruded form. Breakfast cereals generally are eaten cold and are often mixed with milk and/or fruit. Snack bars include, for example, energy bars, rice cakes, granola bars, and nutritional bars. Hot cereals generally are cooked, usually in either milk or water, before being eaten. Non-limiting examples of hot cereals include grits, porridge, polenta, rice, and rolled oats.

Cereal compositions generally comprise at least one cereal ingredient. As used herein, the term "cereal ingredient" denotes materials such as whole or part grains, whole or part seeds, and whole or part grass. Non-limiting examples of cereal ingredients for use in particular embodiments include maize, wheat, rice, barley, bran, bran endosperm, bulgur, soghums, millets, oats, rye, triticale, buckwheat, fonio, quinoa, bean, soybean, amaranth, teff, spelt, and kaniwa.

In a particular embodiment, the cereal composition comprises a rebaudioside M composition and at least one cereal ingredient. The rebaudioside M composition may be added to the cereal composition in a variety of ways, such as, for example, as a coating, as a frosting, as a glaze, or as a matrix blend (i.e. added as an ingredient to the cereal formulation prior to the preparation of the final cereal product).

Accordingly, in a particular embodiment, a rebaudioside M composition is added to the cereal composition as a matrix blend. In one embodiment, the rebaudioside M composition is blended with a hot cereal prior to cooking to provide a sweetened hot cereal product. In another embodiment, the rebaudioside M composition is blended with the cereal matrix before the cereal is extruded.

In another particular embodiment, a rebaudioside M composition is added to the cereal composition as a coating, such as, for example, by combining the rebaudioside M composition with a food grade oil and applying the mixture onto the cereal. In a different embodiment, the rebaudioside M composition and the food grade oil may be applied to the cereal separately, by applying either the oil or the sweetener first. Non-limiting examples of food grade oils for use in particular embodiments include vegetable oils such as corn oil, soybean oil, cottonseed oil, peanut oil, coconut oil, canola oil, olive oil, sesame seed oil, palm oil, palm kernel oil, and mixtures thereof. In yet another embodiment, food grade fats may be used in place of the oils, provided that the fat is melted prior to applying the fat onto the cereal.

In another embodiment, the rebaudioside M composition is added to the cereal composition as a glaze. Non-limiting examples of glazing agents for use in particular embodiments include corn syrup, honey syrups and honey syrup solids, maple syrups and maple syrup solids, sucrose, isomalt, polydextrose, polyols, hydrogenated starch hydrosylate, aqueous solutions thereof, and mixtures thereof. In another such embodiment, the rebaudioside M composition is added as a glaze by combining with a glazing agent and a food grade oil or fat and applying the mixture to the cereal. In yet another embodiment, a gum system, such as, for example, gum acacia, carboxymethyl cellulose, or algin, may be added to the glaze to provide structural support. In addition, the glaze also may include a coloring agent, and also may include a flavor.

In another embodiment, a rebaudioside M composition is added to the cereal composition as a frosting. In one such embodiment, the rebaudioside M composition is combined with water and a frosting agent and then applied to the cereal. Non-limiting examples of frosting agents for use in particular embodiments include maltodextrin, sucrose, starch, polyols, and mixtures thereof. The frosting also may include a food grade oil, a food grade fat, a coloring agent, and/or a flavor.

Generally, the amount of rebaudioside M in a cereal composition varies widely depending on the particular type of cereal composition and its desired sweetness. Those of ordinary skill in the art can readily discern the appropriate amount of sweetener to put in the cereal composition. In a particular embodiment, rebaudioside M is present in the cereal composition in an amount in the range of about 0.02 to about 1.5 weight percent of the cereal composition and the at least one additive is present in the cereal composition in an amount in the range of about 1 to about 5 weight percent of the cereal composition.

Baked Goods

In one embodiment, the present invention is a baked good comprising a rebaudioside M composition. Baked goods, as used herein, include ready to eat and all ready to bake products, flours, and mixes requiring preparation before serving. Non-limiting examples of baked goods include cakes, crackers, cookies, brownies, muffins, rolls, bagels, donuts, strudels, pastries, croissants, biscuits, bread, bread products, and buns.

Preferred baked goods in accordance with embodiments of this invention can be classified into three groups: bread-type doughs (e.g., white breads, variety breads, soft buns, hard rolls, bagels, pizza dough, and flour tortillas), sweet doughs (e.g., danishes, croissants, crackers, puff pastry, pie crust, biscuits, and cookies), and batters (e.g., cakes such as sponge, pound, devil's food, cheesecake, and layer cake, donuts or other yeast raised cakes, brownies, and muffins). Doughs generally are characterized as being flour-based, whereas batters are more water-based.

Baked goods in accordance with particular embodiments of this invention generally comprise a combination of sweetener, water, and fat. Baked goods made in accordance with many embodiments of this invention also contain flour in order to make a dough or a batter. The term "dough" as used herein is a mixture of flour and other ingredients stiff enough to knead or roll. The term "batter" as used herein consists of flour, liquids such as milk or water, and other ingredients, and is thin enough to pour or drop from a spoon. Desirably, in accordance with particular embodiments of the invention, the flour is present in the baked goods in an amount in the range of about 15 to about 60% on a dry weight basis, more desirably from about 23 to about 48% on a dry weight basis.

The type of flour may be selected based on the desired product. Generally, the flour comprises an edible non-toxic flour that is conventionally utilized in baked goods. According to particular embodiments, the flour may be a bleached bake flour, general purpose flour, or unbleached flour. In other particular embodiments, flours also may be used that have been treated in other manners. For example, in particular embodiments flour may be enriched with additional vitamins, minerals, or proteins. Non-limiting examples of flours suitable for use in particular embodiments of the invention include wheat, corn meal, whole grain, fractions of whole grains (wheat, bran, and oatmeal), and combinations thereof. Starches or farinaceous material also may be used as the flour in particular embodiments. Common food starches generally are derived from potato, corn, wheat, barley, oat, tapioca, arrow root, and sago.

Modified starches and pregelatinized starches also may be used in particular embodiments of the invention.

The type of fat or oil used in particular embodiments of the invention may comprise any edible fat, oil, or combination thereof that is suitable for baking. Non-limiting examples of fats suitable for use in particular embodiments of the invention include vegetable oils, tallow, lard, marine oils, and combinations thereof. According to particular embodiments, the fats may be fractionated, partially hydrogenated, and/or interesterified. In another particular embodiment, the fat desirably comprises reduced, low calorie, or non-digestible fats, fat substitutes, or synthetic fats. In yet another particular embodiment, shortenings, fats, or mixtures of hard and soft fats also may be used. In particular embodiments, shortenings may be derived principally from triglycerides derived from vegetable sources (e.g., cotton seed oil, soybean oil, peanut oil, linseed oil, sesame oil, palm oil, palm kernel oil, rapeseed oil, safflower oil, coconut oil, corn oil, sunflower seed oil, and mixtures thereof). Synthetic or natural triglycerides of fatty acids having chain lengths from 8 to 24 carbon atoms also may be used in particular embodiments. Desirably, in accordance with particular embodiments of this invention, the fat is present in the baked good in an amount in the range of about 2 to about 35% by weight on a dry basis, more desirably from about 3 to about 29% by weight on a dry basis.

Baked goods in accordance with particular embodiments of this invention also comprise water in amounts sufficient to provide the desired consistency, enabling proper forming, machining and cutting of the baked good prior or subsequent to cooking. The total moisture content of the baked good includes any water added directly to the baked good as well as water present in separately added ingredients (e.g., flour, which generally includes about 12 to about 14% by weight moisture). Desirably, in accordance with particular embodiments of this invention, the water is present in the baked good in an amount up to about 25% by weight of the baked good.

Baked goods in accordance with particular embodiments of this invention also may comprise a number of additional conventional ingredients such as leavening agents, flavors, colors, milk, milk by-products, egg, egg by-products, cocoa, vanilla or other flavoring, as well as inclusions such as nuts, raisins, cherries, apples, apricots, peaches, other fruits, citrus peel, preservative, coconuts, flavored chips such a chocolate chips, butterscotch chips, and caramel chips, and combinations thereof. In particular embodiments, the baked goods may also comprise emulsifiers, such as lecithin and monoglycerides.

According to particular embodiments of this invention, leavening agents may comprise chemical leavening agents or yeast leavening agents. Non-limiting examples of chemical leavening agents suitable for use in particular embodiments of this invention include baking soda (e.g., sodium, potassium, or aluminum bicarbonate), baking acid (e.g., sodium aluminum phosphate, monocalcium phosphate, or dicalcium phosphate), and combinations thereof.

In accordance with another particular embodiment of this invention, cocoa may comprise natural or "Dutched" chocolate from which a substantial portion of the fat or cocoa butter has been expressed or removed by solvent extraction, pressing, or other means. In a particular embodiment, it may be necessary to reduce the amount of fat in a baked good comprising chocolate because of the additional fat present in cocoa butter. In particular embodiments, it may be necessary to add larger amounts of chocolate as compared to cocoa in order to provide an equivalent amount of flavoring and coloring.

Baked goods generally also comprise caloric sweeteners, such as sucrose, high fructose corn syrup, erythritol, molasses, honey, or brown sugar. In exemplary embodiments of the baked goods provided herein, the caloric sweetener is replaced partially or totally with a rebaudioside M composition. Accordingly, in one embodiment a baked good comprises a rebaudioside M composition in combination with a fat, water, and optionally flour. In a particular embodiment, the baked good optionally may include other natural and/or synthetic high-potency sweeteners and/or bulk sweeteners.

Dairy Products

In one embodiment, the present invention is a dairy product comprising a rebaudioside M composition. Dairy products and processes for making dairy products suitable for use in this invention are well known to those of ordinary skill in the art. Dairy products, as used herein, comprise milk or foodstuffs produced from milk. Non-limiting examples of dairy products suitable for use in embodiments of this invention include milk, milk cream, sour cream, crème fraiche, buttermilk, cultured buttermilk, milk powder, condensed milk, evaporated milk, butter, cheese, cottage cheese, cream cheese, yogurt, ice cream, frozen custard, frozen yogurt, gelato, vla, piima, filmjölk, kajmak, kephir, viili, kumiss, airag, ice milk, casein, ayran, lassi, khoa, or combinations thereof.

Milk is a fluid secreted by the mammary glands of female mammals for the nourishment of their young. The female ability to produce milk is one of the defining characteristics of mammals and provides the primary source of nutrition for newborns before they are able to digest more diverse foods. In particular embodiments of this invention, the dairy products are derived from the raw milk of cows, goats, sheep, horses, donkeys, camels, water buffalo, yaks, reindeer, moose, or humans.

In particular embodiments of this invention, the processing of the dairy product from raw milk generally comprises the steps of pasteurizing, creaming, and homogenizing. Although raw milk may be consumed without pasteurization, it usually is pasteurized to destroy harmful microorganisms such as bacteria, viruses, protozoa, molds, and yeasts. Pasteurizing generally comprises heating the milk to a high temperature for a short period of time to substantially reduce the number of microorganisms, thereby reducing the risk of disease.

Creaming traditionally follows pasteurization step, and involves the separation of milk into a higher-fat cream layer and a lower-fat milk layer. Milk will separate into milk and cream layers upon standing for twelve to twenty-four hours. The cream rises to the top of the milk layer and may be skimmed and used as a separate dairy product. Alternatively, centrifuges may be used to separate the cream from the milk. The remaining milk is classified according to the fat content of the milk, non-limiting examples of which include whole, 2%, 1%, and skim milk.

After removing the desired amount of fat from the milk by creaming, milk is often homogenized. Homogenization prevents cream from separating from the milk and generally involves pumping the milk at high pressures through narrow tubes in order to break up fat globules in the milk. Pasteurization, creaming, and homogenization of milk are common but are not required to produce consumable dairy products. Accordingly, suitable dairy products for use in embodiments of this invention may undergo no processing steps, a single processing step, or combinations of the processing steps described herein. Suitable dairy products for use in embodiments of this invention may also undergo processing steps in addition to or apart from the processing steps described herein.

Particular embodiments of this invention comprise dairy products produced from milk by additional processing steps. As described above, cream may be skimmed from the top of milk or separated from the milk using machine-centrifuges. In a particular embodiment, the dairy product comprises sour cream, a dairy product rich in fats that is obtained by fermenting cream using a bacterial culture. The bacteria produce lactic acid during fermentation, which sours and thickens the cream. In another particular embodiment, the dairy product comprises crème fraiche, a heavy cream slightly soured with bacterial culture in a similar manner to sour cream. Crème fraiche ordinarily is not as thick or as sour as sour cream. In yet another particular embodiment, the dairy product comprises cultured buttermilk. Cultured buttermilk is obtained by adding bacteria to milk. The resulting fermentation, in which the bacterial culture turns lactose into lactic acid, gives cultured buttermilk a sour taste. Although it is produced in a different manner, cultured buttermilk generally is similar to traditional buttermilk, which is a by-product of butter manufacture.

According to other particular embodiments of this invention, the dairy products comprise milk powder, condensed milk, evaporated milk, or combinations thereof. Milk powder, condensed milk, and evaporated milk generally are produced by removing water from milk. In a particular embodiment, the dairy product comprises a milk powder comprising dried milk solids with a low moisture content. In another particular embodiment, the dairy product comprises condensed milk. Condensed milk generally comprises milk with a reduced water content and added sweetener, yielding a thick, sweet product with a long shelf-life. In yet another particular embodiment, the dairy product comprises evaporated milk. Evaporated milk generally comprises fresh, homogenized milk from which about 60% of the water has been removed, that has been chilled, fortified with additives such as vitamins and stabilizers, packaged, and finally sterilized. According to another particular embodiment of this invention, the dairy product comprises a dry creamer and a rebaudioside M composition.

In another particular embodiment, the dairy product provided herein comprises butter. Butter generally is made by churning fresh or fermented cream or milk. Butter generally comprises butterfat surrounding small droplets comprising mostly water and milk proteins. The churning process damages the membranes surrounding the microscopic globules of butterfat, allowing the milk fats to conjoin and to separate from the other parts of the cream. In yet another particular embodiment, the dairy product comprises buttermilk, which is the sour-tasting liquid remaining after producing butter from full-cream milk by the churning process.

In still another particular embodiment, the dairy product comprises cheese, a solid foodstuff produced by curdling milk using a combination of rennet or rennet substitutes and acidification. Rennet, a natural complex of enzymes produced in mammalian stomachs to digest milk, is used in cheese-making to curdle the milk, causing it to separate into solids known as curds and liquids known as whey. Generally, rennet is obtained from the stomachs of young ruminants, such as calves; however, alternative sources of rennet include some plants, microbial organisms, and genetically modified bacteria, fungus, or yeast. In addition, milk may be coagulated by adding acid, such as citric acid. Generally, a combination of rennet and/or acidification is used to curdle the milk. After separating the milk into curds and whey, some cheeses are made by simply draining, salting, and packaging the curds. For most cheeses, however, more processing is needed. Many different methods may be used to produce the hundreds of available varieties of cheese. Processing methods include heating the cheese, cutting it into small cubes to drain, salting, stretching, cheddaring, washing, molding, aging, and ripening. Some cheeses, such as the blue cheeses, have additional bacteria or molds introduced to them before or during aging, imparting flavor and aroma to the finished product. Cottage cheese is a cheese curd product with a mild flavor that is drained but not pressed so that some whey remains. The curd is usually washed to remove acidity. Cream cheese is a soft, mild-tasting, white cheese with a high fat content that is produced by adding cream to milk and then curdling to form a rich curd. Alternatively, cream cheese can be made from skim milk with cream added to the curd. It should be understood that cheese, as used herein, comprises all solid foodstuff produced by the curdling milk.

In another particular embodiment of this invention, the dairy product comprises yogurt. Yogurt generally is produced by the bacterial fermentation of milk. The fermentation of lactose produces lactic acid, which acts on proteins in milk to give the yogurt a gel-like texture and tartness. In particularly desirable embodiments, the yogurt may be sweetened with a sweetener and/or flavored. Non-limiting examples of flavorings include, but are not limited to, fruits (e.g., peach, strawberry, banana), vanilla, and chocolate. Yogurt, as used herein, also includes yogurt varieties with different consistencies and viscosities, such as dahi, dadih or dadiah, labneh or labaneh, bulgarian, kefir, and matsoni. In another particular embodiment, the dairy product comprises a yogurt-based beverage, also known as drinkable yogurt or a yogurt smoothie. In particularly desirable embodiments, the yogurt-based beverage may comprise sweeteners, flavorings, other ingredients, or combinations thereof.

Other dairy products beyond those described herein may be used in particular embodiments of this invention. Such dairy products are well known to those of ordinary skill in the art, non-limiting examples of which include milk, milk and juice, coffee, tea, vla, piima, filmjolk, kajmak, kephir, viili, kumiss, airag, ice milk, casein, ayran, lassi, and khoa.

According to particular embodiments of this invention, the dairy compositions also may comprise other additives. Non-limiting examples of suitable additives include sweeteners and flavorants such as chocolate, strawberry, and banana. Particular embodiments of the dairy compositions provided herein also may comprise additional nutritional supplements such as vitamins (e.g., vitamin D) and minerals (e.g., calcium) to improve the nutritional composition of the milk.

In a particularly desirable embodiment, the dairy composition comprises a rebaudioside M composition in combination with a dairy product.

Rebaudioside M compositions are also suitable for use in processed agricultural products, livestock products or seafood; processed meat products such as sausage and the like; retort food products, pickles, preserves boiled in soy sauce, delicacies, side dishes; soups; snacks such as potato chips, cookies, or the like; as shredded filler, leaf, stem, stalk, homogenized leaf cured and animal feed.

F. Methods for Preparing Sweetened Compositions

In one embodiment, the invention provides a method for preparing a sweetened composition comprising combining a sweetenable composition with a rebaudioside M composition.

The sweetenable composition can be any sweetenable composition described herein, including, for example, pharmaceutical compositions, edible gel mixes and compositions, dental compositions, foodstuffs, confections, condiments, chewing gum, cereal compositions, baked goods, dairy products, beverages and beverage products. In a particular embodiment, the sweetenable composition is an unsweetened beverage. In another particular embodiment, the sweetenable composition is a sweetened beverage.

Beverage and Beverage Products

In one embodiment, the invention provides a beverage comprising a rebaudioside M composition of the present invention.

In another embodiment, the invention provides a method for preparing a beverage or beverage product comprising combining a unsweetened beverage with a rebaudioside M composition. As used herein, the term "unsweetened beverage" refers to a beverage that does not contain a sweetener component.

In one embodiment, the invention provides a method for preparing a beverage or beverage product comprising combining a sweetened beverage with a rebaudioside M composition. As used herein, the term "sweetened beverage" refers to a beverage that contains one or more non-rebaudioside M sweeteners, including natural or synthetic sweeteners.

As used herein, a "beverage or beverage product" is a ready-to-drink beverage, a beverage concentrate, a beverage syrup, or a powdered beverage. Suitable ready-to-drink beverages include carbonated and non-carbonated beverages. Carbonated beverages include, but are not limited to, colas, lemon-lime flavored sparkling beverages, orange-flavored sparkling beverages, grape-flavored sparkling beverages, strawberry-flavored sparkling beverages, pineapple-flavored sparkling beverages, ginger-ales, soft drinks, root beers and malt beverages.

Non-carbonated beverages include, but are not limited to fruit juices, fruit-flavored juices, juice drinks, nectars, vegetable juices, vegetable-flavored juices, sports drinks, energy drinks, enhanced water, enhanced water with vitamins, near water drinks (e.g., water with natural or synthetic flavorants), coconut waters, teas (e.g. black tea, green tea, red tea, oolong tea), coffees, cocoa drinks, beverages containing milk components (e.g. milk beverages, coffee containing milk components, café au lait, milk tea, fruit milk beverages), beverages containing cereal extracts, smoothies and combinations thereof.

Beverage concentrates and beverage syrups are prepared with an initial volume of liquid matrix (e.g. water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages contain a liquid matrix, i.e. the basic ingredient in which the ingredients—including the sweetener or rebaudioside M composition of the present invention—are dissolved. In one embodiment, the liquid matrix is water of beverage quality, such as, for example deionized water, distilled water, reverse osmosis water, carbon-treated water, purified water, demineralized water and combinations thereof, can be used. Additional suitable liquid matrices include, but are not limited to phosphoric acid, phosphate buffer, citric acid, citrate buffer and carbon-treated water.

In one embodiment, the present invention is a beverage comprising a rebaudioside M composition.

Any rebaudioside M composition detailed herein can be used to prepare the beverages.

In one embodiment, the beverage contains inclusions, i.e. pulp, seed, chunks, etc.

The beverage can further include one or more sweeteners. Carbohydrate sweeteners can be present in the beverage in a concentration from about 100 ppm to about 140,000 ppm. Rare sugars (D-psicose, D-turanose, D-allose, D-tagatose, leucrose) can be present in the beverage in a concentration from about 100 ppm to about 100,000 ppm. Synthetic sweeteners may be present in the beverage in a concentration from about 0.3 ppm to about 3,500 ppm. Natural high potency sweeteners may be preset in the beverage in a concentration from about 0.1 ppm to about 3,000 ppm.

The beverage can further include additives including, but are not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, caffeine, flavorants and flavoring ingredients, astringent compounds, proteins or protein hydrolysates, surfactants, emulsifiers, weighing agents, juice, dairy, cereal and other plant extracts, flavonoids, alcohols, polymers and combinations thereof. Any suitable additive described herein can be used.

In one embodiment, the polyol can be present in the beverage in a concentration from about 100 ppm to about 250,000 ppm, such as, for example, from about 5,000 ppm to about 40,000 ppm.

In another embodiment, the amino acid can be present in the beverage in a concentration from about 10 ppm to about 50,000 ppm, such as, for example, from about 1,000 ppm to about 10,000 ppm, from about 2,500 ppm to about 5,000 ppm or from about 250 ppm to about 7,500 ppm.

In still another embodiment, the nucleotide can be present in the beverage in a concentration from about 5 ppm to about 1,000 ppm.

In yet another embodiment, the organic acid additive can be present in the beverage in a concentration from about 10 ppm to about 5,000 ppm.

In yet another embodiment, the inorganic acid additive can be present in the beverage in a concentration from about 25 ppm to about 25,000 ppm.

In still another embodiment, the bitter compound can be present in the beverage in a concentration from about 25 ppm to about 25,000 ppm.

In yet another embodiment, the flavorant can be present in the beverage a concentration from about 0.1 ppm to about 3,000 ppm.

In a still further embodiment, the polymer can be present in the beverage in a concentration from about 30 ppm to about 2,000 ppm.

In another embodiment, the protein hydrosylate can be present in the beverage in a concentration from about 200 ppm to about 50,000.

In yet another embodiment, the surfactant additive can be present in the beverage in a concentration from about 30 ppm to about 2,000 ppm.

In still another embodiment, the flavonoid additive can be present in the beverage a concentration from about 0.1 ppm to about 1,000 ppm.

In yet another embodiment, the alcohol additive can be present in the beverage in a concentration from about 625 ppm to about 10,000 ppm.

In a still further embodiment, the astringent additive can be present in the beverage in a concentration from about 10 ppm to about 5,000 ppm.

The beverage can further contain one or more functional ingredients, detailed above.

Functional ingredients include, but are not limited to, vitamins, minerals, antioxidants, preservatives, glucosamine, polyphenols and combinations thereof. Any suitable functional ingredient described herein can be used.

It is contemplated that the pH of the sweetened composition, such as, for example, a beverage, does not materially or adversely affect the taste of the sweetener. A non-limiting example of the pH range of the sweetenable composition may be from about 1.8 to about 10. A further example includes a pH range from about 2 to about 5. In a particular embodiment, the pH of beverage can be from about 2.5 to about 4.2. On of skill in the art will understand that the pH of the beverage can vary based on the type of beverage. Dairy beverages, for example, can have pHs greater than 4.2.

The titratable acidity of a beverage comprising a rebaudioside M composition may, for example, range from about 0.01 to about 1.0% by weight of beverage.

In one embodiment, the sparkling beverage product has an acidity from about 0.01 to about 1.0% by weight of the beverage, such as, for example, from about 0.05% to about 0.25% by weight of beverage.

The carbonation of a sparkling beverage product has 0 to about 2% (w/w) of carbon dioxide or its equivalent, for example, from about 0.1 to about 1.0% (w/w).

The temperature of a beverage comprising a rebaudioside M composition may, for example, range from about 4° C. to about 100° C., such as, for example, from about 4° C. to about 25° C.

The beverage can be a full-calorie beverage that has up to about 120 calories per 8 oz serving.

The beverage can be a mid-calorie beverage that has up to about 60 calories per 8 oz serving.

The beverage can be a low-calorie beverage that has up to about 40 calories per 8 oz serving.

The beverage can be a zero-calorie that has less than about 5 calories per 8 oz. serving.

In one embodiment, the beverage of the present invention comprises between about 200 ppm and about 500 ppm rebaudioside M, between about 10 and about 125 ppm rebaudioside D, wherein the liquid matrix of the beverage is selected from the group consisting of water, phosphoric acid, phosphate buffer, citric acid, citrate buffer, carbon-treated water and combinations thereof. The pH of the beverage can be from about 2.5 to about 4.2. The beverage can further include additives, such as, for example, erythritol. The beverage can further include functional ingredients, such as vitamins.

In particular embodiments, a method for preparing a beverage is provided which comprises combining an unsweetened or sweetened beverage with a rebaudioside M composition In one embodiment, the rebaudioside M composition is a disordered crystalline rebaudioside M composition. In another embodiment, the rebaudioside M composition is a spray-dried composition comprising rebaudioside M and steviol glycoside mixtures and/or rebaudioside B and/or NSF-02. In still another embodiment, the rebaudioside M composition is a composition comprising rebaudioside M and at least one surfactant, polymer, saponin or combination thereof. In yet another embodiment, multiple types of rebaudioside M compositions can be used in the preparation of the beverage.

In one embodiment, the present invention is a zero-calorie soda comprising a rebaudioside M composition disclosed herein. Additional ingredients for the zero-calorie soda may include, caramel color, phosphoric acid, aspartame, potassium benzoate, natural colors, potassium citrate, acesulfame potassium and caffeine.

In another embodiment, the present invention is a diet cola beverage comprising a rebaudioside M composition of the present invention. Additional ingredients for the diet cola beverage may include caramel color, phosphoric acid, aspartame, potassium benzoate, natural colors, citric acid, and caffeine.

In another embodiment, the present invention is a reduced-calorie lemon-lime carbonated soft drink comprising a rebaudioside M composition of the present invention. Additional ingredients for a one-third-calorie lemon-lime carbonated soft drink may include sugar, natural flavors, citric acid, sodium citrate, sodium benzoate, malic acid and *Stevia* leaf extract.

Additional ingredients for a one-half-calorie lemon-lime carbonated soft drink may include sugar, erythritol, natural flavors, citric acid, malic acid, sodium citrate, sodium benzoate and *Stevia* leaf extract.

In another embodiment, the present invention is a zero-calorie lemon-lime carbonated soft drink comprising a rebaudioside M composition disclosed herein. Additional ingredients for a zero-calorie lemon-lime carbonated soft drink may include citric acid, potassium citrate, natural flavors, potassium benzoate, aspartame and Acesulfame potassium.

In still another embodiment, the present invention is an zero-calorie orange-flavored carbonated soft drink comprising a rebaudioside M composition disclosed herein. Additional ingredients for the orange-flavored carbonated soft drink may include citric acid, potassium citrate, aspartame, natural flavors, potassium benzoate, modified food starch, acesulfame potassium, yellow 6, glycerol ester of wood rosin, coconut oil, brominated vegetable oil and red 40.

In another embodiment, the present invention is a reduced-calorie orange-flavored carbonated soft drink comprising a rebaudioside M composition disclosed herein. Additional ingredients for the reduced-calorie orange-flavored carbonated soft drink may include sugar, natural flavors, citric acid, modified food starch, sodium hexametaphosphate, glycerol ester of rosin, yellow 6, sodium benzoate, *Stevia* leaf extract, brominated vegetable oil and red 40.

In yet another embodiment, the present invention is a diet citrus-flavored carbonated soft drink comprising a rebaudioside M composition disclosed herein. Additional ingredients for the diet citrus-flavored carbonated soft drink may include natural flavors, citric acid, potassium citrate, concentrated grape fruit juice, potassium sorbate, potassium benzoate, EDTA, aspartame, acesufame potassium, acacia, glycerol ester of rosin, brominated vegetable oil and carob bean gum.

In a further embodiment, the present invention is a zero-calorie citrus-flavored carbonated soft drink comprising a rebaudioside M composition of disclosed herein. Additional ingredients for the zero-calorie citrus-flavored carbonated soft drink may include citric acid, aspartame, sodium benzoate, EDTA, acacia, potassium citrate, acesulfame potassium, caffeine, sucrose acetate isobutyrate, natural flavors, coconut oil and yellow 5.

In another embodiment, the present invention is a zero-calorie sports drink comprising a rebaudioside M composition disclosed herein. Additional ingredients for the zero-calorie sports drink may include citric acid, salt, monopotassium phosphate, magnesium chloride, calcium chloride, natural flavors, sucralose, acesulfame potassium, vitamins B3, B6, B12, blue 1 and ascorbic acid calcium disodium EDTA.

In still another embodiment, the present invention is a sugar-free spicy cherry carbonated soft drink comprising a rebaudioside M composition disclosed herein. Additional ingredients for the sugar-free spicy cherry carbonated soft drink may include caramel color, phosphoric acid, aspartame, potassium sorbate, potassium benzoate, artificial and natural flavors, acesulfame potassium, caffeine, monosodium phosphate, lactic acid, and polyethylene glycol.

In yet another embodiment, an enhanced water beverage comprises a rebaudioside M composition of the present invention. Additional ingredients for the enhanced water beverage may include erythritol, *Stevia* extract, magnesium and calcium lactate, potassium phosphate, citric acid, natural flavors, vitamin C (ascorbic acid), phosphoric acid, calcium phosphate, vitamins B3, E, B5, B6, B12, zinc gluconate and vitamin A palmitate.

V. Method of Improving Solubility and/or Delaying Precipitation

A method for improving the solubility and/or delaying precipitation in an aqueous composition that contains rebaudioside M and rebaudioside D comprises: heating the aqueous composition and then cooling the mixture to provide a solution.

The method improves the solubility and/or delays precipitation of aqueous compositions containing rebaudioside M and rebaudioside D. Rebaudioside M and rebaudioside D can be provided independently, i.e. as purified substances, or together, e.g. as part of the same steviol glycoside mixture.

Both rebaudioside M and rebaudioside D can be quantified by their relative weight contribution in a mixture of steviol glycosides. The weight percent of rebaudioside M in the mixture of steviol glycosides can vary from about 50% to about 99%, such as, for example, about 50% to about 99%, about 60% to about 99%, about 70% to about 99%, about 75% to about 99%, about 80% to about 99% or about 85% to about 99%.

The weight percent of rebaudioside D in the mixture of steviol glycosides can vary from about 50% to about 1%, such as, for example, about 40% to about 1%, about 30% to about 1%, about 20% to about 1% or about 15% to about 1%.

In one embodiment, rebaudioside M is about 75% to about 90% by weight and rebaudioside D is about 5% to about 25% by weight in a steviol glycoside mixture. In another embodiment, rebaudioside M and rebaudioside D, wherein rebaudioside M is about 80% to about 85% by weight and rebaudioside D is about 10% to about 15% by weight in a steviol glycoside mixture. In a more particular embodiment, rebaudioside M is about 84% by weight and rebaudioside D is about 12% by weight in a steviol glycoside mixture.

The aqueous composition can be heated to a temperature between about 45° C. and about 80° C. The heating can be gradient or step-wise, and can occur over a period of 1 to about 2.5 hours.

Heating results in full dissolution of the solids, thereby providing a solution. The solution is then cooled to room temperature. Again, the cooling can be done in gradient or step-wise fashion. In a particular embodiment, the solution is cooled over about 1 hour.

The solubility can be increased by this method from about 0.2% (w/w) to about 1.0% (w/w), such as, for example, about 0.3%, about 0.4%, about 0.5%, about 0.6%, about 0.7%, about 0.8%, about 0.9% or about 1.0%. In one embodiment, solubility can be increased from about 0.1% (w/w) to about 0.5% (w/w).

EXAMPLES

Example 1: Purification of Reb M from *Stevia rebaudiana* Bertoni Plant Leaves

Two kg of *Stevia rebaudiana* Bertoni plant leaves were dried at 45° C. to an 8.0% moisture content and ground to 10-20 mm particles. The content of different glycosides in the leaves was as follows: Stevioside—2.55%, Reb A—7.78%, Reb B—0.01%, Reb C—1.04%, Reb D—0.21%, Reb F—0.14%, Reb M—0.10% Dulcoside A—0.05%, and Steviolbioside—0.05%. The dried material was loaded into a continuous extractor and the extraction was carried out with 40.0 L of water at a pH of 6.5 at 40° C. for 160 min. The filtrate was collected and subjected to chemical treatment. Calcium oxide in the amount of 400 g was added to the filtrate to adjust the pH within the range of 8.5-9.0, and the mixture was maintained for 15 min with slow agitation. Then, the pH was adjusted to around 3.0 by adding 600 g of $FeCl_3$ and the mixture was maintained for 15 min with slow agitation. A small amount of calcium oxide was further added to adjust the pH to 8.5-9.0 and the mixture was maintained for 30 min with slow agitation. The precipitate was removed by filtration on a plate-and-frame filter press using cotton cloth as the filtration material. The slightly yellow filtrate was passed through the column, packed with cation-exchange resin Amberlite FCP22 ($H^+$) and then, through the column with anion-exchange resin Amberlite FPA53 ($OH^-$). The flow rate in both columns was maintained at SV=0.8 $hour^{-1}$. After completion both columns were washed with RO water to recover the steviol glycosides left in the columns and the filtrates were combined. The portion of combined solution containing 120 g total steviol glycosides was passed through seven columns, wherein each column was packed with specific macroporous polymeric adsorbent YWD-03 (Cangzhou Yuanwei, China). The first column with the size of ⅓ of the others acted as a "catcher column". The SV was around 1.0 $hour^{-1}$. After all extract was passed through the columns, the resin sequentially was washed with 1 volume of water, 2 volumes of 0.5% NaOH, 1 volume of water, 2 volumes of 0.5% HCl, and finally with water until the pH was 7.0. The "catcher column" was washed separately.

Desorption of the adsorbed steviol glycosides was carried out with 52% ethanol at SV=1.0 $hour^{-1}$. Desorption of the first "catcher column" was carried out separately and the filtrate was not mixed with the main solution obtained from other columns. Desorption of the last column also was carried out separately. The quality of extract from different columns with specific macroporous adsorbent is shown in Table 1.

TABLE 1

| Steviol Glycoside Content | |
|---|---|
| Column | Total steviol glycosides, % |
| 1 (catcher) | 55.3 |
| 2 | 92.7 |
| 3 | 94.3 |
| 4 | 96.1 |
| 5 | 96.3 |
| 6 | 95.8 |
| 7 | 80.2 |

The total steviol glycoside content can be determined experimentally by HPLC or HPLC/MS. For example, chromatographic analysis can be performed on a HPLC/MS system comprising an Agilent 1200 series (USA) liquid chromatograph equipped with binary pump, autosampler, thermostatted column compartment, UV detector (210 nm), and Agilent 6110 quadrupole MS detector interfaced with Chemstation data acquisition software. The column can be a "Phenomenex Prodigy 5u ODS3 250×4.6 mm; 5 m (P/No. 00G-4097-EO)" column maintained at 40° C. The mobile phase can be 30:70 (vol/vol.) acetonitrile and water (containing 0.1% formic acid) and the flow rate through the column can be 0.5 mL/min. The steviol glycosides can be identified by their retention times in such a method, which are generally around 2.5 minutes for Reb D, around 2.9 minutes for Reb M, 5.5 minutes for Reb A, 5.8 minutes for Stevioside, 7.1 minutes for Reb F, 7.8 minutes for Reb C, 8.5 minutes for Dulcoside A, 11.0 minutes for Rubusoside, 15.4 minutes for Reb B and 16.4 minutes for Steviolbioside. One of skill in the art will appreciate that the retention times for the various steviol glycosides given above can vary with changes in solvent and/or equipment.

Eluates from second to sixth columns were combined and treated separately. The combined solution of steviol glycosides was mixed with 0.3% of activated carbon from the total volume of solution. The suspension was maintained at 25° C. for 30 min with continuous agitation. Separation of carbon was carried out on a press-filtration system. For additional decolorization the filtrate was passed through the columns packed with cation-exchange resin Amberlite FCP22 ($H^+$) followed with anion-exchange resin Amberlite FPA53 A30B ($OH^-$). The flow rate in both columns was around SV=0.5 $hour^{-1}$. The ethanol was distilled using a vacuum evaporator. The solids content in the final solution was around 15%. The concentrate was passed through the columns packed with cation-exchange resin Amberlite FCP22 (H) and anion-exchange resin Amberlite FPA53 ($OH^-$) with SV=0.5 $hour^{-1}$. After all the solution was passed through the columns, both resins were washed with RO water to recover the steviol glycosides left in the columns. The resulting refined extract was transferred to the nanofiltration device, concentrated to around 52% of solids content and spray dried to provide a highly purified mixture of steviol glycosides. The yield was 99.7 g. The mixture contained Stevioside—20.5%, Reb A—65.6%, Reb B—0.1%, Reb C—8.4%, Reb D—0.5%, Reb F—1.1%, Reb M—0.1%, Dulcoside A—0.4%, and Steviolbioside—0.4%.

The combined eluate from the last column, contained about 5.3 g of total steviol glycosides including 2.3 g Reb D and around 1.9 g Reb M (35.8% Reb M/TSG ratio). It was deionized and decolorized as discussed above and then concentrated to a 33.5% content of total solids.

The concentrate was mixed with two volumes of anhydrous methanol and maintained at 20-22° C. for 24 hours with intensive agitation.

The resulting precipitate was separated by filtration and washed with about two volumes of absolute methanol. The yield of Rebaudioside M was 1.5 g with around 80% purity.

For the further purification the precipitate was suspended in three volumes of 60% methanol and treated at 55° C. for 30 min, then cooled down to 20-22° C. and agitated for another 2 hours.

The resulting precipitate was separated by filtration and washed with about two volumes of absolute methanol and subjected to similar treatment with a mixture of methanol and water.

The yield of Rebaudioside M was 1.2 g with 97.3% purity.

Example 2: Structural Elucidation of Rebaudioside M

HRMS: HRMS (High Resolution Mass Spectrum) data was generated with a Waters Premier Quadrupole Time-of-Flight (Q-TOF) mass spectrometer equipped with an electrospray ionization source operated in the positive-ion mode. Samples were diluted and eluted with a gradient of 2:2:1 methanol:acetonitrile:water and introduced 50 μL via infusion using the onboard syringe pump NMR: The sample was dissolved in deuterated pyridine ($C_5D_5N$) and NMR spectra were acquired on Varian Unity Plus 600 MHz instruments using standard pulse sequences. The chemical shifts are given in δ (ppm), and coupling constants are reported in Hz.

The complete $^1H$ and $^{13}C$ NMR spectral assignments for the diterpene glycoside rebaudioside M determined on the basis of 1D ($^1H$ and $^{13}C$) and 2D (COSY, HMQC and HMBC) NMR as well as high resolution mass spectroscopic data:

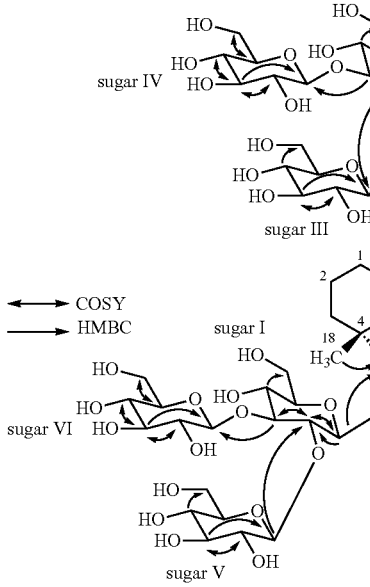

DISCUSSION

Figure 2:
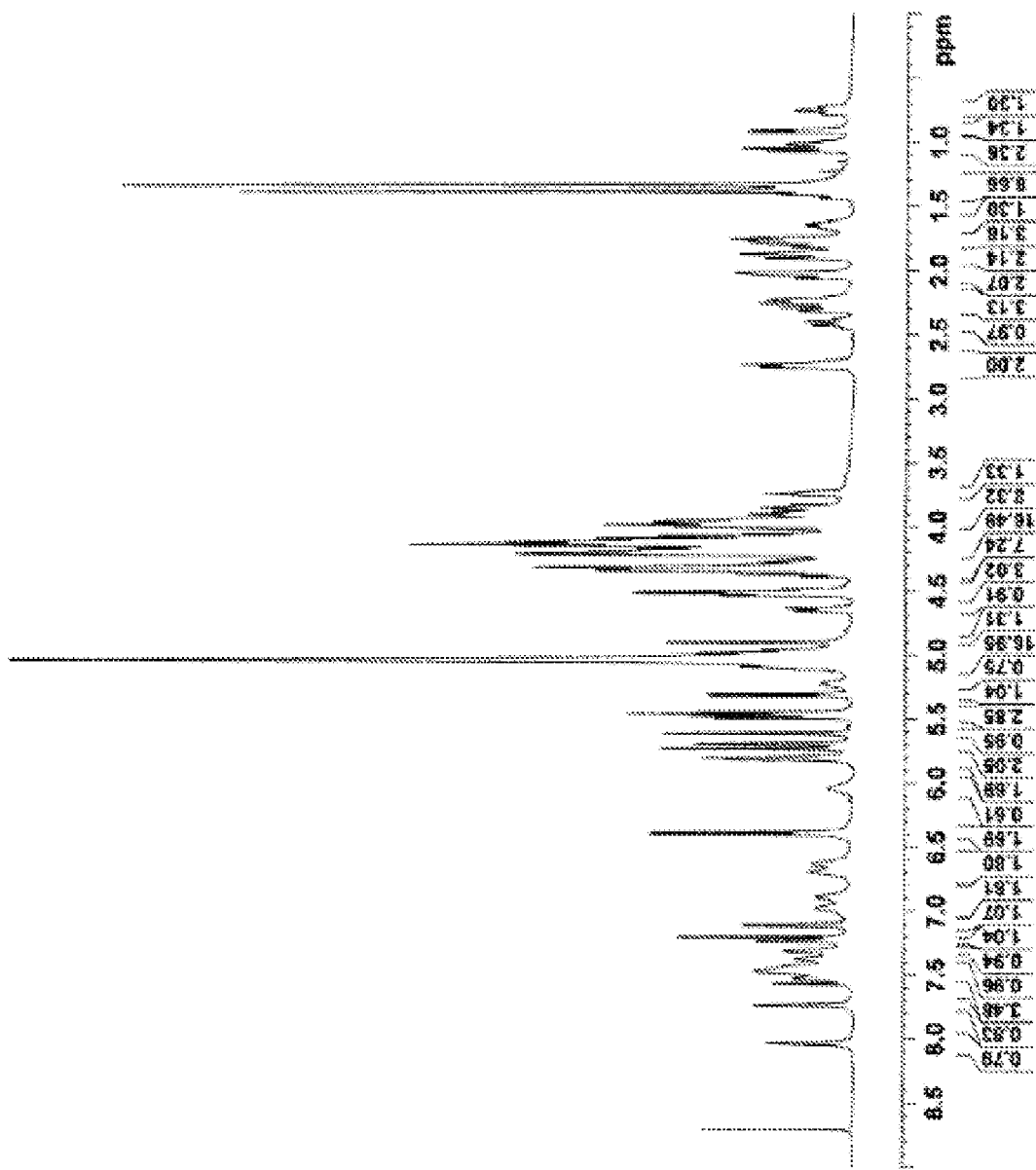
FIG. 2: illustrates the $^1$H NMR spectrum of rebaudioside M (600 MHz, $C_5D_5N$).

The molecular formula was deduced as $C_{56}H_{90}O_{33}$ on the basis of its positive high resolution (HR) mass spectrum which showed an $[M+NH_4^+]$ ion at m/z 1308.5703 together with an [M+Na+] adduct at m/z 1313.5274. This composition was supported by $^{13}C$ NMR spectral data (FIG. 1). The $^1H$ NMR spectrum (FIG. 2) showed the presence of two methyl singlets at δ 1.32 and 1.38, two olefinic protons as singlets at δ 4.90 and 5.69 of an exocyclic double bond, nine methylene and two methine protons between δ 0.75-2.74 characteristic for the ent-kaurane diterpenoids isolated earlier from the genus *Stevia*.

Figure 3:
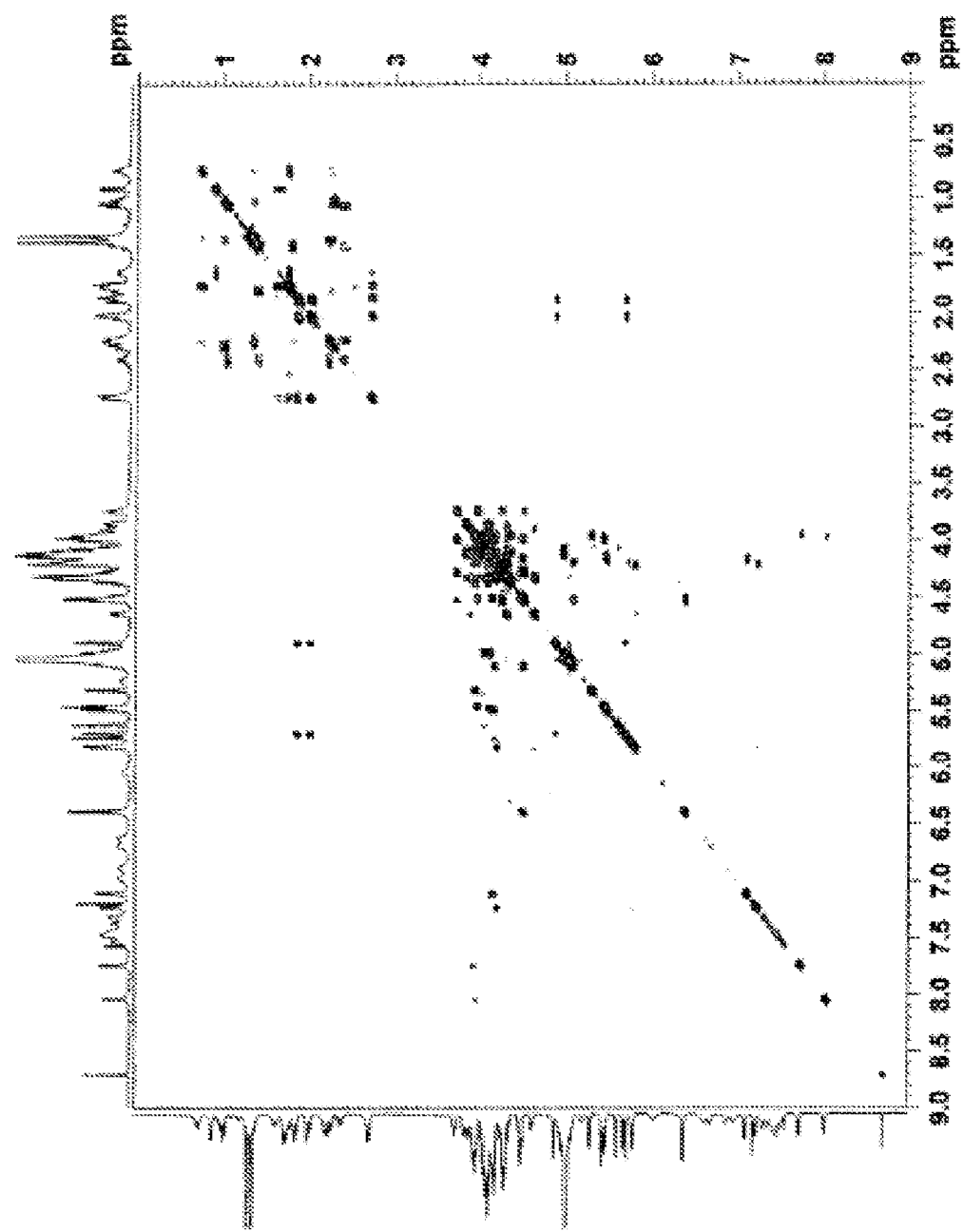
FIG. 3: illustrates the $^1$H-$^1$H COSY spectrum of rebaudioside M (600 MHz, $C_5D_5N$).

The basic skeleton of ent-kaurane diterpenoids was supported by COSY (FIG. 3): H-1/H-2; H-2/H-3; H-5/H-6; H-6/H-7; H-9/H-11; H-11/H-12 correlations.

Figure 4:
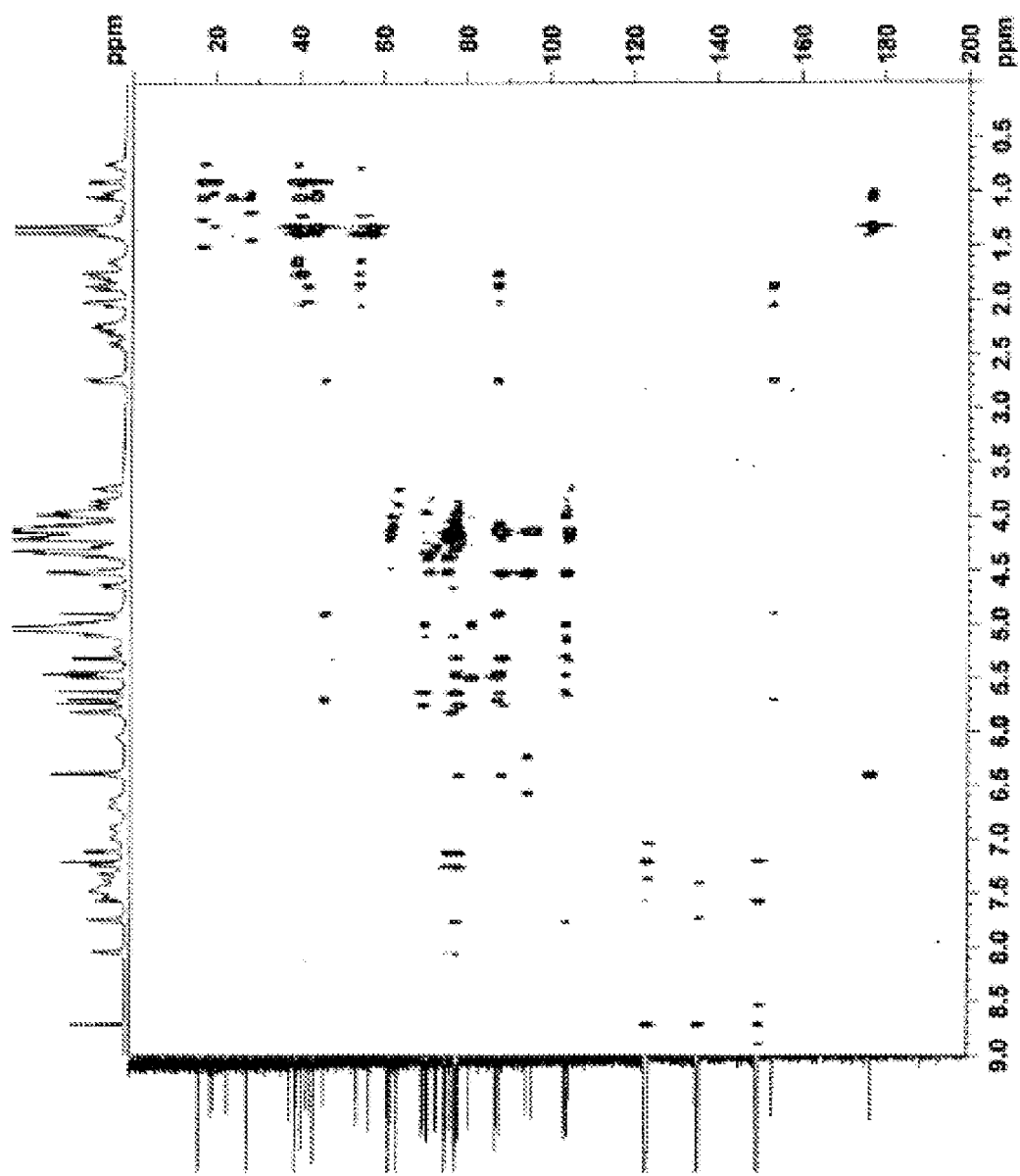
FIG. 4: illustrates the HMBC spectrum of rebaudioside M (600 MHz, $C_5D_5N$).

The basic skeleton of ent-kaurane diterpenoids was also supported by HMBC (FIG. 4): H-1/C-2, C-10; H-3/C-1, C-2, C-4, C-5, C-18, C-19; H-5/C-4, C-6, C-7, C-9, C-10, C-18, C-19, C-20; H-9/C-8, C-10, C-11, C-12, C-14, C-15; H-14/C-8, C-9, C-13, C-15, C-16 and H-17/C-13, C-15, C-16 correlations.

The $^1H$ NMR spectrum also showed the presence of anomeric protons resonating at δ 5.31, 5.45, 5.46, 5.48, 5.81, and 6.39; suggesting six sugar units in its structure. Enzymatic hydrolysis furnished an aglycone which was identified as steviol by comparison of co-TLC with standard compound. Acid hydrolysis with 5% $H_2SO_4$ afforded glucose which was identified by direct comparison with authentic samples by TLC. The $^1H$ and $^{13}C$ NMR values for all protons and carbons were assigned on the basis of COSY, HMQC and HMBC correlations (Table 2).

TABLE 2

$^1H$ and $^{13}C$ NMR spectral data for Rebaudioside M in $C_5D_5N$ [a-c].

| Position | $^{13}C$ NMR | $^1H$ NMR |
| --- | --- | --- |
| 1 | 40.3 | 0.75 t (13.2) |
|  |  | 1.76 m |
| 2 | 19.6 | 1.35 m |
|  |  | 2.24 m |
| 3 | 38.4 | 1.01 m |
|  |  | 2.30 d (13.3) |
| 4 | 44.3 | — |
| 5 | 57.4 | 1.06 d (12.8) |
| 6 | 23.5 | 2.23 m |
|  |  | 2.41 q (13.2) |
| 7 | 42.6 | 1.41 m |
|  |  | 1.80 m |
| 8 | 41.2 | — |
| 9 | 54.3 | 0.91 d (7.7) |
| 10 | 39.7 | — |
| 11 | 20.2 | 1.65 m |
|  |  | 1.75 m |
| 12 | 38.5 | 1.86 m |
|  |  | 2.73 m |
| 13 | 87.6 | — |
| 14 | 43.3 | 2.02 m |
|  |  | 2.74 m |
| 15 | 46.5 | 1.88 d (16.4) |
|  |  | 2.03 m |
| 16 | 153.3 | — |
| 17 | 104.9 | 4.90 s |
|  |  | 5.69 s |
| 18 | 28.2 | 1.32 s |
| 19 | 176.9 | — |
| 20 | 16.8 | 1.38 s |
| 1' | 94.9 | 6.39 d (8.2) |
| 2' | 76.9 | 4.51 t (8.5) |
| 3' | 88.6 | 5.09 t (8.5) |
| 4' | 70.1 | 4.18 m |
| 5' | 78.4 | 4.13 m |
| 6' | 61.8 | 4.20 m |
|  |  | 4.31 m |
| 1" | 96.2 | 5.46 d (7.1) |
| 2" | 81.4 | 4.13 m |

TABLE 2-continued $^1$H and $^{13}$C NMR spectral data for Rebaudioside M in C$_5$D$_5$N $^{a-c}$.

| Position | $^{13}$C NMR | $^1$H NMR |
|---|---|---|
| 3" | 87.9 | 4.98 t (8.5) |
| 4" | 70.4 | 4.07 t (9.6) |
| 5" | 77.7 | 3.94 m |
| 6" | 62.6 | 4.19 m |
| | | 4.32 m |
| 1''' | 104.8 | 5.48 d (7.7) |
| 2''' | 75.8 | 4.15 m |
| 3''' | 78.6 | 4.13 m |
| 4''' | 73.2 | 3.98 m |
| 5''' | 77.6 | 3.74 ddd (2.8, 6.4, 9.9) |
| 6''' | 64.0 | 4.27 m |
| | | 4.51 m |
| 1'''' | 103.9 | 5.45 d (7.5) |
| 2'''' | 75.6 | 3.98 m |
| 3'''' | 77.8 | 4.50 t (7.8) |
| 4'''' | 71.3 | 4.14 m |
| 5'''' | 78.0 | 3.99 m |
| 6'''' | 62.1 | 4.20 m |
| | | 4.32 m |
| 1''''' | 104.2 | 5.81 d (7.2) |
| 2''''' | 75.5 | 4.20 m |
| 3''''' | 78.4 | 4.20 m |
| 4''''' | 73.6 | 4.10 m |
| 5''''' | 77.8 | 3.90 ddd (2.8, 6.4, 9.9) |
| 6''''' | 64.0 | 4.32 m |
| | | 4.64 d (10.3) |
| 1'''''' | 104.1 | 5.31 d (8.0) |
| 2'''''' | 75.5 | 3.95 m |
| 3'''''' | 78.0 | 4.37 t (9.1) |
| 4'''''' | 71.1 | 4.10 m |
| 5'''''' | 78.1 | 3.85 ddd (1.7, 6.1, 9.9) |
| 6'''''' | 62.1 | 4.10 m |
| | | 4.32 m |

$^a$ assignments made on the basis of COSY, HMQC and HMBC correlations;
$^b$ Chemical shift values are in δ (ppm);
$^c$ Coupling constants are in Hz.

Based on the results from NMR spectral data, it was concluded that there are six glucosyl units. A close comparison of the $^1$H and $^{13}$C NMR spectrum of rebaudioside M with rebaudioside D suggested that rebaudioside M was also a steviol glycoside which had three glucose residues that attached at the C-13 hydroxyl as a 2,3-branched glucotriosyl substituent and another 2,3-branched glucotriosyl moiety in the form of an ester at C-19.

The key COSY and HMBC correlations suggested the placement of the sixth glucosyl moiety at the C-3 position of Sugar I. The large coupling constants observed for the six anomeric protons of the glucose moieties at δ 5.31 (d, J=8.0 Hz), 5.45 (d, J=7.5 Hz), 5.46 (d, J=7.1 Hz), 5.48 (d, J=7.7 Hz), 5.81 (d, J=7.2 Hz), and 6.39 (d, J=8.2 Hz), suggested their β-orientation as reported for steviol glycosides. Based on the results of NMR and mass spectral studies and in comparison with the spectral values of rebaudioside A and rebaudioside D, rebaudioside M was assigned as 13-[(2-O-β-D-glucopyranosyl-3-O-β-D-glucopyranosyl-β-D-glucopyranosyl)oxy]ent kaur-16-en-19-oic acid-[(2-O-β-D-glucopyranosyl-3-O-β-D-glucopyranosyl-β-D-glucopyranosyl) ester].

Example 3: Preparation of Disordered Crystalline Rebaudioside M Composition

A 100 g sample containing rebaudioside D (11.7%), rebaudioside M (84.2%), rebaudioside A (1.8%), stevioside (0.1%), rebaudioside B (1.2%) (referred to herein as "RebM80")—all percentages being on a percent dry weight basis—and having water solubility of 0.1% (determined visually at room temperature with stirring for 5 minutes), was mixed with 900 g of water and incubated in airtight pressure vessel placed in a thermostatted oil bath. The temperature was increased at 2° C. per minute to 121° C. The mixture was maintained at 121° C. for 10 minutes and then the temperature was decreased to 100° C. at 2° C. per minute to give a concentrated solution of RebM80.

1,000 g of the concentrated solution was constantly maintained at 100° C. while being fed via insulated piping to YC-015 laboratory spray drier (Shanghai Pilotech Instrument & Equipment Co. Ltd., China) operating at 175° C. inlet and 100° C. outlet temperature. 98 g of a powder was obtained that had a water solubility of about 0.8% (determined visually).

X-Ray Pattern Diffraction

High resolution XRPD patterns were collected with a PANalytical X'Pert PRO MPD diffractometer using an incident beam of Cu radiation produced using an Optix long, fine-focus source. An elliptically graded multilayer mirror was used to focus Cu Kα X-rays through the specimen and onto the detector. Prior to the analysis, a silicon specimen (NIST SRM 640d) was analyzed to verify the observed position of the Si 111 peak is consistent with the NIST-certified position. A specimen of the sample was sandwiched between 3-μm-thick films and analyzed in transmission geometry. A beam-stop, short antiscatter extension and antiscatter knife edge were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 2.2b.

Figure 5:
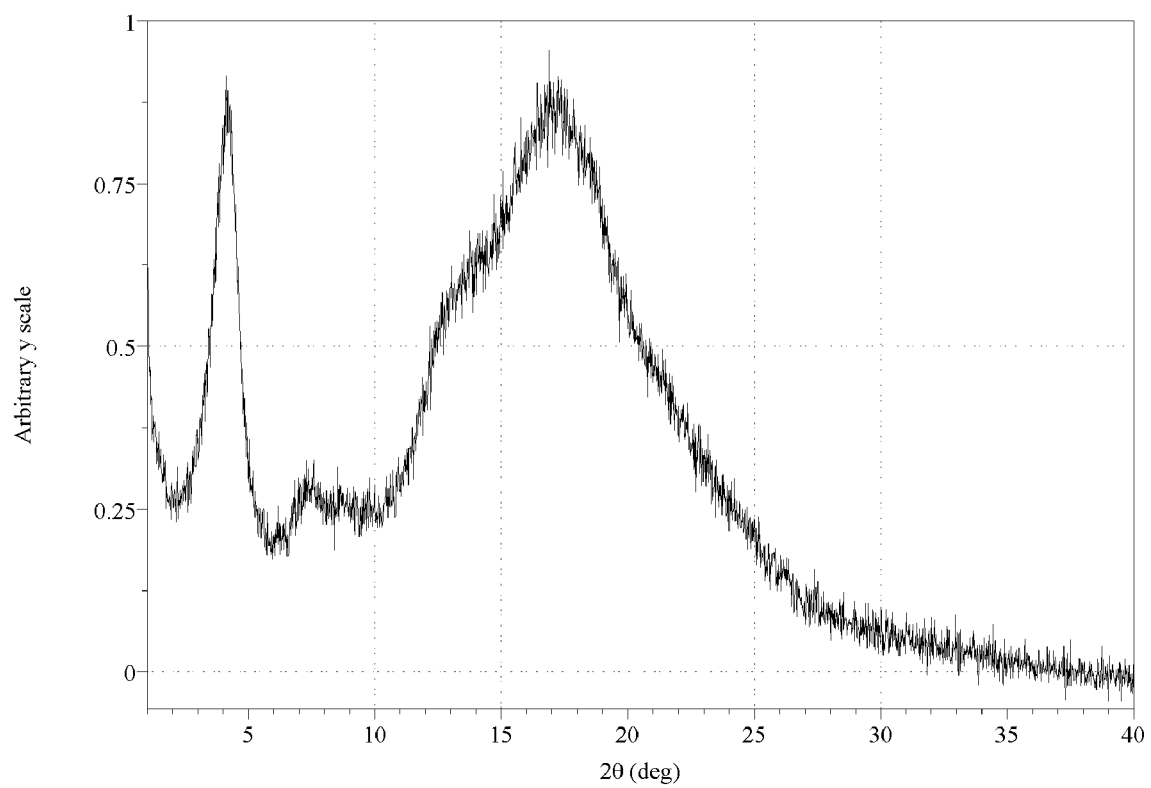
FIG. 5: illustrates the X-ray diffraction pattern (XRPD) of the material prepared in Example 3. The XRPD was collected with Cu-Kα radiation (the wavelength used to calculate d-spacings was 1.541874 Å, a weighted average of the Cu-Kα1 and Cu-Kα2 wavelengths).

The XPRD of the spray-dried material (FIG. 5) exhibited diffuse scattering halos with broad peaks at ~4.1 and 7.4 two-theta and was indicative of amorphous and/or disordered material.

Polarized Light Microscopy

Polarized light microscopy was performed using a Leica DM LP microscope equipped with a Spot Insight Color camera. A 10×, or 20× objective was used with polarized light. Crossed polarizers with a first order red compensator and Kohler illumination were used. The sample was prepared on a glass microscope slide and a cover glass was then placed over the sample; then a liquid mineral oil was added to the edge of the cover glass to cover the sample by capillarity. Images were acquired at ambient temperature using Spot Advanced Software (Version 4.5.9 built Jun. 9, 2005). A sample of the material was dry mounted on a glass slide.

The glass slide was pressed with a needle, which resulted in flow with birefringence, indicative of disordered/mesophasic material.

Scanning Electron Microscopy

Scanning electron microscopy (SEM) was performed using a FEI Quanta 200 scanning electron microscope. Under high vacuum mode, an Everhart Thornley (ETD) detector was used. Beam voltage was 5.0 kV and the resolution of the acquired image was 1024×884. Samples were sputter coated once or twice using a Cressington 108 auto Sputter Coater at ~20 mA and ~0.13 mbar (Ar) with Au/Pd for 75 seconds. Samples were prepared for analysis by placing a small amount on carbon adhesive tab fixed to an aluminum sample mount. The instrument was calibrated for magnification using NIST standards. Data were collected using xTm (v. 2.01), build number i927 and analyzed using XT Docu (v. 3.2), build 589. Magnifications reported on the SEM images were calculated upon the initial data acquisition. The scale bar reported in the lower portion of each image is accurate upon resizing the images and should be utilized when making size determinations.

By scanning electron microscopy, the sample was found to contain collapsed spheres with a generally smooth surface and a broad distribution of sizes. The collapsed spheres had holes in the sides, indicative of spray-drying relatively quickly such that the solvent escaped via the holes.

Karl Fisher Analysis

Coulometric Karl Fischer (KF) analysis for water determination was performed using a Mettler Toledo DL39 Karl Fischer titrator. Sample was placed in the KF titration vessel containing of Hydranal—Coulomat AD and mixed for 10 seconds to ensure dissolution. The sample was then titrated by means of a generator electrode which produces iodine by electrochemical oxidation: 2 I-=>I$_2$+2e. Two replicates were obtained to ensure reproducibility.

The sample was found to contain approximately 8.36% water.

Modulated DSC

Modulated DSC data were obtained on a TA Instruments Q2000 differential scanning calorimeter equipped with a refrigerated cooling system (RCS). Temperature calibration was performed using NIST-traceable indium metal. The sample was placed into an aluminum DSC pan, and the weight was accurately recorded. The pan was covered with a lid, and the lid was crimped. A weighed, crimped aluminum pan was placed on the reference side of the cell. Data were obtained using a modulation amplitude of ±1.0° C. and a 60-second period with an underlying heating rate of 2° C./minute from −30 to 250° C. The reported step changes temperatures are obtained from the inflection point of the step change in the reversing heat flow versus temperature curve.

Figure 6:
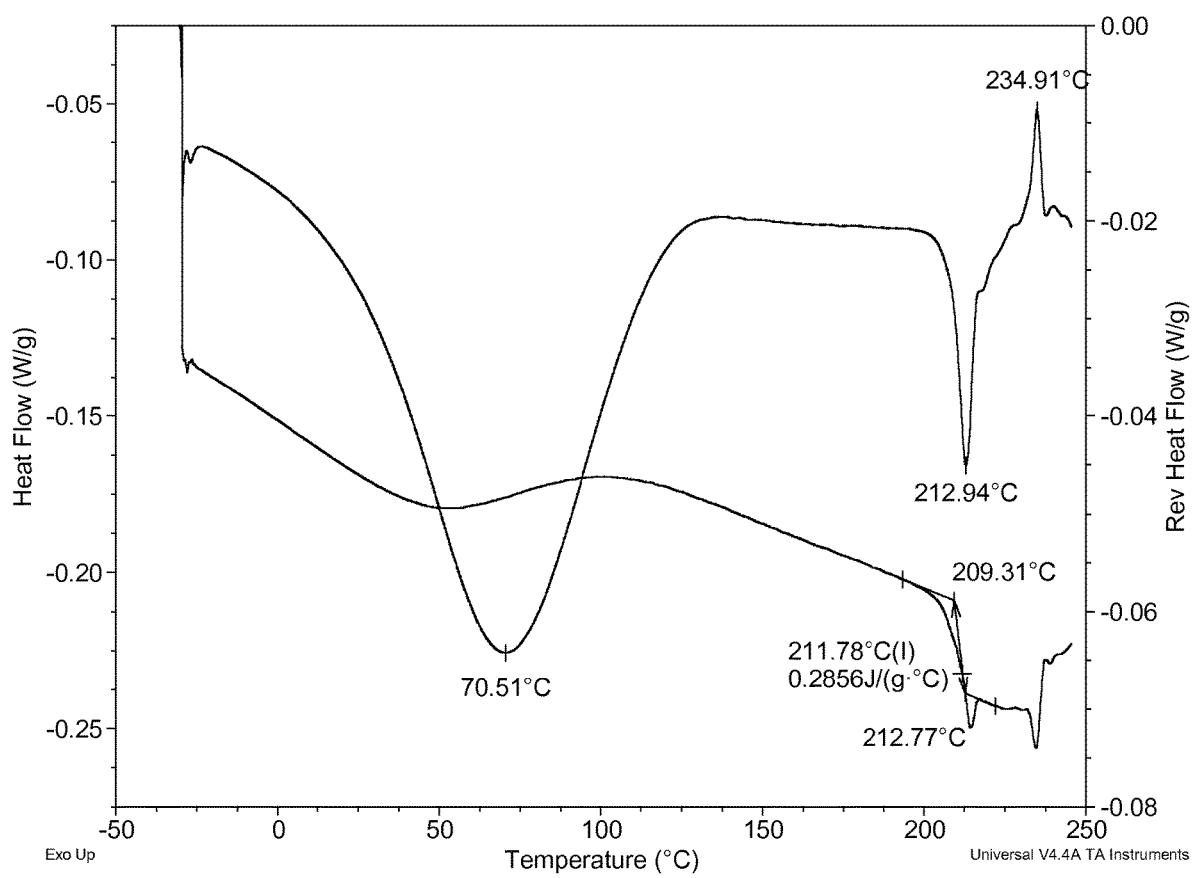
FIG. 6: illustrates the modulated differential scanning calorimetry (DSC) thermogram of the material prepared in Example 3.

In the total heat flow signal, a broad endotherm was observed at approximately 71° C. An endotherm was observed at approximately 213° C. and an exotherm at approximately 212° C. were also observed. A step change in the revising heat flow signal was observed at approximately 212° C. (FIG. 6)

Dynamic Vapor Sorption/Desoprtion

Moisture sorption/desorption (DVS) data were collected on a VTI SGA-100 Vapor Sorption Analyzer. Sorption and desorption data were collected over a range of 5% to 95% relative humidity (RH) at 10% or 20% RH intervals under a nitrogen purge. The sample was not dried prior to analysis. Equilibrium criteria used for analysis were less than 0.0100% weight change in 5 minutes, with a maximum equilibration time of 3 hours if the weight criterion was not met. Data were not corrected for the initial moisture content of the samples. Sodium chloride and polyvinypyrrolidine were used as calibration standards.

Figure 7:
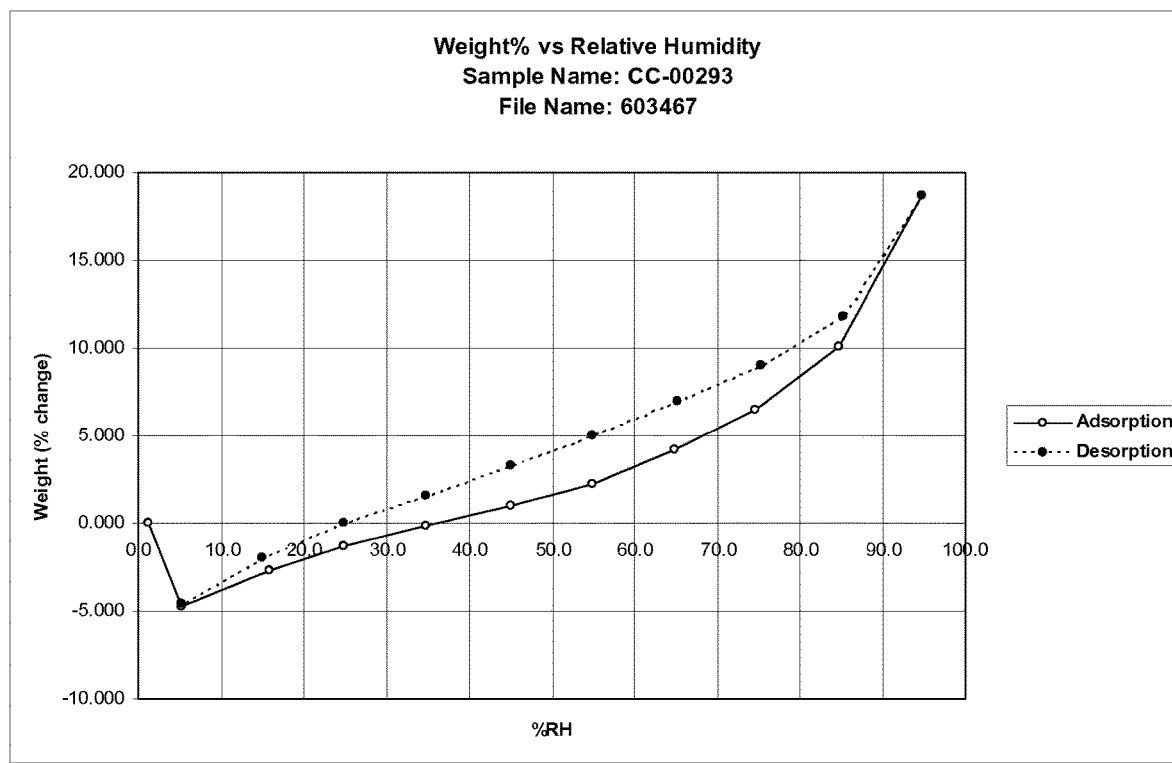
FIG. 7: illustrates the dynamic vapor sorption/desorption isotherm of the material prepared in Example 3.

The material was determined to by hygroscopic, and displayed a weight loss of 4.7% following equilibration at 5% relative humidity. A weight gain of 23.4% was observed during the sorption step from 5% to 95% relative humidity. The weight loss of 23.3% was observed during the desorption step from 95% to 5% relative humidity (FIG. 7).

Physical Stability

Physical stability was evaluated at 60% relative humidity and 25° C. at various time points (1, 2, 4 hours, and 2 days). At each time point, visual examination was recorded, as well as powder flow properties and characterization by XRPD and SEM. The results are summarized in Table 3.

TABLE 3

| Time | Analysis | Result |
| --- | --- | --- |
| 1 h | visual observation | white powders, no deliquescence |
|  | weight gain | 2.1% |
|  | XRPD | diffuse scattering halos and broad peaks; similar to material as received |
| 2 h | visual observation | white powders, no deliquescence |
|  | weight gain | 3.5% |
|  | XRPD | diffuse scattering halos and broad peaks; similar to material as received |
| 4 h | visual observation | white powders, no deliquescence |
|  | weight gain | 5.8% |
|  | SEM | collapsed spheres with a generally smooth surface and a broad distribution of sizes; similar to material as received |
|  | XRPD | diffuse scattering halos and broad peaks; similar to material as received |
| 2 d | visual observation | white powders, no deliquescence |
|  | weight gain | 7.3% |
|  | SEM | collapsed spheres with a generally smooth surface and a broad distribution of sizes; similar to material as received |
|  | XRPD | diffuse scattering halos and broad peaks; similar to material as received |

Upon exposure to 60% relative humidity and 25° C. for up to 2 days, no deliquescence was observed by visual inspection. Based on comparison of the material as received and after relative humidity stress, the materials exhibited similar XRPD patterns and SEM morphology and surface appearance.

Example 4: Preparation of Spray-Dried Rebaudioside M Compositions

A 10 g sample of RebM80 having water solubility of 0.1% was mixed with 200 mL of water in an open flask and placed in oil bath. The mixture was heated to 100° C. over 1-2 h to give a concentrated solution of rebaudioside M.

About 200 g of the concentrated solution was constantly maintained at ~90-100° C. while being fed via insulated piping to Mini-spray drier ADL310 (YAMATO) operating at ~140° C. inlet and ~80° C. outlet temperature. 8 g (80% yield) of disordered crystalline product was obtained.

The blends in Table 4 were prepared using a similar procedure, varying in the addition of SG95RA50 or NSF-02 and the amount of water used. SG95RA50 was obtained from Cargill. NSF-02 was obtained from Pure Circle.

TABLE 4

| Experiment | Sample | Amounts | Water (mL) | Yield g (%) | Water Content |
| --- | --- | --- | --- | --- | --- |
| 4a | RebM80/ SG95RA50 | 33.25 g RebM80, 1.75 g SG95RA50 | 700 | 26 g (74%) | 3.52% |
| 4b | RebM80/ SG95RA50 | 31.5 g RebM80, 3.5 g SG95RA50 | 700 | 28.3 g (81%) | 5.82% |
| 4c | RebM80/ NSF-02 | 31.5 g RebM80, 3.5 g NSF-02 | 700 | 29.1 g (83%) | 4.50% |
| 4d | RebM80 | 20.0 g | 400 | 16.0 g (80%) | ND |

Example 5: Solubility of Rebaudioside M Compositions

A sample of each substance was added portion-wise to 30 mL of water. After all solid material was dissolved by visible inspection (ca. 2-10 minutes for each addition of sample), turbidity was measured. This process was repeated until turbidity reached over 4. The duration of each experiment was from 1-1.5 hours. The results are shown in Table 5:

TABLE 5

| | RebM80 (prepared via Example 4) | RebM60 (prepared via Example 4) | RebM80/ SG95RA50 (19:1) (prepared via Example 4) | RebM80/ SG95RA50 (9:1) (prepared via Example 4) | RebM80/ NSF-02 (9:1) (prepared via Example 4) | RebM80 (prepared via Example 3) |
|---|---|---|---|---|---|---|
| Solubility (% w/w) | ~0.3 | ~0.6 | ~0.3 | ~0.5 | ~0.4 | ~0.8 |

Example 6: Solubility of Rebaudioside M Compositions Over Time at 0.3% Concentration All of the samples used either RebM80 or RebM60 and were prepared by spray-drying, as provided in Example 4. 30 mL of water was added in one portion to a 90 mg sample in a vial at room temperature. The mixture was stirred for 45-60 minutes then allowed to stand without disturbing. Turbidity was measured over time. For this experiment, samples having a turbidity measurement under about 5 NTU in combination with visual inspection for the absence of particulates were considered soluble. The results are shown in Table 6:

TABLE 6

| | Turbidity (NTU) | | | | |
|---|---|---|---|---|---|
| Time | RebM80 | RebM60 | RebM80/ SG95RA50 (19:1) | RebM80/ SG95RA50 (9:1) | RebM80/ NSF-02 (9:1) |
| within 1 h | 3.8 ± 0.6 | 2.0 ± 0.2 | 3.2 ± 0.4 | 2.7 ± 0.1 | 2.7 ± 0.2 |
| 5 h | 5.2 ± 1.7 | 1.8 ± 0.1 | 3.5 ± 0.9 | 2.5 ± 0.1 | 2.4 ± 0.3 |
| 1 day | 7.1 ± 3.7 | 1.7 ± 0.3 | 4.0 ± 1.4 | 2.3 ± 0.2 | 2.5 ± 0.5 |

Spray-dried RebM80 remained dissolved at a concentration of 0.3% and visibly clear for approximately 5 hours, while RebM60 remained dissolved for one day at the same concentration. The rebaudioside M composition containing RebM80 and SG95RA50 in the 19:1 weigh ratio remained dissolved and visibly clear for about 5 hours. The rebaudioside M compositions containing RebM80 and either SG95RA50 or NSF-02 in the 9:1 weight ratio remained dissolved and visibly clear for one day, indicating that the weight ratio of the two components has a significant effect on solubility.

Example 7: Solubility of Rebaudioside M Compositions Over Time at 0.4% Concentration All of the samples were prepared by spray-drying, as provided in Example 4. 30 mL of water was added in one portion to a 120 mg sample in a vial at room temperature. The mixture was stirred for 45-60 minutes then allowed to stand without disturbing. Turbidity was measured over time. The results are shown in Table 7:

TABLE 7

| | Turbidity (NTU) | | | | |
|---|---|---|---|---|---|
| Time | RebM80 | RebM60 | RebM80/ SG95RA50 (19:1) | RebM80/ SG95RA50 (9:1) | RebM80/ NSF-02 (9:1) |
| within 1 h | 6.2 ± 2.3 | 2.7 ± 0.1 | 5.2 ± 1.2 | 3.7 ± 0.2 | 3.6 ± 0.1 |
| 5 h | 6.5 ± 0.6[a] | 2.4 ± 0.1 | 5.4 ± 1.5[a,b] | 3.6 ± 0.3 | 3.4 ± 0.2 |
| 1 day | 11.3 ± 1.8 | 2.5 ± 0.5 | 6.5 ± 1.8 | 4.0 ± 0.8[a] | 4.3 ± 1.0[a] |

[a]In some experiments, a small amount of white solid was observed
[b]In some experiments, a large amount of white solid was observed Neither spray-dried RebM80 nor spray-dried RebM80/SG95RA50 (19:1) were soluble 0.4% concentration (i.e., below about 5 NTU). Spray-dried RebM60 remained soluble a concentration of 0.4% and visibly clear for 1 day, as did the RebM80/SG95RA50 (9:1) sample.

Example 8: Solubility of Rebaudioside M Compositions Over Time 30 mL of water was added in one portion to a sample of spray-dried RebM80 (prepared via the method of Example 3) sufficient to provide the indicated concentration (% w/w) in Table 8, below, at room temperature. The mixture was stirred for 45-60 minutes then allowed to stand without disturbing. Turbidity was measured over time. The results are shown in Table 8:

TABLE 8

| Time | Turbidity (NTU) | | | |
|---|---|---|---|---|
| | 0.3% | 0.4% | 0.5% | 0.6% |
| within 1 hr | 1.4 ± 0.1 | 2.3 ± 0.3 | 3.2 ± 0.7 | 3.8 ± 0.7 |
| 8 hours | 1.6 ± 0.2 | 2.9 ± 0.5 | 8.2 ± 6.4$^a$ | 9.3 ± 3.6$^{a,b}$ |
| 1 day | 1.6 ± 0.2 | 4.1 ± 1.0$^a$ | ppt | ppt |
| 2 days | 1.7 ± 0.5 | 8.8 ± 5.2$^a$ | ppt | ppt |

$^a$In some experiments, a small amount of white solid was observed
$^b$In some experiments, a large amount of white solid was observed

Example 9: Excipient/Surfactant Combinations Affording Solubility Improvement Solubilization and inhibition of precipitation studies were conducted with various polymers, surfactants and saponins in combination with RebM80 in a microplate format. Precipitation was estimated using polarized light microscopy (PLM) at two time points: 24 hours and two weeks. Each well contained 0.50 (% w/v) RebM80, water and the listed additives. The final well concentration of the additives used (in w/v %) are listed below Table 9.

After standing at room temperature for 24 hours, the samples were observed by PLM. The results are shown in Table 9.

Trace solid (0)<small amount of solid (1)<slightly more solid (2)<appreciable solid (3)<large amount of solid (4)

TABLE 9

| Additives | 24 hours | ~2 weeks |
|---|---|---|
| TPGS/DOSS | 0 | 1 |
| Xanthan gum/SDS | 0 | 3 |
| Xanthan gum/DOSS | 1 | 1 |
| Carrageenan/SDS | 1 | 1 |
| Carrageenan/DOSS | 1 | 1 |
| Beta Pectin/SDS | 1 | 1 |
| Modified Food Starch/SDS | 1 | 1 |
| Acacia Gum/DOSS | 1 | 1 |
| Saponin/SDS | 1 | 1 |
| PVPK29/32/DOSS | 1 | 1 |
| T80/DOSS | 1 | 1 |
| PEG600/SDS | 1 | 1 |
| gamma-CD/SDS | 1 | 1 |
| T20/SDS | 1 | 1 |
| T80/SDS | 1 | 1 |
| TPGS/SCMC | 1 | 1 |
| SCMC/DOSS | 1 | 1 |
| PEG600/PVPVA | 1 | 1 |
| Maltodextrin/SDS | 1 | 2 |
| T20/DOSS | 1 | 2 |
| PVPVA/SDS | 1 | 2 |
| Saponin/DOSS | 1 | 2 |
| PVPVA/DOSS | 1 | 2 |
| SDS | 1 | 2 |
| Maltodextrin/Saponin | 1 | 3 |
| Maltodextrin/T20 | 1 | 3 |
| HPMC/SDS | 1 | 3 |
| gamma-CD/DOSS | 1 | 3 |
| HPMC/DOSS | 1 | 3 |
| Maltodextrin | 1 | 3 |
| gamma-CD/T20 | 1 | 3 |
| SCMC/SDS | 2 | 2 |
| TPGS/SDS | 2 | 2 |
| Food Starch Modified/DOSS | 2 | 3 |

TABLE 9-continued

| Additives | 24 hours | ~2 weeks |
|---|---|---|
| Maltodextrin/DOSS | 2 | 3 |
| Xanthan Gum | 2 | 4 |

DOSS = Dioctyl sodium sulfosuccinate (0.25)
SDS = Sodium dodecyl sulfate (0.25)
HPMC = Hydroxypropyl methylcellulose (0.25)
T20 = Tween 20 (0.25)
gamma-CD = gamma-cyclodextrin (0.25)
SCMC = Sodium Carboxymethyl Cellulose (0.10)
PVPK29/32 = Povidone K29/32 (0.25)
PVPVA = Polyvinylpyrrolidone/vinyl acetate (0.25)
T80 = Tween 80 (0.25)
PEG600 = Polyethylene glycol 600 (0.25)
TPGS = DL-α-Tocopherol methoxypolyethylene glycol succinate (0.25)
Maltodextrin (0.25)
Modified Food Starch (0.25)

Example 10: Solubility of Rebaudioside M Compositions with Heating 30 mL of water, or water with surfactant/emulsifier/polymer, was warmed to 60° C. using a water bath and a sample of RebM80 sufficient to provide the indicated concentration (% w/w) was mixed in a sealed vial. The mixture was heated to 80° C. for 1 h and cooled to room temperature over 1 h, then allowed to stand without disturbing. Turbidity (NTU) was then measured. The results are shown in Table 10:

TABLE 10

| | Turbidity (NTU) | | | |
|---|---|---|---|---|
| | RebM80 (0.5% w/w) | RebM80 (1.0% w/w) | TPGS/Gum Acacia, RebM80 (1.0% w/w), SCMC (1/1/20/8) | TPGS, Gum Acacia, RebM80 (1.0% w/w), Tween80 (1/1/20/8) |
| 5 hours | 2.4 ± 0.6 | 3.3 ± 1.2$^{a,b}$ | 3.2 ± 1.2$^{a,b}$ | 3.4 ± 0.2 |
| 1 day | 2.6 ± 1.0$^{a,b}$ | 3.1 ± 0.8$^{a,b}$ | 3.4 ± 1.0$^a$ | 3.3 ± 0.2$^{a,b}$ |

$^a$In some experiments, a small amount of white solid was observed
$^b$In some experiments, a large amount of white solid was observed

Example 11: Preparation of Spray-Dried Rebaudioside M Compositions 0.5 g of xanthan gum, 0.5 g of SDS, 4 g of PVPK29/32 and 5 g sample of RebM80 having water solubility of 0.1% was mixed with 100 mL of water in an open flask and placed in an oil bath. The mixture was heated to 80-90° C. over 1 h to give a concentrated solution.

About 100 g of the concentrated solution was constantly maintained at ~80-90° C. while being fed via insulated piping to Mini-spray drier ADL310 (YAMATO) operating at 140° C. inlet and 80° C. outlet temperature. 6.6 g (66% yield) of product was obtained.

The RebM80/maltodextrin blend, RebM80/potassium sorbate blend and RebM80/sucrose blend were prepared via a similar procedure with the amounts of ingredients indicated in Table 11, below.

For the RebM/glucose blend, 10 g of glucose and 5 g RebM80 having water solubility of 0.1% was mixed with 100 mL of water in an open flask and placed in an oil bath. The mixture was heated to 80-90° C. over 1 h to give a concentrated solution.

About 100 g of the concentrated solution was constantly maintained at ~80-90° C. while being fed via insulated piping to Mini-spray drier ADL310 (YAMATO) operating at 140° C. inlet and 94° C. outlet temperature. 6.0 g (40% yield) of product was obtained.

TABLE 11

| Experiment | Sample | Amounts | Water (mL) | Yield g (%) |
|---|---|---|---|---|
| 11a | RebM80/ xanthan gum/SDS/ PVPK29/32 | 5 g RebM80, 0.5 g xanthan gum 0.5 g SDS 4 g PVPK29/32 | 100 | 6.6 g (66%) |
| 11b | RebM80/ maltodextrin | 2.5 g RebM80 5 g maltodextrin | 100 | 5.5 g (73%) |
| 11c | RebM80/ potassium sorbate | 5 g RebM80 5 g potassium sorbate | 100 | 7.7 g (77%) |
| 11d | RebM80/ sucrose | 5 g RebM80 5 g Sucrose | 100 | 7.0 (70%) |
| 11e | RebM80/ glucose | 5 g RebM80 10 g glucose | 100 | 6.0 (40%) |

Example 11: Solubility of Rebaudioside M Compositions Over Time at 0.3% Concentration 20 mL of water was added to 180 mg of RebM80/maltodextrin or 120 mg of RebM80/xanthan gum/SDS/PVPK29/32 (both prepared as in Examples 10) at room temperature. The mixture was stirred for 10 minutes then allowed to stand without disturbing. Turbidity was measured over time. The results are shown in Table 12:

TABLE 12

| | Turbidity (NTU) | | |
|---|---|---|---|
| Time | RebM80/xanthan gum/SDS/PVPK29/32 (10:1:1:8) | RebM80/ maltodextrin (1:2) | RebM/potassium sorbate (1:1) |
| 8 h | 5.7 ± 0.4 | 3.2 ± 0.2 | 1.8 [b] |
| 1 day | 5.1 ± 0.4 | 3.0 ± 0.4 | 1.8 ± 0.1 |
| 2 day | 5.6 ± 1.6 [a] | 3.6 ± 0.4 [a] | 1.9 ± 0.2 |

[a] Small amount of white solid was observed in certain run.
[b] n = 1.

Spray-dried RebM80 (prepared via Example 4) remained dissolved at a concentration of 0.3% and started to precipitate within 1 day, while the RebM80/xanthan gum/SDS/PVPK29/32 blend and the RebM80/maltodextrin blend had initial haziness, but remained dissolved.

Example 13: Solubility of Rebaudioside M Compositions Over Time at 0.4% Concentration 20 mL of water was added to a 240 mg of RebM80 or 160 mg of RebM80/xanthan gum/SDS/PVPK29/32 at room temperature. The mixture was stirred for 10 minutes then allowed to stand without disturbing. Turbidity was measured over time. The results are shown in Table 13:

TABLE 13

| | Turbidity (NTU) | | |
|---|---|---|---|
| Time | RebM80/xanthan gum/SDS/PVPK29/32 (10:1:1:8) | RebM80/ maltodextrin (1:2) | RebM/potassium sorbate (1:1) |
| 8 h | 7.5 ± 0.5 | 5.0 ± 0.5 | 2.7 [b] |
| 1 day | 7.0 ± 0.5 | 6.1 ± 0.6 [a] | 2.8 ± 0.2 |
| 2 days | 7.3 ± 1.2 [a] | 8.1 ± 0.6 [a] | 3.0 ± 0.5 |

[a] Small amount of white solid was observed in certain run.
[b] n = 1.

Example 14: Solubility of Rebaudioside M Compositions

A sample of each substance was added portion-wise to 20 mL of water. After all solid material was dissolved by visible inspection (ca. 2-10 minutes for each addition of sample), turbidity was measured. This process was repeated until turbidity reached over 4 NTU. The duration of each experiment was from 1-1.5 hours. The results are shown in Table 14:

TABLE 14

| | RebM80/Potassium Sorbate (1:1) (prepared via Example 11) | RebM80/ Sucrose (1:1) (prepared via Example 11) | RebM80/ Glucose (1:2) (prepared via Example 11) |
|---|---|---|---|
| Solubility (% w/w) | ~0.6 | ~0.25 | ~0.37 |

What is claimed is:

1. A beverage comprising a composition comprising (i) rebaudioside M, (ii) rebaudioside D and (iii) a substance selected from the group consisting of a second steviol glycoside mixture, rebaudioside B, glucosylated steviol glycosides and a combination thereof, wherein
   a. rebaudioside M and rebaudioside D are provided as a first steviol glycoside mixture, wherein rebaudioside M is present in the first steviol glycoside mixture in an amount from about 75% to about 90% by weight and rebaudioside D is present in the first steviol glycoside mixture in an amount from about 5% to about 25% by weight;
   b. the composition is spray-dried prior to dissolution in the beverage; and
   c. the composition has a water solubility of about 0.3% (w/v) or greater.

2. The beverage of claim 1, wherein the beverage is selected from a mid-calorie, low-calorie and zero-calorie beverage.

3. The beverage of claim 1, wherein the beverage is a carbonated beverage.

4. The beverage of claim 3, wherein the carbonated beverage is selected from the group consisting of a cola, lemon-lime flavored sparkling beverage, orange-flavored sparkling beverage, grape-flavored sparkling beverage, strawberry-flavored sparkling beverage, pineapple-flavored sparkling beverage, ginger ale, soft drink, root beer and malt beverage.

5. The beverage of claim 1, wherein the beverage is a non-carbonated beverage.

6. The beverage of claim 5, wherein the non-carbonated beverage is selected form the group consisting of a fruit juice, fruit-flavored juice, juice drink, nectar, vegetable juice, vegetable-flavored juice, sports drink, energy drink, enhanced water, enhanced water with vitamins, near water drink, coconut water, tea, coffee, cocoa drink, beverage containing milk component, beverage containing cereal extract and smoothie.

7. The beverage of claim 1, wherein rebaudioside M s present in the first steviol glycoside mixture in an amount from about 80% to about 85% by weight and rebaudioside D is present in the first steviol glycoside mixture in an amount from about 10% to about 15% by weight.

8. The beverage of claim 1, wherein the second steviol glycoside mixture comprises at least about 50% rebaudioside A by weight.

9. The beverage of claim 1, wherein the second steviol glycoside mixture comprises from about 1% to about 30% rebaudioside B by weight.

10. The beverage of claim 1, wherein the weight ratio of (i) rebaudioside M and rebaudioside D to (ii) rebaudioside B is from about 20:1 to about 5:1.

11. The beverage of claim 1, wherein the weight ratio of (i) rebaudioside M and rebaudioside D to (ii) the second steviol glycoside mixtures is from about 20:1 to about 5:1.

12. The beverage of claim 1, wherein the weight ratio of (i) rebaudioside M and rebaudioside D to (ii) the glucosylated steviol glycosides is from about 20:1 to about 5:1.

13. The beverage of claim 1, wherein the composition has a water solubility of about 0.5% (w/v) or greater.

14. The beverage of claim 1, wherein the composition has a water solubility of about 1.0% (w/v) or greater.

* * * * *